(12) United States Patent
Kim et al.

(10) Patent No.: US 11,367,439 B2
(45) Date of Patent: *Jun. 21, 2022

(54) ELECTRONIC DEVICE AND METHOD FOR PROVIDING ARTIFICIAL INTELLIGENCE SERVICES BASED ON PRE-GATHERED CONVERSATIONS

(71) Applicant: SAMSUNG ELECTRONICS CO., LTD., Suwon-si (KR)

(72) Inventors: Seungnyun Kim, Suwon-si (KR); Geonsoo Kim, Suwon-si (KR); Hanjib Kim, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

This patent is subject to a terminal disclaimer.

(21) Appl. No.: 16/514,062

(22) Filed: Jul. 17, 2019

(65) Prior Publication Data
US 2020/0027456 A1    Jan. 23, 2020

(30) Foreign Application Priority Data
Jul. 18, 2018    (KR) .................. 10-2018-0083611

(51) Int. Cl.
*G10L 15/22* (2006.01)
*G10L 15/18* (2013.01)
*G06N 5/02* (2006.01)

(52) U.S. Cl.
CPC .............. *G10L 15/22* (2013.01); *G06N 5/025* (2013.01); *G10L 15/1815* (2013.01);
(Continued)

(58) Field of Classification Search
USPC .................................................. 704/1–504
See application file for complete search history.

(56) References Cited

U.S. PATENT DOCUMENTS 9,697,828 B1    7/2017    Prasad et al.
9,710,753 B1    7/2017    Shams et al.
(Continued)

FOREIGN PATENT DOCUMENTS

KR    10-2013-0082835    7/2013
KR    10-2013-0126395    11/2013
(Continued)

OTHER PUBLICATIONS

International Search Report dated Oct. 24, 2019 in counterpart International Patent Application No. PCT/KR2019/008712.
(Continued)

*Primary Examiner* — Marcus T Riley
(74) *Attorney, Agent, or Firm* — Nixon & Vanderhye P.C.

(57) ABSTRACT

An electronic device capable of providing a voice-based intelligent assistance service may include: a housing; a microphone; at least one speaker; a communication circuit; a processor disposed inside the housing and operatively connected with the microphone, the speaker, and the communication circuit; and a memory operatively connected to the processor, and configured to store a plurality of application programs. The electronic device may be controlled to: collect voice data of a user based on a specified condition prior to receiving a wake-up utterance invoking a voice-based intelligent assistant service; transmit the collected voice data to an external server and request the external server to construct a prediction database configured to predict an intention of the user; and output, after receiving the wake-up utterance, a recommendation service related to the intention of the user based on at least one piece of information included in the prediction database.

18 Claims, 27 Drawing Sheets

(52) U.S. Cl.
CPC .. *G10L 2015/221* (2013.01); *G10L 2015/223* (2013.01); *G10L 2015/228* (2013.01)

(56) References Cited

U.S. PATENT DOCUMENTS

| | | | |
|---|---|---|---|
| 9,786,294 B1* | 10/2017 | Bezos | G06F 3/165 |
| 10,586,535 B2* | 3/2020 | Kudurshian | G06F 16/9032 |
| 10,705,794 B2* | 7/2020 | Gruber | G10L 15/22 |
| 10,733,993 B2* | 8/2020 | Kudurshian | G06F 16/685 |
| 10,747,498 B2* | 8/2020 | Stasior | G06F 3/167 |
| 2012/0016678 A1 | 1/2012 | Gruber et al. | |
| 2013/0159003 A1 | 6/2013 | Kim et al. | |
| 2013/0275875 A1* | 10/2013 | Gruber | G06F 3/167 |
| | | | 715/728 |
| 2013/0275899 A1* | 10/2013 | Schubert | B60K 35/00 |
| | | | 715/765 |
| 2014/0108013 A1 | 4/2014 | Di Cristo et al. | |
| 2014/0201126 A1* | 7/2014 | Zadeh | A61B 5/165 |
| | | | 706/52 |
| 2014/0222436 A1* | 8/2014 | Binder | G10L 15/26 |
| | | | 704/275 |
| 2015/0314454 A1* | 11/2015 | Breazeal | B25J 11/001 |
| | | | 700/259 |
| 2016/0148610 A1 | 5/2016 | Kennewick, Jr. et al. | |
| 2016/0151917 A1* | 6/2016 | Faridi | G10L 15/197 |
| | | | 700/259 |
| 2016/0171979 A1* | 6/2016 | Breazeal | G10L 15/22 |
| | | | 704/9 |
| 2016/0193732 A1* | 7/2016 | Breazeal | G10L 15/22 |
| | | | 700/258 |
| 2016/0199977 A1* | 7/2016 | Breazeal | B25J 9/1694 |
| | | | 700/246 |
| 2017/0068513 A1* | 3/2017 | Stasior | G06F 3/0673 |
| 2017/0133009 A1 | 5/2017 | Cho et al. | |
| 2017/0206064 A1* | 7/2017 | Breazeal | G06F 8/34 |
| 2017/0293466 A1 | 10/2017 | Bostick et al. | |
| 2017/0330429 A1 | 11/2017 | Tak et al. | |
| 2017/0358305 A1* | 12/2017 | Kudurshian | G10L 15/30 |
| 2018/0150280 A1* | 5/2018 | Rhee | G06F 3/0482 |
| 2018/0190264 A1 | 7/2018 | Mixter et al. | |
| 2018/0199123 A1* | 7/2018 | Rao | G06F 1/1656 |
| 2018/0239754 A1 | 8/2018 | Chung et al. | |
| 2018/0308485 A1* | 10/2018 | Kudurshian | G10L 13/02 |
| 2019/0371342 A1* | 12/2019 | Tukka | H04M 1/724 |
| 2020/0027456 A1* | 1/2020 | Kim | G06N 5/025 |

FOREIGN PATENT DOCUMENTS

| | | |
|---|---|---|
| KR | 10-2017-0054707 | 5/2017 |
| KR | 10-2017-0104006 | 9/2017 |
| KR | 10-2018-0096147 | 8/2018 |

OTHER PUBLICATIONS

European Partial Search Report dated Jun. 11, 2021 for EP Application No. 19838080.0.
European Search Report dated Oct. 19, 2021 for EP Application No. 19838080.0.

* cited by examiner

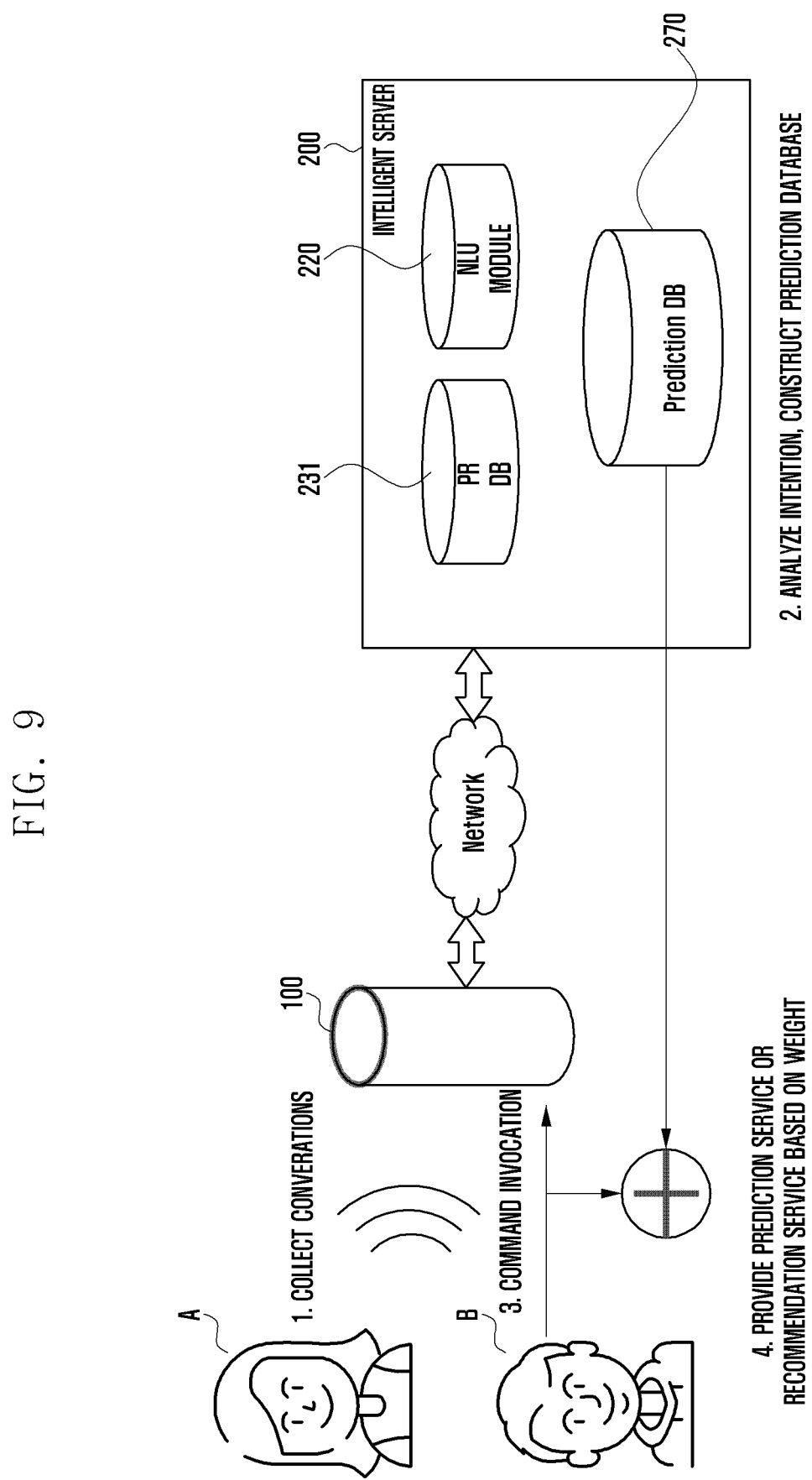

FIG. 12
1. LET'S HAVE A
PIZZA AT 2 PM.
A
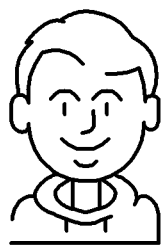
B 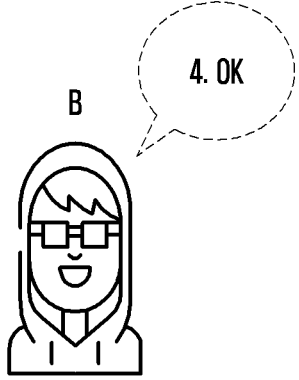
4. OK
2. YES, I'D LIKE A
BULGOGI PIZZA.
C
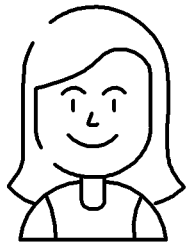
3. CAN I SUGGEST SOMETHING?
5. I'LL ORDER A BULGOGI PIZZA AT 2 PM.
   FOR YOUR INFORMATION, TODAY'S SWEET
   POTATO PIZZA IS 20% OFF.
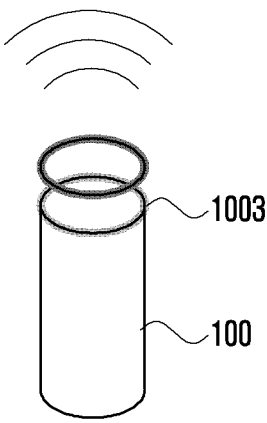

ELECTRONIC DEVICE AND METHOD FOR PROVIDING ARTIFICIAL INTELLIGENCE SERVICES BASED ON PRE-GATHERED CONVERSATIONS

CROSS-REFERENCE TO RELATED APPLICATION

This application is based on and claims priority under 35 U.S.C. § 119 to Korean Patent Application No. 10-2018-0083611, filed on Jul. 18, 2018, in the Korean Intellectual Property Office, the disclosure of which is incorporated by reference herein in its entirety.

TECHNICAL FIELD

The disclosure relates to an electronic device that provides voice-based intelligent assistance services.

BACKGROUND

Recently, electronic devices providing voice-based intelligent assistant services are being introduced. For example, an artificial intelligence speaker is convenient because it can control various home appliances arranged in the home and monitor the amount of water or electricity used without requiring manual intervention.

An electronic device using a voice-based platform (e.g., artificial intelligent speaker, or smartphone) can manage or control other devices without requiring a manual operation of the user. The electronic device may use artificial intelligence algorithms and speech recognition to communicate with the user through voice, enabling the user in the home to easily control other devices by voice only. Such electronic devices are emerging as the next generation platform.

In the related art, the existing electronic device tends to pick up the voice of the user only after receiving a wake-up utterance invoking a voice-based intelligent assistant service from the user, analyze the picked-up voice data, and provide a corresponding artificial intelligence service.

Such an electronic device considers user's conversations to be meaningless before receiving the wake-up utterance, ignoring daily conversations of the user. In this case, to receive a desired service, the user may have to repeat, after the wake-up utterance, what he or she said before the wake-up utterance.

SUMMARY

The disclosure has been made in view of the above problems. Accordingly, various embodiments of the disclosure provide an electronic device and a method therefor that can provide a voice-based intelligent assistant service based on user conversations collected prior to the wake-up utterance.

According to an embodiment of the disclosure, an electronic device is provided. The electronic device may include: a housing; a microphone disposed inside the housing and at least partially exposed through a first portion of the housing; at least one speaker disposed inside the housing and at least partially exposed through a second portion of the housing; a communication circuit disposed inside the housing; a processor disposed inside the housing and operatively connected with the microphone, the speaker, and the communication circuit; and a memory disposed inside the housing, operatively connected to the processor, and configured to store a plurality of application programs. The memory may store instructions that, when executed, cause the processor to control the electronic device to: collect voice data of a user based on a specified condition prior to receiving a wake-up utterance invoking a voice-based intelligent assistant service; transmit the collected voice data to an external server and request the external server to construct a prediction database configured to predict an intention of the user; and output, after receiving the wake-up utterance, a recommendation service related to the intention of the user based on at least one piece of information included in the prediction database.

According to an embodiment of the disclosure, a method of operating an electronic device capable of providing a recommendation service related to a user's intention in response to a wake-up utterance invoking a voice-based intelligent assistant service is provided. The method may include: collecting voice data of a user based on a specified condition prior to receiving the wake-up utterance; transmitting the collected voice data to an external server and requesting the external server to construct a prediction database configured to predict the intention of the user; determining, upon receiving the wake-up utterance, a weight based on at least one piece of information stored in the prediction database; and determining a recommendation service related to the user's intention based on the weight and outputting the determined recommendation service.

According to an embodiment of the disclosure, method of operating a server to provide a recommendation service related to a user's intention in response to a wake-up utterance invoking a voice-based intelligent assistant service. The method may include: receiving voice data from an electronic device; analyzing a context of a user's conversation included in the voice data; determining whether the voice data is sufficient to identify the user's intention based on the analyzed context; generating a path rule based on the voice data being sufficient to identify the user's intention, and cumulatively storing the voice data based on the voice data not being sufficient to identify the user's intention; constructing, based on the path rule being generated, a prediction database using the generated path rule to predict the user's intention; and transmitting, based on the electronic device receiving the wake-up utterance, at least one path rule included in the prediction database to the electronic device.

According to an embodiment of the disclosure, the electronic device collects conversations of the user in advance (e.g., before the user enters the wake-up utterance) and provides a voice-based intelligent assistant service based on the collected result. Accordingly, the electronic device can provide rapid and accurate responses and produce a response based on additional information. In addition, when the user of the electronic device uses a voice-based intelligent assistant service, the convenience of the user can be improved by reducing the number and/or amount of voice input.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 9 is a diagram illustrating example operations of the integrated intelligent system according to an embodiment of the disclosure;

FIG. 12 is a diagram illustrating another example method of the electronic device providing an artificial intelligence service according to an embodiment of the disclosure;

DETAILED DESCRIPTION

Before describing embodiments of the disclosure, a description is given of an integrated intelligent system, to which an embodiment of the present disclosure can be applied.

Figure 1:
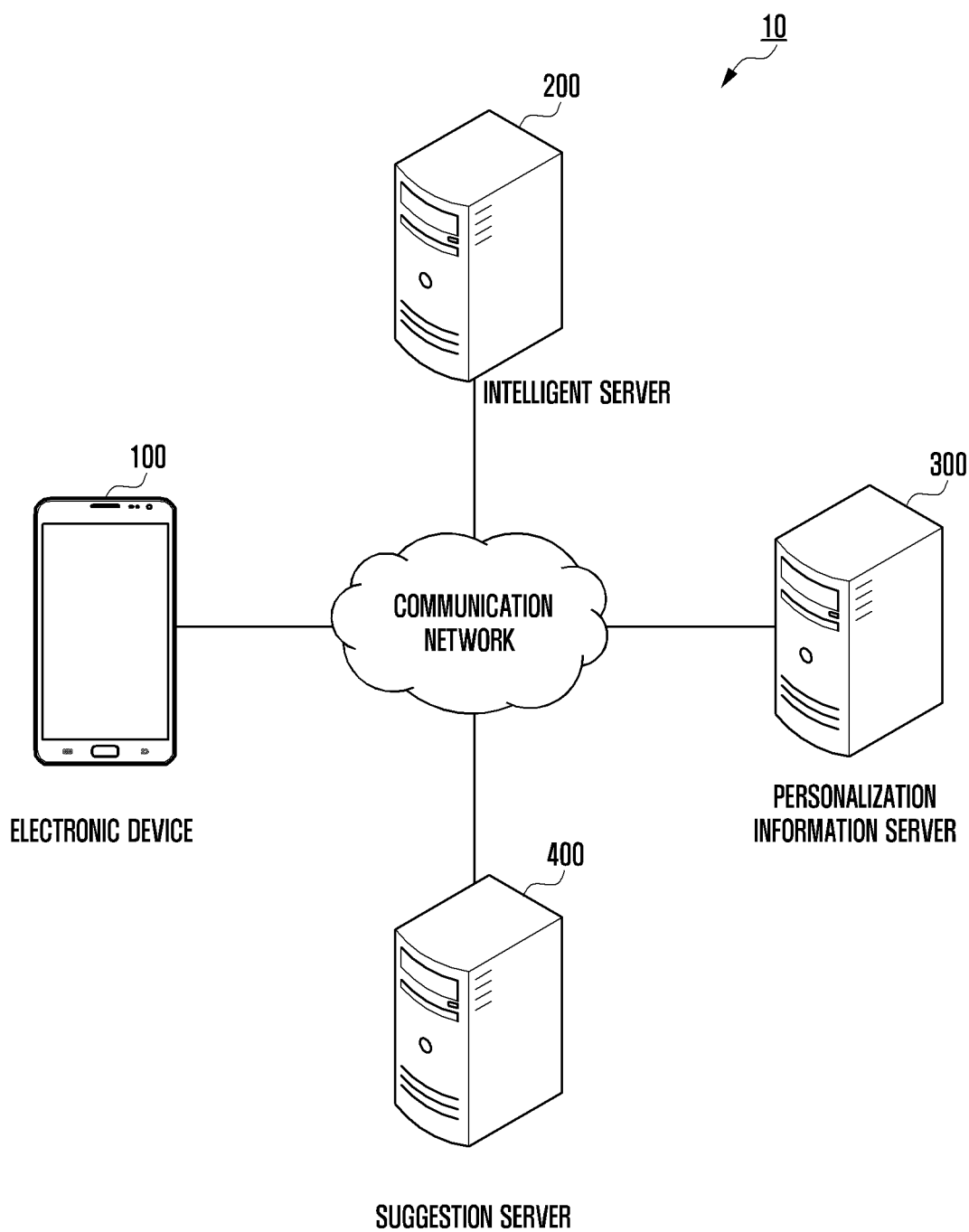
FIG. 1 is a diagram illustrating an example integrated intelligent system according to various embodiments of the disclosure.

FIG. 1 is a diagram illustrating an example integrated intelligent system according to various embodiments of the disclosure.

With reference to FIG. 1, the integrated intelligent system 10 may include an electronic device 100, an intelligent server 200, a personalization information server 300, and a suggestion server 400.

The electronic device 100 may provide a service required by the user through an application program (application or app) stored therein (e.g., alarm app, message app, or photograph or gallery app). For example, the electronic device 100 may invoke and execute other apps through an intelligent application (or, speech recognition app) stored in the electronic device 100. The electronic device 100 may receive an input, e.g., a user input, for executing another application through the intelligent application. The user input may be received, for example, and without limitation, via a physical button, a touchpad, a voice input, a remote input, or the like. In an example embodiment, the electronic device 100 may correspond to one of various terminal devices (or, electronic appliances) that can be connected to the Internet, such as, for example, and without limitation, a mobile phone, a smartphone, a personal digital assistant (PDA), a notebook computer, or the like.

In an example embodiment, the electronic device 100 may receive a user utterance as a user input. The electronic device 100 may receive a user utterance and generate a command to invoke a specific application based on the user utterance. Hence, the electronic device 100 can execute the application using the command.

The intelligent server 200 may receive a user voice input from the electronic device 100 through a communication network and convert the received voice input into text data. In another embodiment, the intelligent server 200 can generate or select a path rule based on the text data. The path rule may include information on an action (or, operation) for executing a function of the application or information on a parameter necessary for executing the action. The path rule may also include information on the sequence of actions of the application. The electronic device 100 may receive a path rule, select an application according to the path rule, and execute an action of the selected application indicated by the path rule.

In the disclosure, the term "path rule" may generally refer to, but is not limited to, a sequence of states of the electronic device 100 to perform a task requested by the user. In other words, the path rule may include information about a sequence of states. The task may be, for example, any action that an intelligent application can provide. For example, and without limitation, the task may correspond to creating a schedule, sending a photograph to a desired counterpart, providing weather information, etc. The electronic device 100 may perform a task by, for example, making a sequential transition between one or more states (e.g., operating states of the electronic device 100).

In an example embodiment, the path rule can be provided or generated by an artificial intelligence (AI) system. The artificial intelligence system may, for example, and without limitation, include a rule-based system, a neural network-based system (e.g., feedforward neural network (FNN), a recurrent neural network (RNN)), or the like, of any combination thereof, or may be some other artificial intelligence system. In an example embodiment, the path rule may, for example, and without limitation, be a selected one among a set of predefined path rules, can be generated in real time in response to a user request, etc. For example, the artificial intelligence system may select at least one of plural predefined path rules, may generate a path rule dynamically or in real time, etc. The electronic device 100 may also use a hybrid system to provide a path rule.

In an example embodiment, the electronic device 100 can perform an operation and display the state of the electronic device 100 having performed the operation on the display. For example, the electronic device 100 may perform the operation but not display the result of the operation on the display. The electronic device 100 may perform a plurality of operations and display the results of some operations on the display. The electronic device 100 may display only the result of the last operation of a sequence on the display. As another example, the electronic device 100 may receive a user input and display the result of the operation for the user input on the display.

The personalization information server 300 may include a database storing user information. For example, the personalization information server 300 may receive user information (e.g., context information, or application execution) from the electronic device 100 and store the received information in the database. The intelligent server 200 may receive user information from the personalization information server 300 through a communication network, and may use the user information to generate a path rule corresponding to a user input. In an example embodiment, the electronic device 100 may receive user information from the personalization information server 300 through a communication network and may use the received information to manage the database.

The suggestion server 400 may include a database that stores information about a function of the electronic device or information about an application stored in the electronic device. For example, the suggestion server 400 may receive user information of the electronic device 100 from the personalization information server 300 and may include a database of functions available to the user. The electronic device 100 may receive information on the available functions from the suggestion server 400 through a communication network and may provide the received information to the user.

Figure 2:
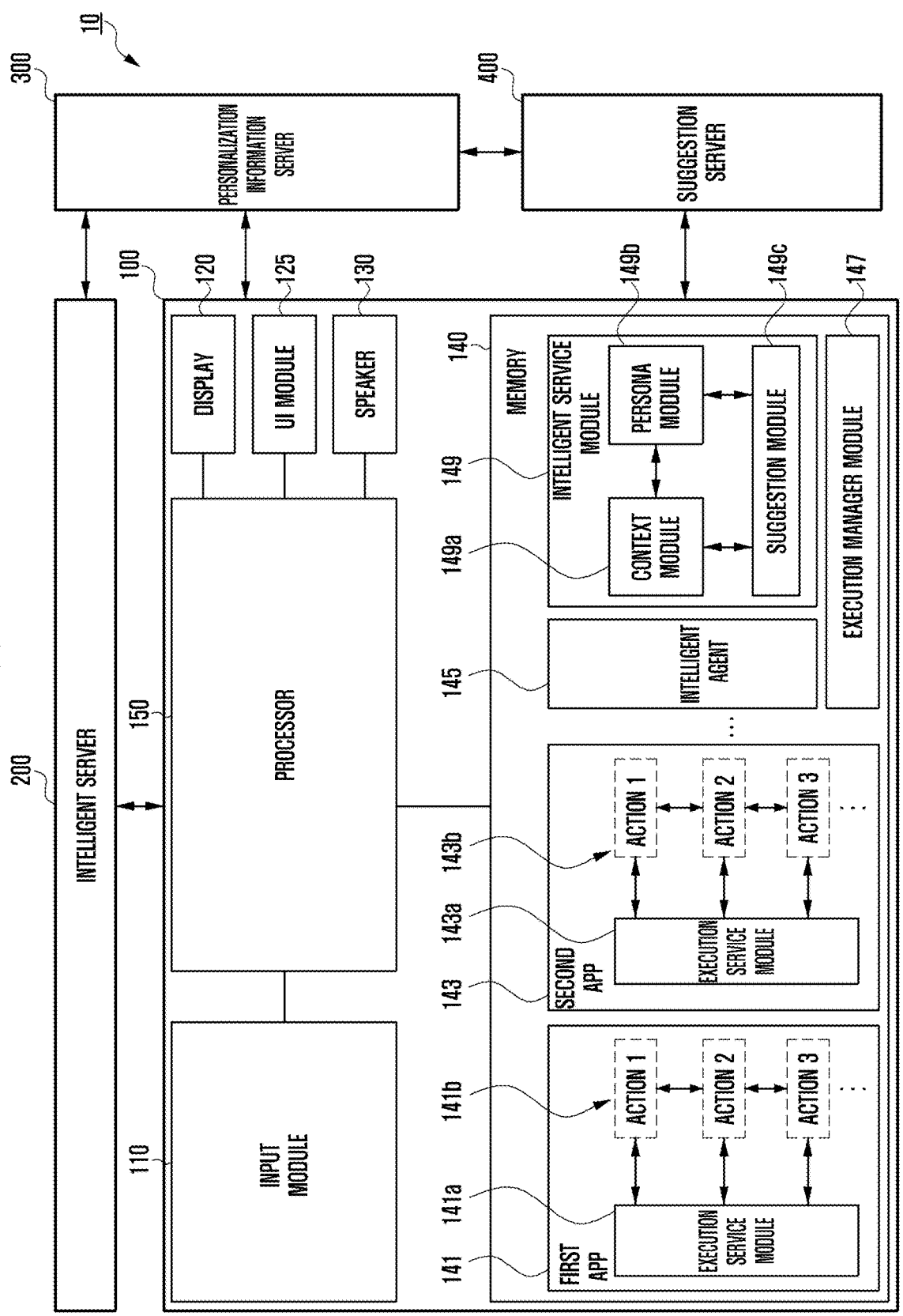
FIG. 2 is a block diagram illustrating an example electronic device in the integrated intelligent system according to an embodiment of the disclosure.

FIG. 2 is a block diagram illustrating an example electronic device in the integrated intelligent system according to an embodiment of the disclosure.

With reference to FIG. 2, the electronic device 100 may include an input module (e.g., including input circuitry) 110, a display 120, a user interface module (e.g., including user interface circuitry) 125, a speaker 130, a memory 140, and a processor (e.g., including processing circuitry) 150. The electronic device 100 may further include a housing, and the components of the electronic device 100 may be mounted within the housing or arranged on the housing. The electronic device 100 may further include a communication circuit inside the housing. The electronic device 100 can exchange data (or information) with an external server (e.g., intelligent server 200) through the communication circuit. In an example embodiment, the input module 110 may include various input circuitry and receive a user input from the user. For example, the input module 110 may receive user input from a connected external device (e.g., keyboard, or headset). As another example, the input module 110 may include a touchscreen coupled with the display 120. As another example, the input module 110 may include a hardware key (or physical key) located in the electronic device 100 (or housing thereof). However, it will be understood that the disclosure is not limited to these examples.

In an example embodiment, the input module 110 may include a microphone capable of receiving a user utterance as a speech signal. For example, the input module 110 may include a speech input system, and may receive a user utterance as a speech signal through the speech input system. The microphone may be exposed through a portion (e.g., first portion) of the housing.

In an example embodiment, the display 120 may display an image, a video, and/or a screen of an executed application. For example, the display 120 may display a graphical user interface (GUI) of an application. The display 120 may be exposed through a portion (e.g., second portion) of the housing.

In an example embodiment, the user interface module 125 may include various user interface circuitry and provide a user interface (UI) or a user experience (UX) with respect to the state of collecting user conversations prior to receiving the wake-up utterance, or the state of providing a recommendation service in response to the wake-up utterance. The user interface module 125 may include an LED illumination (e.g., indicia 1003 in FIGS. 10A and 10B) disposed in at least a portion of the housing of the electronic device 100. For example, the electronic device 100 may control the LED illumination 1003 in connection with the state of collecting user conversations or the state of providing a recommendation service. The electronic device 100 may control the shape, brightness, intensity, or color of the LED illumination 1003 based on the state of the electronic device 100.

In an example embodiment, the speaker 130 may output a sound signal. The speaker 130 may output a sound signal generated in the electronic device 100 to the outside. The speaker 130 may be exposed through a portion (e.g., third portion) of the housing.

In an example embodiment, the memory 140 may store a plurality of applications (application programs) 141 and 143. The applications 141 and 143 may be, for example, a program for performing a function corresponding to a user input. In an example embodiment, the memory 140 may store an intelligent agent 145, an execution manager module 147, and an intelligent service module 149. The intelligent agent 145, the execution manager module 147, and the intelligent service module 149 may be, for example, a framework (application framework) for processing a received user input (e.g., user utterance).

In an example embodiment, the memory 140 may include a database capable of storing information necessary to recognize a user input. For example, the memory 140 may include a log database capable of storing log information. As another example, the memory 140 may include a persona database capable of storing user information.

In an example embodiment, the memory 140 may store plural applications 141 and 143, and the plural applications 141 and 143 can be loaded for execution. For example, the applications 141 and 143 stored in the memory 140 can be loaded for execution by the execution manager module 147. Each application 141 or 143 may include an execution service module 141a or 143a to perform functions. To perform a function, the application 141 or 143 may perform a plurality of operations 141b or 143b (e.g., sequence of states) through the execution service module 141a or 143a. In other words, the execution service modules 141a and 143a are activated by the execution manager module 147 and can perform a plurality of operations 141b and 143b.

In an example embodiment, when the operation 141b or 143b of the application 141 or 143 is executed, the execution status screen according to the execution of the operation 141b or 143b may be output on the display 120. The execution status screen may be, for example, a screen when the operation 141b or 143b is completed. The execution status screen may be, for example, a screen for partial landing of the operation 141b or 143b (e.g., parameters necessary for the operation 141b or 143b are not input).

In an example embodiment, the execution service module 141a or 143a can execute the operation 141b or 143b in accordance with a path rule. For example, the execution service module 141a or 143a may be activated by the execution manager module 147, receive an execution request corresponding to the path rule from the execution manager module 147, and execute the operation 141b or 143b in response to the execution request. Thereby, the function of the application 141 or 143 can be executed. When the operation 141b or 143b is completed, the execution service module 141a or 143a may transmit completion information to the execution manager module 147.

In an example embodiment, the operations 141b or 143b may be sequentially executed in the application 141 or 143. The execution service module 141a or 143a may complete execution of one operation (e.g., operation 1 of first application 141, or operation 1 of second application 143), open the next operation (e.g., operation 2 of first application 141, or operation 2 of second application 143), and transmit the completion information to the execution manager module 147. For example, opening an operation may be understood as transitioning the operation to an executable state or preparing for execution of the operation. In other words, if an operation is not opened, the operation cannot be executed. Upon receiving the completion information, the execution manager module 147 can transmit an execution request for the next operation (e.g., operation 2 of first application 141, or operation 2 of second application 143) to the corresponding execution service module. In an example embodiment, the applications 141 and 143 can be sequentially executed. For example, upon receiving completion information for the last operation (e.g., operation 3) of the first application 141, the execution manager module 147 may transmit an execution request for the first operation of the second application 143 (e.g., operation 1 of second application 143) to the execution service module 143a.

In an example embodiment, when plural operations 141b and 143b are executed in the applications 141 and 143, the result screen corresponding to each of the executed operations 141b and 143b may be output on the display 120. When plural operations 141b and 143b are executed in the applications 141 and 143, the result screen corresponding to some of the executed operations 141b and 143b may be output on the display 120.

In an example embodiment, the memory 140 may store an intelligent application (e.g., speech recognition application) associated with the intelligent agent 145. The application associated with the intelligent agent 145 may receive a user utterance and process it as a speech signal. The application associated with the intelligent agent 145 may be invoked by a specific input through the input module 110 (e.g., input via hardware key, input via touchscreen, or specific voice input). In an example embodiment, the intelligent agent 145, the execution manager module 147, or the intelligent service module 149 stored in the memory 140 may be executed by the processor 150. The function of the intelligent agent 145, the execution manager module 147, or the intelligent service module 149 may be carried out by the processor 150. The function of the intelligent agent 145, the execution manager module 147, or the intelligent service module 149 will be described in terms of operations or actions of the processor 150. The intelligent agent 145, the execution manager module 147, or the intelligent service module 149 stored in the memory 140 can be implemented in hardware as well as software or any combination thereof. In other words, the various modules and agents included in the electronic device 100 (e.g., the intelligent agent 145, the execution manager module 147, the intelligent service module 149, etc.) may include various processing circuitry and/or executable program elements.

In an example embodiment, the processor 150 may include various processing circuitry and control the overall operation of the electronic device 100. For example, the processor 150 may control the input module 110 to receive a user input. The processor 150 may control the display 120 to display an image. The processor 150 may control the speaker 130 to output a sound signal. The processor 150 may control the memory 140 to execute a program and retrieve or store necessary information.

In an example embodiment, the processor 150 may execute the intelligent agent 145, the execution manager module 147, or the intelligent service module 149 stored in the memory 140. Thereby, the processor 150 may implement the functions of the intelligent agent 145, the execution manager module 147, or the intelligent service module 149.

In an example embodiment, the processor 150 may execute the intelligent agent 145 to generate a command for invoking an application based on a voice signal received as user input. The processor 150 may execute the execution manager module 147 to invoke the application 141 or 143 stored in the memory 140 according to the generated command. The processor 150 may execute the intelligent service module 149 to manage user information and process user input using the user information.

The processor 150 may execute the intelligent agent 145 to transfer a user input received via the input module 110 to the intelligent server 200, and may process the user input through the intelligent server 200.

In an example embodiment, the processor 150 may invoke the intelligent agent 145 to preprocess the user input before sending the user input to the intelligent server 200. In an example embodiment, to preprocess a user input, the intelligent agent 145 may include an adaptive echo canceller (AEC) module, a noise suppression (NS) module, an endpoint detection (EPD) module, or an automatic gain control (AGC) module. The adaptive echo canceller module may remove an echo included in the user input. The noise suppression module may suppress background noise included in the user input. The end-point detection module may detect the end point of the user voice included in the user input, and use the detected end point to find a portion where the user voice is present. The automatic gain control module may adjust the volume of the user input to be suitable for recognizing and processing the user input. The processor 150 may execute all of the preprocessing components for high performance, and may execute some of the preprocessing components for low power operation.

In an example embodiment, the intelligent agent 145 may execute a wake-up recognition module stored in the memory 140 to recognize the user's invocation. The processor 150 may recognize a user's wake-up command via the wake-up recognition module, and may execute the intelligent agent 145 to receive a user input upon receiving the wake-up command. The wake-up recognition module may be implemented with a low-power processor (e.g., processor included in the audio codec). In an example embodiment, the processor 150 may invoke the intelligent agent 145 upon receiving a user input via the hardware key. When the intelligent agent 145 is invoked, an intelligent application (e.g., speech recognition application) associated with the intelligent agent 145 may be executed.

In an example embodiment, the intelligent agent 145 may include a speech recognition module to process a user input. The processor 150 may recognize a user input through the speech recognition module to cause an application to perform an action. For example, the processor 150 may recognize a limited user (voice) input, via the speech recognition module, which causes the application 141 or 143 to perform an action like a wake-up command (e.g., utterance such as "click" to trigger a shooting action when the camera application is running). The processor 150 may assist the intelligent server 200 to rapidly recognize and process a user command that can be processed in the electronic device 100 through the speech recognition module. The speech recognition module of the intelligent agent 145 for processing user input may be implemented in an application processor.

In an example embodiment, the speech recognition module of the intelligent agent 145 (including the speech recognition module of the wake-up module) may recognize a user input using a speech recognition algorithm. Speech recognition algorithms may include, for example, and without limitation, at least one of a hidden Markov model (HMM) algorithm, an artificial neural network (ANN) algorithm, a dynamic time warping (DTW) algorithm, or the like.

In an example embodiment, the processor 150 may invoke the intelligent agent 145 to convert a voice input of the user to text data. For example, the processor 150 may transmit a voice input to the intelligent server 200 via the intelligent agent 145 and may receive text data corresponding to the voice input from the intelligent server 200. Then, the processor 150 may display the converted text data on the display 120.

In an example embodiment, the processor 150 may invoke the intelligent agent 145 to receive a path rule from the intelligent server 200. The processor 150 may deliver the path rule to the execution manager module 147 via the intelligent agent 145.

In an example embodiment, the processor 150 may invoke the intelligent agent 145 according to the path rule received from the intelligent server 200 and deliver the execution result log to the intelligent service module 149, where the execution result log may be accumulated and managed in the user preference information of the persona module 149*b*.

In an example embodiment, the processor 150 may invoke the execution manager module 147 to receive a path rule from the intelligent agent 145, and may cause the applications 141 and 143 to execute the actions 141*b* and 143*b* indicated by the path rule. For example, the processor 150 may transmit command information (e.g., path rule information) for executing the operations 141*b* and 143*b* to the applications 141 and 143 via the execution manager module 147, and receive the completion information of the operations 141*b* and 143*b* from the applications 141 and 143.

In an example embodiment, the processor 150 may invoke the execution manager module 147 to transfer command information (e.g., path rule information) between the intelligent agent 145 and the applications 141 and 143 for executing the operations 141*b* and 143*b* of the applications 141 and 143. The processor 150 may bind the applications 141 and 143 to be executed according to the path rule through the execution manager module 147, and transmit the applications 141 and 143 command information (e.g., parameter) of the path rule for the operations 141*b* and 143*b*. For example, the processor 150 may sequentially transmit the parameters for the operations 141*b* and 143*b* included in the path rule to the applications 141 and 143 through the execution manager module 147 so as to execute the operations 141*b* and 143*b* of the applications 141 and 143 in sequence according to the path rule.

In an example embodiment, the processor 150 may invoke the execution manager module 147 to manage the execution states of the operations 141*b* and 143*b* of the applications 141 and 143. For example, the processor 150 may receive information on the execution states of the operations 141*b* and 143*b* from the applications 141 and 143 via the execution manager module 147. If the operation 141*b* or 143*b* is, for example, in the suspended (partial landing) state (e.g., a parameter necessary for the operation 141*b* or 143*b* is not input), the processor 150 may send information about the suspended state to the intelligent agent 145 via the execution manager module 147. The processor 150 may then request the user to enter necessary information (e.g., parameter information) based on the information received through the intelligent agent 145. As another example, if the operation 141*b* or 143*b* is in the running state, the processor 150 may receive an utterance from the user via the intelligent agent 145. The processor 150 may transmit information on the application 141 or 143 being executed and the execution state thereof to the intelligent agent 145 through the execution manager module 147. The processor 150 may send the user utterance to the intelligent server 200 via the intelligent agent 145. The processor 150 may receive parameter information of the user utterance from the intelligent server 200 via the intelligent agent 145. The processor 150 may send the received parameter information to the execution manager module 147 via the intelligent agent 145. The execution manager module 147 can change the parameters of the operations 141*b* and 143*b* to new parameters based on the received parameter information.

In an example embodiment, the processor 150 may invoke the execution manager module 147 to transmit parameter information included in the path rule to the applications 141 and 143. When the applications 141 and 143 are to be sequentially executed according to the path rule, the execution manager module 147 can provide parameter information included in the path rule from one application to another.

In an example embodiment, the processor 150 may invoke the execution manager module 147 to receive plural path rules. The processor 150 may select plural path rules via the execution manager module 147 based on a user utterance. For example, if the user utterance specifies one application 141 to perform an operation 141a but does not specify the other application 143 to perform the remaining operation 143b, the processor 150 may receive different path rules through the execution manager module 147 to run the specified application 141 (e.g., gallery application) for performing the operation 141a and run different applications 143 (e.g., message and telegram applications) for performing the remaining operations 143b. The processor 150 may execute the same operations 141b and 143b (e.g., the same successive operations 141b and 143b) indicated by the plural path rules, for example, via the execution manager module 147. When the same operations are performed, the processor 150 may display on the display 120 a status screen for selecting different applications 141 and 143 indicated by the plural path rules through the execution manager module 147.

In an example embodiment, the intelligent service module 149 may include a context module 149a, a persona module 149b, and a suggestion module 149c.

The processor 150 may invoke the context module 149a to collect information on the states of the applications 141 and 143. For example, the processor 150 may invoke the context module 149a to receive context information indicating the current states of the applications 141 and 143, and may collect current status information of the applications 141 and 143 through the received context information.

The processor 150 may invoke the persona module 149b to manage personal information of the user using the electronic device 100. For example, the processor 150 may invoke the persona module 149b to collect usage information and execution result information of the electronic device 100, and may manage the personal information of the user based on the collected usage and execution result information.

The processor 150 may invoke the suggestion module 149c to predict the intention of the user and recommend a command to the user based on the intention of the user. For example, the processor 150 may invoke the suggestion module 149c to recommend a command to the user based on the user's current state (e.g., time, location, situation, or application).

Figure 3A:
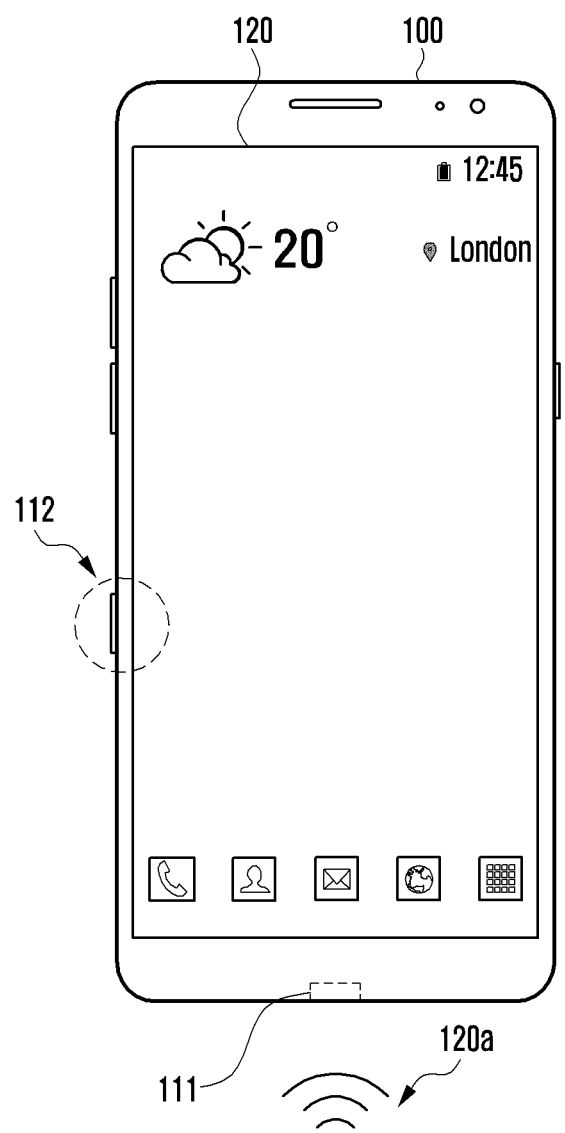
FIGS. 3A and 3B are diagrams illustrating execution of an example intelligent application of the electronic device according to an embodiment of the disclosure.
Figure 3B:
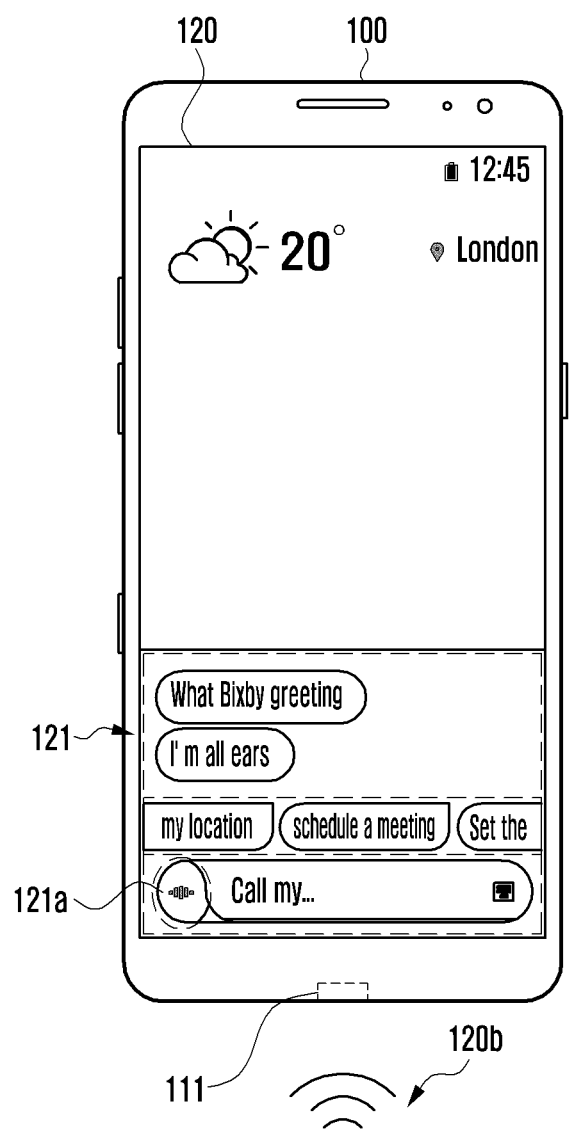

FIGS. 3A and 3B are diagrams illustrating example execution of an intelligent application of the electronic device according to an embodiment of the disclosure.

In an example embodiment, FIGS. 3A and 3B illustrate a situation where the electronic device 100 receives a user input and executes an intelligent application (e.g., speech recognition application) associated with the intelligent agent 145.

In an example embodiment, as shown in FIG. 3B, the electronic device 100 may, for example, and without limitation, invoke an intelligent application for speech recognition through a hardware key 112. For example, upon receiving a user input via the hardware key 112, the electronic device 100 may display the user interface (UI) 121 of the intelligent application on the display 120. For example, the user can touch a voice recognition button 121a of the UI 121 of the intelligent application to input a voice signal 120b while the UI 121 of the intelligent application is output on the display 120. As another example, the user can continuously press the hardware key 112 to input a voice signal 120b.

In an example embodiment, as shown in FIG. 3A, the electronic device 100 may invoke an intelligent application for speech recognition through the microphone 111. For example, the electronic device 100 may display the UI 121 of the intelligent application on the display 120 when a designated voice signal 120a (e.g., "wake up!") is input via the microphone 111.

Figure 4:
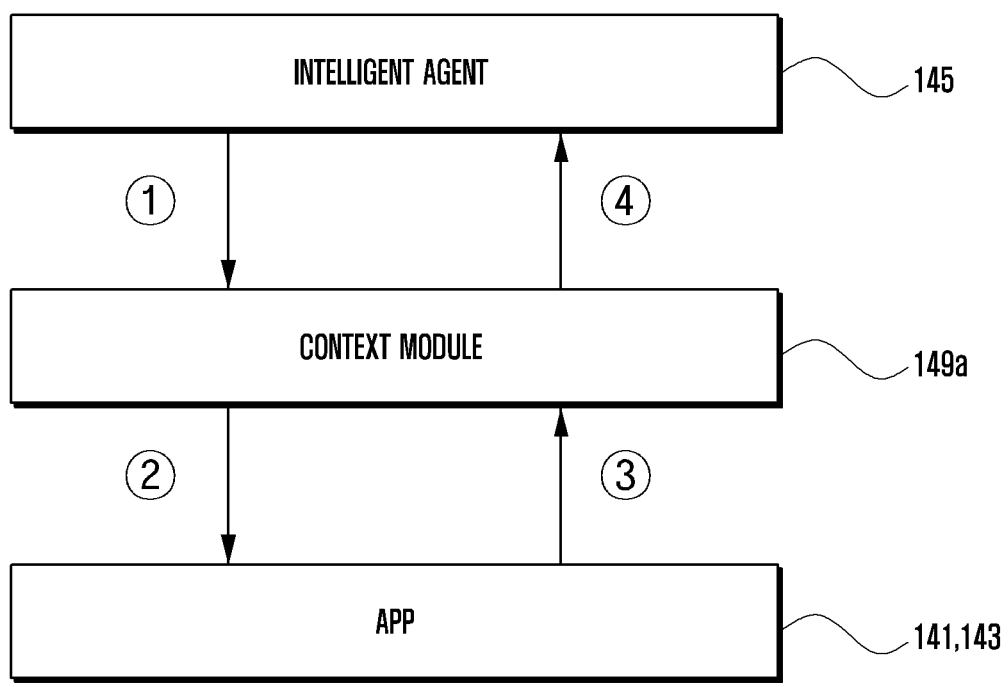
FIG. 4 is a diagram illustrating an example context module of the intelligent service module collecting current status information according to an embodiment of the disclosure.

FIG. 4 is a diagram illustrating an example context module of the intelligent service module collecting current status information according to an embodiment of the disclosure.

With reference to FIG. 4, when a context request is received from the intelligent agent 145 (①), the processor 150 may invoke the context module 149a to send a request for the context information indicating the current state of the applications 141 and 143 (②), receive the context information from the applications 141 and 143 (③), and transmit the received context information to the intelligent agent 145 (④).

In an example embodiment, the processor 150 may receive plural pieces of context information from the applications 141 and 143 via the context module 149a. The context information may, for example, and without limitation, be information on the most recently executed application 141 or 143. The context information may, for example, and without limitation, be information about the current state of the application 141 or 143 (e.g., information about a specific photograph when photographs are viewed in the gallery).

In an example embodiment, the processor 150 may receive context information indicating the current status of the electronic device 100 from the device platform as well as the applications 141 and 143 via the context module 149a. The context information may include, for example, and without limitation, general context information, user context information, device context information, or the like.

The general context information may include general information about the electronic device 100. The general context information can be received through the sensor hub of the device platform and verified through an internal algorithm. For example, the general context information may include information on the current time and space. The current time and space information may include, for example, information on the current time or information about the current location of the electronic device 100. The current time can be identified by the time on the electronic device 100, and the information on the current location can be identified via the global positioning system (GPS). As another example, the general context information may include information about physical motion. The information about physical motion may include, for example, and without limitation, information about walking, running, driving, etc. The physical motion information may be identified through a motion sensor. For the information about driving, riding can be identified through the motion sensor, and boarding or parking can be identified by detecting the Bluetooth connection in the vehicle. As another example, the general context information may include user activity information. The user activity information may include, for example, information about commuting, shopping, or traveling. The user activity information may be checked based on information about the places where the user or application is registered in the database.

The user context information may include information about the user. For example, the user context information may include information on the emotional state of the user. The information on the emotional state may include, for example, and without limitation, information about happiness, sadness, anger, etc. of the user. As another example, the user context information may include information on the current state of the user. The information about the current state may include, for example, information about interest, or intention (e.g., shopping).

The device context information may include information about the status of the electronic device 100. For example, the device context information may include information on the path rule processed by the execution manager module 147. As another example, the device context information may include information about the battery. The information on the battery can indicate, for example, the state of charging or discharging of the battery. As another example, the device context information may include information about the connected devices and networks. Information about the connected device can be identified via, for example, a communication interface to which the device is connected.

Figure 5:
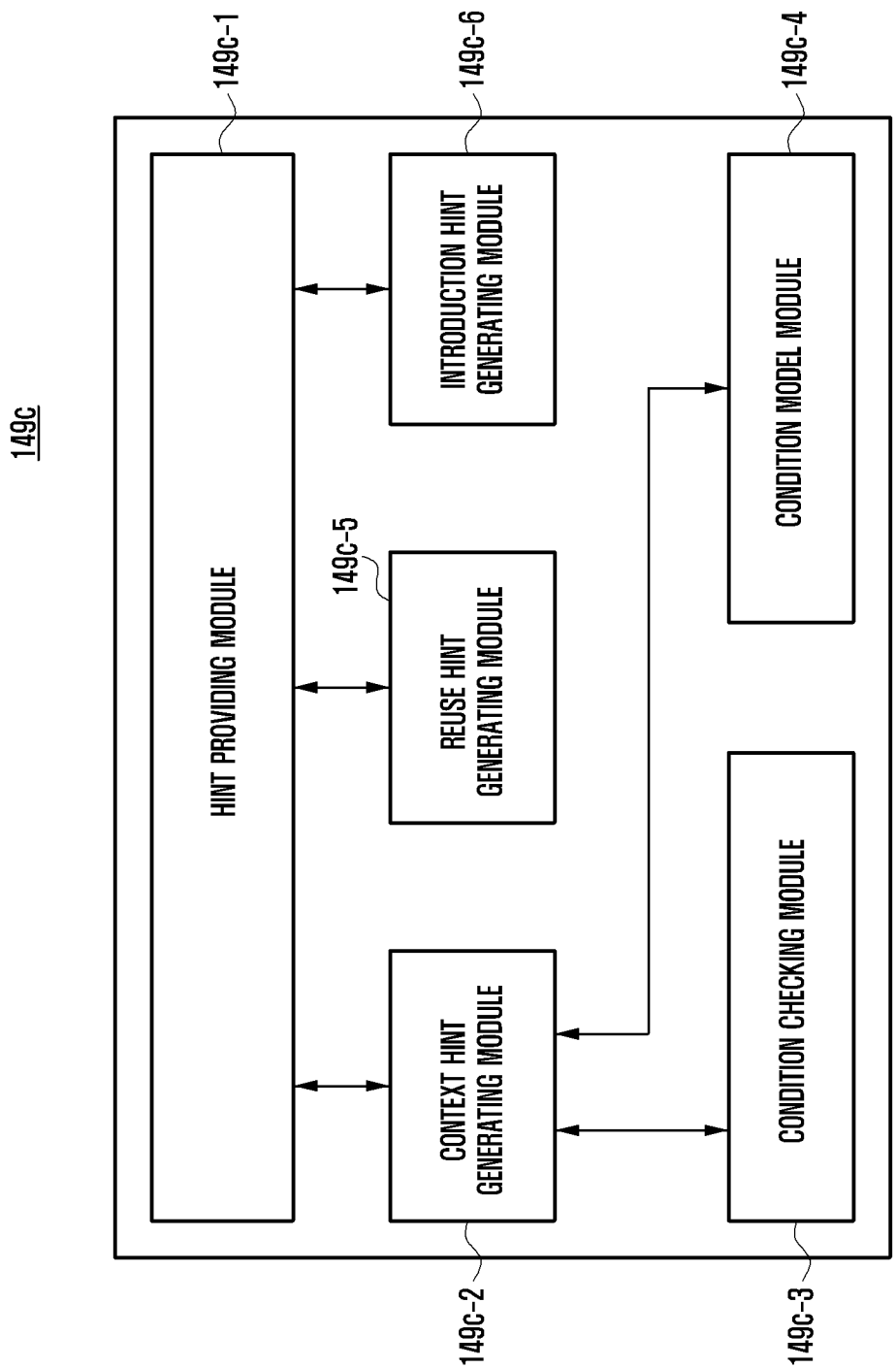
FIG. 5 is a block diagram illustrating an example suggestion module of the intelligent service module according to an embodiment of the disclosure.

FIG. 5 is a block diagram illustrating an example suggestion module of the intelligent service module according to an embodiment of the disclosure.

With reference to FIG. 5, the suggestion module 149c may include a hint providing module (e.g., including processing circuitry and/or executable program elements) 149c-1, a context hint generating module (e.g., including processing circuitry and/or executable program elements) 149c-2, a condition checking module (e.g., including processing circuitry and/or executable program elements) 149c-3, a condition model module (e.g., including processing circuitry and/or executable program elements) 149c-4, a reuse hint generating module (e.g., including processing circuitry and/or executable program elements) 149c-5, and an introduction hint generating module (e.g., including processing circuitry and/or executable program elements) 149c-6.

In an example embodiment, the processor 150 may invoke the hint providing module 149c-1 to provide a hint to the user. For example, the processor 150 may receive a hint generated by the context hint generating module 149c-2, the reuse hint generating module 149c-5, or the introduction hint generating module 149c-6 via the hint providing module 149c-1, and provide the hint to the user.

In an example embodiment, the processor 150 may invoke the condition checking module 149c-3 or the condition model module 149c-4 to generate a hint that can be recommended according to the current state. The processor 150 may invoke the condition checking module 149c-3 to receive information on the current state, and may invoke the condition model module 149c-4 to configure a condition model based on the received information. For example, the processor 150 may invoke the condition model module 149c-4 to identify the time, location, situation, or application in use at the time point when the hint is to be provided to the user, and provide the user with hints in order of priority based on the possibility of being used in the corresponding condition.

In an example embodiment, the processor 150 may invoke the reuse hint generating module 149c-5 to generate a hint that can be recommended according to the frequency of use. For example, the processor 150 may invoke the reuse hint generating module 149c-5 to generate a hint based on the usage pattern of the user.

In an example embodiment, the introduction hint generating module 149c-6 may generate a hint for introducing a new function or a function frequently used by another user to the user. For example, hints to introduce a new function may include an introduction to the intelligent agent 145 (e.g., way of operation).

In another embodiment, the context hint generating module 149c-2, the condition checking module 149c-3, the condition model module 149c-4, the reuse hint generating module 149c-5, and the introduction hint generating module 149c-6 of the suggestion module 149c may be included in the personalization information server 300. In this case, the processor 150 may invoke the hint providing module 149c-1 of the proposal module 149c to receive a hint from the context hint generating module 149c-2, the reuse hint generating module 149c-5, or the introduction hint generating module 149c-6 of the personalization information server 300 and to provide the received hint to the user.

In an example embodiment, the electronic device 100 may provide a hint according to the following example series of operations. For example, upon receiving a hint providing request from the intelligent agent 145, the processor 150 may send a hint generation request to the context hint generating module 149c-2 via the hint providing module 149c-1. Upon receiving the hint providing request, the processor 150 may also receive information corresponding to the current state from the context module 149a and the persona module 149b via the condition checking module 149c-3. The processor 150 may transfer the received information to the condition model module 149c-4 via the condition checking module 149c-3, and may prioritize the hints to be provided to the user in order of applicability to the above condition based on the information provided through the condition model module 149c-4. The processor 150 may identify the above condition and generate a hint corresponding to the current state through the context hint generating module 149c-2. The processor 150 may forward the hint generated through the context hint generating module 149c-2 to the hint providing module 149c-1. The processor 150 may sort the hints according to a specified rule via the hint providing module 149c-1 and transmit the sorted hints to the intelligent agent 145.

In an example embodiment, the processor 150 can generate plural context hints through the hint providing module 149c-1 and assign a priority to the plural context hints according to a specified rule. The processor 150 may provide the user with a high-priority hint first through the hint providing module 149c-1 among the plural context hints.

In an example embodiment, the electronic device 100 may suggest a hint according to the frequency of use. For example, upon receiving a hint providing request from the intelligent agent 145, the processor 150 may transmit a hint generation request to the reuse hint generating module 149c-5 via the hint providing module 149c-1. Upon receiving the hint providing request, the processor 150 may receive user information from the persona module 149b via the reuse hint generating module 149c-5. For example, the processor 150 may receive a path rule, parameters included in the path rule, information on the application execution frequency, and information on the time and space where an application is used, which are included in the user preference information of the persona module 149b, through the reuse hint generating module 149c-5. The processor 150 may generate a hint corresponding to the user information received through the reuse hint generating module 149c-5. The processor 150 may forward the hint generated through the reuse hint generating module 149c-5 to the hint providing module 149c-1. The processor 150 may sort the hints via the hint providing module 149c-1 and forward the sorted hints to the intelligent agent 145.

In an example embodiment, the electronic device 100 may suggest a hint about a new function. For example, upon receiving a hint providing request from the intelligent agent 145, the processor 150 may send a hint generation request to the introduction hint generating module 149c-6 via the hint provision module 149*c*-1. The processor 150 may transmit an introduction hint providing request to the proposal server 400 via the introduction hint generating module 149*c*-6, and receive information about the function to be introduced from the suggestion server 400. The suggestion server 400 may store information about, for example, a function to be introduced, and the hint list for the function to be introduced may be updated by the service operator. The processor 150 may forward the hint generated through the introduction hint generating module 149*c*-6 to the hint providing module 149*c*-1. The processor 150 may sort the hints via the hint providing module 149*c*-1 and forward the sorted hints to the intelligent agent 145.

Consequently, the processor 150 may provide a hint, which is generated by the context hint generating module 149*c*-2, the reuse hint generating module 149*c*-5, or the introduction hint generating module 149*c*-6, to the user through the suggestion module 149*c*. For example, the processor 150 may output the generated hints to the application associated with the intelligent agent 145 via the suggestion module 149*c*, and receive a user input for selecting the hints through the application.

Figure 6:
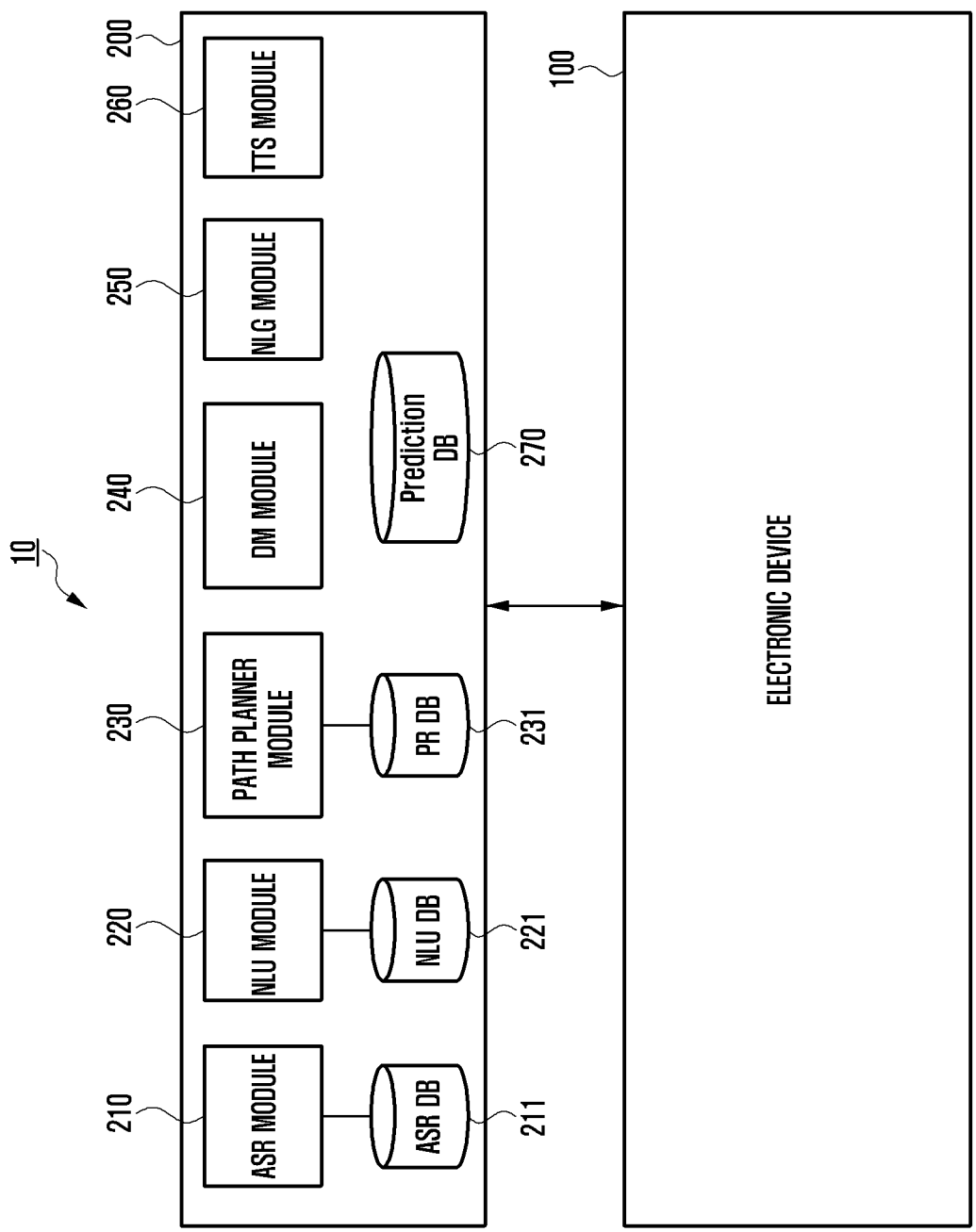
FIG. 6 is a block diagram illustrating an example intelligent server in the integrated intelligent system according to an embodiment of the disclosure.

FIG. 6 is a block diagram illustrating an example intelligent server in the integrated intelligent system according to an embodiment of the disclosure.

With reference to FIG. 6, the intelligent server 200 may include an automatic speech recognition (ASR) module (e.g., including processing circuitry and/or executable program elements) 210, a natural language understanding (NLU) module (e.g., including processing circuitry and/or executable program elements) 220, a path planner module (e.g., including processing circuitry and/or executable program elements) 230, a dialogue manager (DM) module (e.g., including processing circuitry and/or executable program elements) 240, a natural language generator (NLG) module (e.g., including processing circuitry and/or executable program elements) 250, a text-to-speech (TTS) module (e.g., including processing circuitry and/or executable program elements) 260, and a prediction database 270.

In an example embodiment, the intelligent server 200 may include a communication circuit, a memory, and a processor. The processor may execute the instructions stored in the memory to drive the ASR module 210, the NLU module 220, the path planner module 230, the DM module 240, the NLG module 250, and the TTS module 260. The intelligent server 200 can send and receive data (or information) to and from an external electronic device (e.g., electronic device 100) through the communication circuit.

The natural language understanding module 220 or the path planner module 230 of the intelligent server 200 may generate a path rule.

In an example embodiment, the automatic speech recognition module 210 may convert a user input received from the electronic device 100 into text data.

In an example embodiment, the automatic speech recognition module 210 may convert a user input received from the electronic device 100 into text data. For example, the automatic speech recognition module 210 may include an utterance recognition module. The utterance recognition module may include an acoustic model and a language model. For example, the acoustic model may include information related to phonation, and the language model may include information on phonemes and combinations thereof. The utterance recognition module may convert a user utterance into text data based on the information about phonation and phonemes. The information about the acoustic model and the language model may be stored in, for example, an automatic speech recognition database (ASR DB) 211.

In an example embodiment, the natural language understanding module 220 can perform syntactic analysis or semantic analysis to identify the user's intention. Through grammatical analysis, the user input can be divided into grammatical units (e.g., words, phrases, or morphemes), and grammatical elements of the divided units can be identified. Semantic analysis may be performed through semantic matching, rule matching, or formula matching. Thereby, the natural language understanding module 220 may identify the domain and intention of a user input and parameters (or slots) necessary for representing the intention.

In an example embodiment, the natural language understanding module 220 may determine the user's intention and parameters using matching rules classified by domain, intention, and parameter (or slot) necessary for identifying the intention. For example, one domain (e.g., alarm) may include a plurality of intentions (e.g., turning on the alarm, and turning off the alarm), and one intention may include a plurality of parameters (e.g., time, number of repetitions, and alarm sound). A plurality of rules may include, for example, one or more mandatory parameters. The matching rules may be stored in a natural language understanding database (NLU DB) 221.

In an example embodiment, the natural language understanding module 220 may recognize the meaning of a word extracted from the user input based on the linguistic feature (e.g., grammatical element) such as morphemes or phrases, and match the recognized meaning of the word with the domain and intention to determine the user's intention. For example, the natural language understanding module 220 can determine the user intention by calculating how many words extracted from the user input are included in each domain and intention. In an example embodiment, the natural language understanding module 220 may determine the parameters of the user input using words that are the basis for identifying the intention. The natural language understanding module 220 can determine the user's intention using the natural language understanding database 221 in which the linguistic features for identifying the intention of the user input are stored. The natural language understanding module 220 can determine the user's intention using, for example, a personal language model (PLM). For example, the natural language understanding module 220 may determine the user's intention based on personal information (e.g., contact list, or music list). The personal language model may be stored in, for example, the natural language understanding database 221, for example. In an example embodiment, the automatic speech recognition module 210 as well as the natural language understanding module 220 can recognize a voice input of the user by referring to the personal language model stored in the natural language understanding database 221.

In an example embodiment, the natural language understanding module 220 may generate the path rule based on the intention and parameters of the user input. For example, the natural language understanding module 220 may select an application to be executed and determine an action to be performed in the selected application based on the intention of the user input. The natural language understanding module 220 can generate a path rule by determining a parameter corresponding to the determined action. For example, the path rule generated by the natural language understanding module 220 may include information about the application to be executed, the action to be performed in the application (e.g., one or more states), and parameters necessary for performing the action.

In an example embodiment, the natural language understanding module 220 may generate one or more path rules based on the intention and parameters of the user input. For example, the natural language understanding module 220 may receive a path rule set corresponding to the electronic device 100 from the path planner module 230, and determine the path rule by mapping the intention and parameters of the user input to the received path rule set.

In another embodiment, the natural language understanding module 220 may generate one or more path rules by determining the application to be executed, the action to be performed in the app, and parameters necessary to perform the action based on the intention and parameters of the user input. For example, the natural language understanding module 220 may generate a path rule by representing the application to be executed and the actions to be performed in the form of an ontology model or a graph model according to the intention of the user input based on the information about the electronic device 100. The generated path rule may be stored in, for example, a path rule database (PR DB) 231 through the path planner module 230. The generated path rule may be added to the path rule set of the path rule database 231.

In an example embodiment, the natural language understanding module 220 can select at least one path rule among the plural generated path rules. For example, the natural language understanding module 220 may select an optimal path rule among the plural path rules. As another example, the natural language understanding module 220 may select plural path rules when only some actions are specified based on the user utterance. The natural language understanding module 220 may select one of the plural path rules based on an additional user input.

In an example embodiment, the natural language understanding module 220 may send a path rule to the electronic device 100 as a response to a user input. For example, the natural language understanding module 220 may transmit one path rule corresponding to a user input to the electronic device 100. As another example, the natural language understanding module 220 may transmit multiple path rules corresponding to a user input to the electronic device 100. Plural path rules may be generated by the natural language understanding module 220, for example, when only some actions are specified based on a user utterance.

In an example embodiment, the path planner module 230 may select at least one of plural path rules.

In an example embodiment, the path planner module 230 may transfer a set of path rules to the natural language understanding module 220. The path rules of a path rule set may be stored in the form of a table in the path rule database (PR DB) 231 attached to the path planner module 230. For example, the path planner module 230 may transmit the natural language understanding module 220 a path rule set corresponding to the information about the electronic device 100 (e.g., OS, and applications) received from the intelligent agent 145. The tables in the path rule database 231 may be stored on a domain or domain version basis.

In an example embodiment, the path planner module 230 may select one or more path rules from the path rule set and transmit the selected path rules to the natural language understanding module 220. For example, the path planner module 230 may select one or more path rules by matching the intention and parameters of the user with the path rule set corresponding to the electronic device 100 and transmit the selected path rules to the natural language understanding module 220.

In an example embodiment, the path planner module 230 may generate one or more path rules according to the user intention and parameters. For example, the path planner module 230 may generate one or more path rules by determining the application to be executed and the action to be executed in the application based on the user's intention and parameters. The path planner module 230 may store the generated path rule in the path rule database 231.

In an example embodiment, the path planner module 230 may store the path rule generated by the natural language understanding module 220 in the path rule database 231. The generated path rule may be added to a path rule set stored in the path rule database 231.

In an example embodiment, the table stored in the path rule database 231 may include a plurality of path rules or path rule sets. The plurality of path rules or path rule sets may reflect the class, version, type, or characteristic of the device that processes the path rule.

In an example embodiment, the dialogue manager module 240 can determine whether the user's intention identified by the natural language understanding module 220 is clear. For example, the dialogue manager module 240 may determine whether the user's intention is clear based on whether the information on the parameters is sufficient. The dialogue manager module 240 may determine whether the parameters identified by the natural language understanding module 220 are sufficient to perform a specific task. If the intention of the user is not clear, the dialogue manager module 240 may perform a feedback process to request the user for necessary information. For example, the dialogue manager module 240 may perform a feedback process to request information about parameters for identifying the user's intention.

In an example embodiment, the dialogue manager module 240 may include a content provider module. If an operation can be performed based on the intention and parameters identified by the natural language understanding module 220, the content provider module can generate the result of performing the task corresponding to the user input. The dialogue manager module 240 may forward the results generated by the content provider module to the electronic device 100 as a response to a user input.

In an example embodiment, the natural language generator (NLG) module 250 can change designated information into a text form. The information changed in a text form may be in the form of a natural language utterance. The designated information may be, for example, information about additional input, information indicating completion of an operation corresponding to the user input, or information requesting additional input of the user (e.g., feedback information for user input). The information in a text form may be transmitted to the electronic device 100, which outputs it on the display 120, or may be transmitted to the text-to-speech module 260, which changes it into a voice form.

In an example embodiment, the text-to-speech module 260 may convert text information to voice information. The text-to-speech module 260 may receive text information from the natural language generator module 250, convert the text information into voice information, and transmit the voice information to the electronic device 100. The electronic device 100 may output the voice information to the speaker 130.

In an example embodiment, the natural language understanding module 220, the path planner module 230, and the dialogue manager module 240 may be implemented as a single module. For example, the natural language understanding module 220, the path planner module 230, and the dialogue manager module 240 may be implemented as a single module, determine the user's intention and parameters, and generate a response (e.g., path rule) corresponding to the user's intention and parameters. The generated response may be transmitted to the electronic device 100.

In an example embodiment, the prediction database 270 may store information contained in the voice data collected from the electronic device 100 prior to receiving the wake-up utterance. For example, the prediction database 270 may store text data, speaker information, or keywords received from the automatic speech recognition module 210. The prediction database 270 may store path rules generated by the path planner module 230, user-specific weight information related to the path rule, information about the applications 141 and 143, and status information of the applications 141 and 143.

Figure 7:
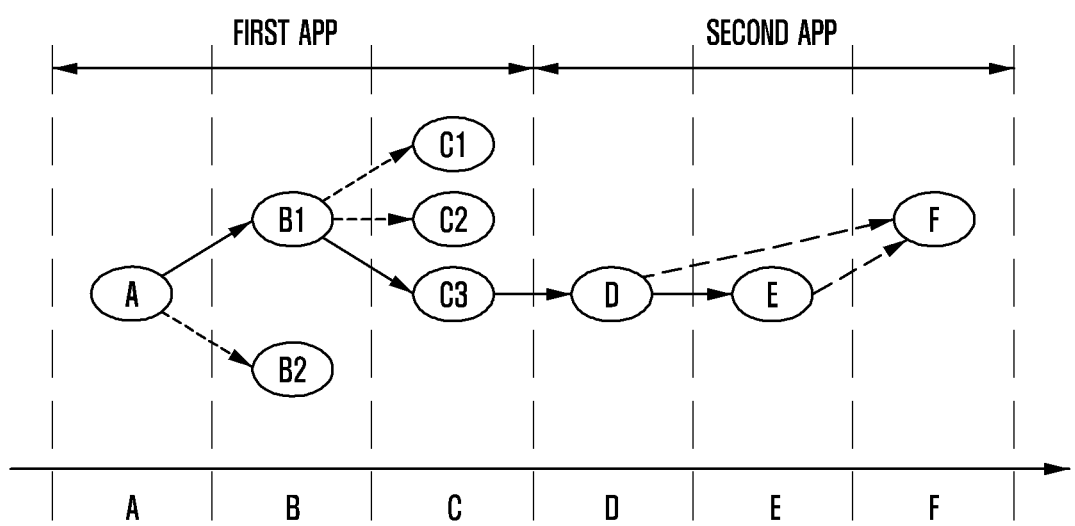
FIG. 7 is a diagram illustrating an example scheme for a natural language understanding (NLU) module to generate a path rule according to an embodiment of the disclosure.

FIG. 7 is a diagram illustrating an example scheme for a path planner module to generate a path rule according to an embodiment of the disclosure.

With reference to FIG. 7, in an example embodiment, the natural language understanding module 220 may divide the function of an application into one or more actions (e.g., state A, B1, B2, C1, C2, C3, D, E and state F) and store the same in the path rule database 231. For example, the natural language understanding module 220 may store in the path rule database 231 a path rule set including plural path rules (A-B1-C1, A-B1-C2, A-B1-C3-D-F, A-B1-C3-D-E-F, A-B2) divided into one or more actions (e.g., states).

In an example embodiment, the path rule database 231 of the path planner module 230 may store a set of path rules for performing the function of an application. The path rule set may include multiple path rules each including a plurality of actions (e.g., a sequence of states). In the path rule, a plurality of actions to be performed according to corresponding input parameters may be arranged in sequence. The plural path rules may be represented in the form of an ontology model or a graph model and stored in the path rule database 231.

In an example embodiment, the natural language understanding module 220 can select an optimal or preferred path rule (A-B1-C3-D-F) among the plural path rules (A-B1-C1, A-B1-C2, A-B1-C3-D-F, A-B1-C3-D-E-F, A-B2) corresponding to the intention and parameters of the user input.

In an example embodiment, if there is no path rule perfectly matching the user input, the natural language understanding module 220 may transmit plural path rules to the electronic device 100. For example, the natural language understanding module 220 may select a path rule (e.g., A-B1) partially matching the user input. The natural language understanding module 220 may select one or more path rules (e.g., A-B1-C1, A-B1-C2, A-B1-C3-D-F, A-B1-C3-D-E-F) containing the path rule (e.g., A-B1) partially matching the user input and transmit the selected path rules to the electronic device 100.

In an example embodiment, the natural language understanding module 220 may select one of plural path rules based on an additional input from the electronic device 100 and transmit the selected path rule to the electronic device 100. For example, the natural language understanding module 220 may select one path rule (e.g., A-B1-C3-D-F) among the plural path rules (e.g., A-B1-C1, A-B1-C2, A-B1-C3-D-F, A-B1-C3-D-E-F) according to an additional user input (e.g., input for selecting C3) from the electronic device 100, and transmit the selected path rule to the electronic device 100.

In another embodiment, the natural language understanding module 220 may determine a user's intention and parameters corresponding to an additional user input (e.g., input for selecting C3) from the electronic device 100, and transmit the determined user intention and parameters to the electronic device 100. The electronic device 100 may select one path rule (e.g., A-B1-C3-D-F) among the plural path rules (e.g., A-B1-C1, A-B1-C2, A-B1-C3-D-F, A-B1-C3-D-E-F) according to the received user intention and parameters.

Consequently, the electronic device 100 can complete the operation of the application 141 or 143 using the selected path rule.

In an example embodiment, when the intelligent server 200 receives a user input that lacks information, the natural language understanding module 220 may generate a path rule partially matching the user input. For example, the natural language understanding module 220 may send the partially-matched path rule to the intelligent agent 145. The processor 150 may invoke the intelligent agent 145 to receive the path rule and forward the partially-matched path rule to the execution manager module 147. The processor 150 may execute the first application 141 according to the path rule through the execution manager module 147. While running the first application 141 through the execution manager module 147, the processor 150 may transmit information about the missing parameters to the intelligent agent 145. The processor 150 may request the user for additional input based on the information on the missing parameters via the intelligent agent 145. When an additional input is received from the user via the intelligent agent 145, the processor 150 may send the additional user input to the intelligent server 200 for processing. The natural language understanding module 220 may generate an additional path rule based on the user intention and parameters of the additional user input and transmit the generated path rule to the intelligent agent 145. The processor 150 may execute the second application 143 by sending the path rule to the execution manager module 147 via the intelligent agent 145.

In an example embodiment, if a user input lacking some information is received by the intelligent server 200, the natural language understanding module 220 may send a request for user information to the personalization information server 300. The personalization information server 300 may transmit the user information stored in the persona database to the natural language understanding module 220. The natural language understanding module 220 can use this user information to select a path rule corresponding to the incomplete user input. Hence, although a user input lacking some information is received by the intelligent server 200, the natural language understanding module 220 may determine the path rule corresponding to the user input by obtaining further information as a response to an additional input request or using the stored user information.

In an example embodiment, Table 1 below shows an example of a path rule associated with a task requested by the user.

TABLE 1

| Path rule ID | State | parameter |
|---|---|---|
| Gallery_101 | pictureView(25) | NULL |
| | searchView(26) | NULL |
| | searchViewResult(27) | Location, time |
| | SearchEmptySelectedView(28) | NULL |

TABLE 1-continued

| Path rule ID | State | parameter |
|---|---|---|
| | SearchSelectedView(29)<br>CrossShare(30) | ContentType, selectall<br>anaphora |

With reference to Table 1, the path rule generated or selected by the intelligent server (intelligent server 200 in FIG. 1) according to a user utterance (e.g., "share photo") may include at least one state (25, 26, 27, 28, 29 or 30). For example, the at least one state (e.g., one of operating states of the electronic device) may correspond to at least one of photo application invocation (pictureView 25), photo search execution (searchView 26), search result screen display (searchViewResult 27), search result screen display without selected photo (SearchEmptySelectedView) 28, search result screen display with at least one selected photo (SearchSelectedView 29), or sharing application selection screen output (CrossShare 30).

In an example embodiment, the parameter information of the path rule may correspond to at least one state. For example, parameter information may correspond to the state "search result screen display with at least one selected photo" (29).

The task requested by the user (e.g., "share photo!") can be performed by processing the path rule including a sequence of states 25, 26, 27, 28 and 29.

Figure 8:
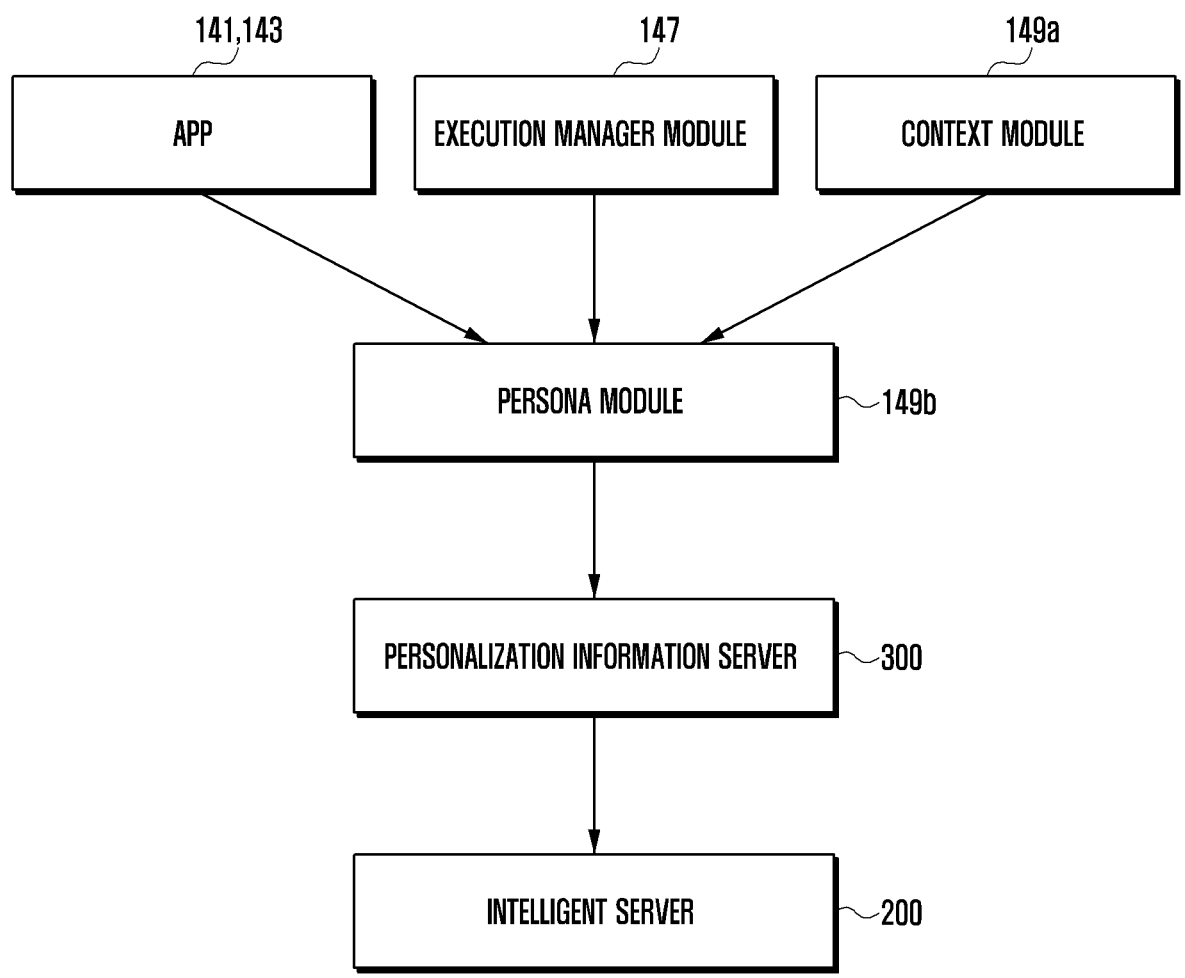
FIG. 8 is a diagram illustrating an example persona module of the intelligent service module that manages information on the user according to an embodiment of the disclosure.

FIG. 8 is a diagram illustrating an example persona module of the intelligent service module that manages information on the user according to an embodiment of the disclosure.

With reference to FIG. 8, the processor 150 may receive information about the electronic device 100 from the applications 141 and 143, the execution manager module 147, or the context module 149*a* through the persona module 149*b*. The processor 150 may store information on the results of the operations 141*b*, 143*b* in the applications collected through the execution manager module 147 in the action log database. The processor 150 may store information on the current state of the electronic device 100 in the context database via the context module 149*a*. The processor 150 may receive stored information from the action log database or the context database via the persona module 149*b*. The data stored in the action log database and the context database may be analyzed by, for example, an analysis engine and the analysis result may be sent to the persona module 149*b*.

In an example embodiment, the processor 150 may transmit information received from the applications 141 and 143, the execution manager module 147 or the context module 149*a* to the suggestion module 149*c* via the persona module 149*b*. For example, the processor 150 may transfer the data stored in the action log database or the context database to the suggestion module 149*c* via the persona module 149*b*.

In an example embodiment, the processor 150 may transmit information received from the applications 141 and 143, the execution manager module 147 or the context module 149*a* to the personalization information server 300 through the persona module 149*b*. For example, the processor 150 may periodically transmit accumulated data stored in the action log database or the context database to the personalization information server 300 via the persona module 149*b*.

In an example embodiment, the processor 150 may transfer the data stored in the action log database or the context database to the suggestion module 149*c* via the persona module 149*b*. The user information generated through the persona module 149*b* may be stored in the persona database. The persona module 149*b* may periodically transmit the user information stored in the persona database to the personalization information server 300. The information sent to the personalization information server 300 via the persona module 149*b* may be stored in the persona database. The personalization information server 300 can use the information stored in the persona database to infer user information needed by the intelligent server 200 for generating a path rule.

In an example embodiment, the user information inferred based on the information received through the persona module 149*b* may include profile information or preference information. The profile information or the preference information may be deduced from the user's account and accumulated information.

The profile information may include personal information of the user. For example, the profile information may include demographic information of the user. The demographic information may include, for example, and without limitation, information about the user's gender, age, etc. The profile information may include life event information. The life event information may be inferred by, for example, comparing log information with a life event model, and may be reinforced by analyzing behavior patterns. As another example, the profile information may include interest information. The interest information may include, for example, information about shopping items of interest or areas of interest (e.g., sports, or politics). As another example, the profile information may include activity area information. The activity area information may include information on, for example, the house or the workplace. The information on the activity area may include information on the place where a priority is assigned based on the cumulative stay time and the number of visits as well as information on the location of the place. As another example, the profile information may include activity time information. The activity time information may include, for example, information about the wakeup time, commuting time, or sleeping time. The information on the commuting time can be inferred based on the activity area information (e.g., information on the home and workplace). The information about the sleeping time can be inferred based on the unused time of the electronic device 100.

The preference information may include information on the preferences of the user. For example, the preference information may include information about application preferences. The application preferences can be deduced, for example, through the usage history of applications (e.g., usage time and place records). The application preferences may be used to determine an application to be executed according to the user's current state (e.g., time, or place). As another example, the preference information may include information about contact preferences. The contact preferences can be deduced by analyzing information on the frequency of usage (e.g., frequency of contact usage by time or place). The contact preferences can be used to determine the contact to use according to the current state of the user (e.g., contacts including identical names). As another example, the preference information may include information about settings. The setting information may be inferred by analyzing the usage frequency of specific setting values (e.g., usage frequency of a setting value by time or place). The setting information may be used to determine a specific setting value according to the user's current state (e.g., time, place, or situation). As another example, the preference information may include preference information about specific places. The place preferences can be deduced, for example, through records of visits to specific places (e.g., frequency of visits by time). The place preferences may be used to determine the place being visited based on the user's current state (e.g., time). As another example, the preference information may include information on command preferences. The command preferences may be inferred through, for example, the usage frequency of specific commands (e.g., usage frequency by time or location). The command preferences may be used to determine the command pattern to be used according to the user's current state (e.g., time or location). For example, the command preference information may include information about the most frequently selected menu in the current state of the application in execution, which may be obtained by analyzing the log information.

According to various embodiments of the disclosure, the electronic device (e.g., electronic device 100 in FIG. 2) may include: a housing; a microphone disposed inside the housing and at least partially exposed through a first portion of the housing; at least one speaker (e.g., speaker 130 in FIG. 2) disposed inside the housing and at least partially exposed through a second portion of the housing; a communication circuit disposed inside the housing; a processor (e.g., processor 150 in FIG. 2) disposed inside the housing and operatively connected with the microphone, the speaker 130, and the communication circuit; and a memory (e.g., memory 140 in FIG. 2) disposed inside the housing, operatively connected to the processor 150, and configured to store a plurality of application programs. The memory may store instructions that, when executed, cause the processor 150 to control the electronic device to: collect voice data of the user based on a specified condition prior to receiving a wake-up utterance invoking a voice-based intelligent assistant service; transmit the collected voice data to an external server (e.g., intelligent server 200 in FIG. 2) and request the external server 200 to generate a prediction database (e.g., prediction database 270 in FIG. 6) configured to predict the intention of the user; and output, after receiving the wake-up utterance, a recommendation service related to the intention of the user based on at least one piece of information included in the prediction database 270.

The instructions may be configured to cause the processor 150 to: calculate (e.g., determine), upon reception of the wake-up utterance, a difference between a first time point at which collection of user's voice data is started and a second time point at which the wake-up utterance is received; and determine a weight for selecting the recommendation service based on a magnitude of the difference.

The instructions may be configured to cause the processor 150 to: assign a higher weight to the information on the speaker of the wake-up utterance if the difference is greater than a specified value; and assign a higher weight to the completeness of the command stored in the prediction database 270 if the difference is less than the specified value.

The instructions may be configured to cause the processor 150 to: check whether a keyword is included along with the wake-up utterance when the wake-up utterance is received; and determine, if a keyword is included, the weight for selecting the recommendation service based on the keyword.

The electronic device 100 may further include an LED illumination 1003, and the instructions may be configured to cause the processor 150 to control the electronic device to vary at least one of the color, length, or thickness of the LED illumination 1003 based on an understanding of the context of the user's conversation.

The instructions may be configured to cause the processor 150 to: determine, if the amount of parameter information obtained from conversations of the user exceeds a specified value, a recommendation service based on the obtained parameter information; and control the LED illumination 1003 to produce a color corresponding to the determined recommendation service. The specified condition may correspond to at least one of voice input is greater than or equal to a specified value, voice input is present after a given duration without voice input, voice input becomes less than the specified value and then becomes greater than or equal to the specified value, physical button input is received from the user, a specified character is input from the user, voice input is received from multiple users, voice input is received from a given number or more users, there are multiple electronic devices in a designated space, there are multiple user accounts registered in the electronic device 100, the time corresponds to a schedule registered in the electronic device 100, or the electronic device 100 is located in a designated space and the time corresponds to a pre-registered schedule.

The instructions may be configured to cause the processor 150 to analyze the obtained speech data to recognize the speaker and construct the prediction database 270 for each recognized speaker.

The instructions may be configured to cause the processor 150 to output, if the user intention is not clear based on at least one piece of information included in the prediction database 270 after reception of the wake-up utterance, a UI (user interface) or UX (user experience) for requesting additional information.

The instructions may be configured to cause the processor 150 to transmit the collected voice data to the external server 200 on a designated unit basis and receive a path rule from the external server 200 as a response to the transmitted voice data, wherein the path rule may include information about a sequence of states of the electronic device 100 for performing a task related to the intention of the user.

FIG. 9 is a diagram illustrating example operations of the integrated intelligent system according to an embodiment of the disclosure.

With reference to FIG. 9, in an example embodiment, the integrated intelligent system (e.g., system 10 in FIG. 1) may include an electronic device (e.g., electronic device 100 in FIG. 2), and an intelligent server (e.g., server 200 in FIG. 6) connected with the electronic device 100 through a network.

In an example embodiment, the electronic device 100 may be an audio output device. For example, the electronic device 100 may include an artificial intelligence speaker.

In an example embodiment, the electronic device 100 may collect conversations of the user in advance before receiving a wake-up utterance from the user, recognize the collected conversations, and construct a prediction database 270 containing information regarding the intention of the user.

In an example embodiment, upon receiving the wakeup utterance from the user after constructing the prediction database 270, the electronic device 100 may refer to the prediction database 270 to recommend an action, a command, or a service associated with the conversations collected before reception of the wake-up utterance. For example, if the user has a conversation related to food delivery before the wake-up utterance, the electronic device 100 may recommend an action or command related to a food delivery order in response to receiving the wake-up utterance. In another embodiment, in addition to recommending an action or command in response to user's invocation, the electronic device 100 may perform a search function associated with the recommended action or command and provide the found result to the user. For example, in addition to recommending an action or command related to a food delivery order, the electronic device 100 may perform a search for deliverable foods, discount information, or deliverable time, and provide the searched results.

In an example embodiment, the prediction database 270 may be configured in the intelligent server 200. For example, the intelligent server 200 may include the prediction database 270 operating in conjunction with the electronic device 100, and may further include the path rule database (PR DB) 231 or the natural language understanding module 220 to compose a command related to the intention of the user. In an example embodiment, the intelligent server 200 may further include at least one of the components of the intelligent server 200 shown in FIG. 6 to compose a command related to the user's intention. In an example embodiment, the prediction database 270 may be configured in the intelligent server 200 and in the electronic device 100 as well. For example, if the electronic device 100 includes a prediction database 270, the prediction database 270 of the electronic device 100 may be configured to interwork with the prediction database 270 of the intelligent server 200. In an example embodiment, the prediction database 270 may include keywords related to command completeness, speaker information, conversation time, or context. In an example embodiment, the prediction database 270 may include information needed to assign a weight for selecting a service (operation) upon receiving the wake-up utterance from the user.

In various embodiments, the electronic device 100 collects conversations of the user prior to reception of a wake-up utterance, predicts the intention or command of the user, and suggest an action or a service to the user based on the predicted result. Hence, the electronic device 100 can provide both a rapid and accurate response and a response based on additional information. In addition, when the user uses the voice-based artificial intelligence service through the electronic device 100, the user convenience can be increased by reducing the number or amount of voice inputs.

Next, a description is given of a speech-recognition artificial intelligence service that predicts the intention of the user of the electronic device 100 in advance with reference to FIG. 9.

In an example embodiment, as indicated by indicia 1, the electronic device 100 including an artificial intelligence speaker having a speech recognition function can collect conversations of the user before receiving a wake-up utterance from the user. For example, the electronic device 100 may collect conversations between user A and user B located near the electronic device 100 prior to receiving a wake-up utterance.

In an example embodiment, as indicated by indicia 2, the electronic device 100 may transmit the collected conversations to the intelligent server 200, and the intelligent server 200 may analyze the received conversations to collect information useful to determine the intention of the user and construct a prediction database 270 with the collected information. For example, the electronic device 100 may assist the intelligent server 200 in constructing the prediction database 270.

In an example embodiment, as indicated by indicia 3, the electronic device 100 may receive a wake-up utterance from the user. For example, the electronic device 100 may receive a preset wake-up utterance "hi Bixby!!" from the user.

In an example embodiment, as indicated by indicia 4, the electronic device 100 may provide an artificial intelligence service in response to the wake-up utterance. For example, in response to the wake-up utterance, the electronic device 100 may refer to the prediction database 270 to recommend an action, a command or a service associated with the user conversations collected before reception of the wake-up utterance. For example, the electronic device 100 may determine the weight for selecting a recommendation service based on the type of the wake-up utterance, the time the wake-up utterance is received, or the user having produced the wake-up utterance, and may provide a recommendation service based on the determined weight. The weight determination will be described in detail later with reference to FIG. 13.

Figure 10A:
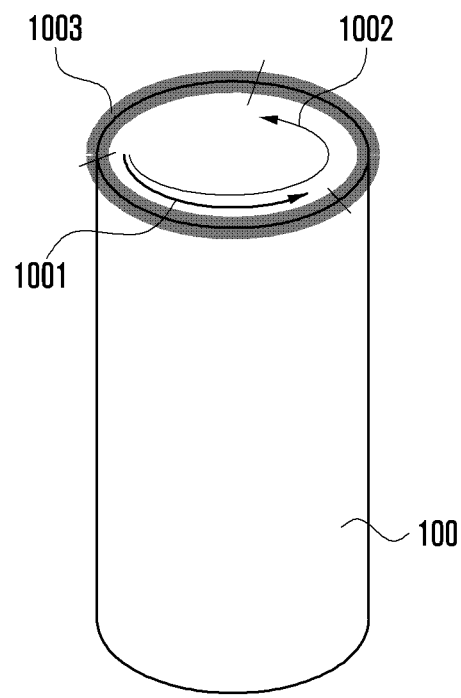
FIGS. 10A and 10B are diagrams illustrating examples of the state indication of the electronic device according to an embodiment of the disclosure.
Figure 10B:
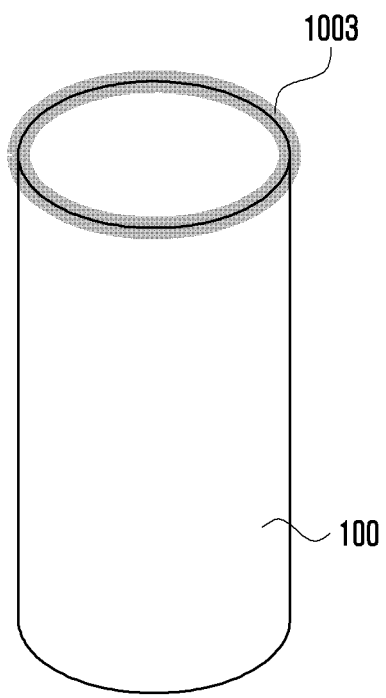

FIGS. 10A and 10B are diagrams illustrating examples of the state indication of the electronic device according to an embodiment of the disclosure.

With reference to FIGS. 10A and 10B, in an example embodiment, the electronic device (e.g., electronic device 100 in FIG. 2) may provide a user interface (UI) or a user experience (UX) in relation to the state of collecting user conversations prior to reception of a wake-up utterance, or the state of providing a recommendation service in response to the wake-up utterance. For example, the electronic device 100 may include an LED illumination 1003 disposed on a portion of the housing, and may control the LED illumination 1003 in connection with the state of collecting user conversations or the state of providing a recommendation service. In an example embodiment, the electronic device 100 may control the shape, brightness, intensity, or color of the LED illumination 1003 based on the state of the electronic device 100. In another embodiment, the electronic device 100 may include a display disposed on a portion of the housing, and the electronic device 100 may control the display in relation to the state of collecting user conversations or the state of providing a recommendation service.

In an example embodiment, as shown in FIG. 10A, the electronic device 100 may control the LED illumination 1003 to have a first form according to the state of collecting user conversations, and may vary the length, or thickness of the LED illumination 1003 based on an understanding of the context of the user's conversation. For example, the electronic device 100 may increase the length or thickness of the LED illumination 1003 as the degree of context understanding increases, so that the user can readily recognize how much the electronic device 100 understands the contents of the conversation. In an example embodiment, the electronic device 100 can score the degree of understanding of the context of the user's conversation, and can control the length of the LED illumination 1003 based on the calculated score. For example, the electronic device 100 may control the LED illumination 1003 to have a first length 1001 when the score is relatively low, and may control the LED illumination 1003 to have a second length 1002 longer than the first length 1001 when the score is relatively high.

In an example embodiment, as shown in FIG. 10B, if the context of the user's conversation is fully understood, the electronic device 100 may determine a recommendation service and control the LED illumination 1003 to have a second form, so that the user may recognize that there is a recommendation service. For example, the electronic device 100 may control the LED illumination 1003 to display a first color during the period of collecting user's conversations, and may control the LED illumination 1003 to display a second color after a recommendation service is determined. By viewing the second color of the LED illumination 1003, the user can recognize that there is an artificial intelligence service recommended by the electronic device 100, and the user can then identify the recommendation service by voicing a wake-up utterance. In an example embodiment, the electronic device 100 may determine the completeness of the recommendation service in advance and vary the gradation of the LED illumination 1003 based on the determined result. For example, if the completeness of the recommendation service is high, the electronic device 100 may increase the gradation of the LED illumination 1003. In an example embodiment, the electronic device 100 may determine the completeness of the recommendation service based on the amount of parameter information obtained from the previous conversations. For example, when parameters such as "agent, time, place, target of the action, method of performing the action, or reason of the action" are configured in advance, the electronic device 100 may determine the parameters based on the previous conversations, and may determine that the completeness of the recommendation service is high as the ratio of the determined parameters increases.

Figure 11:
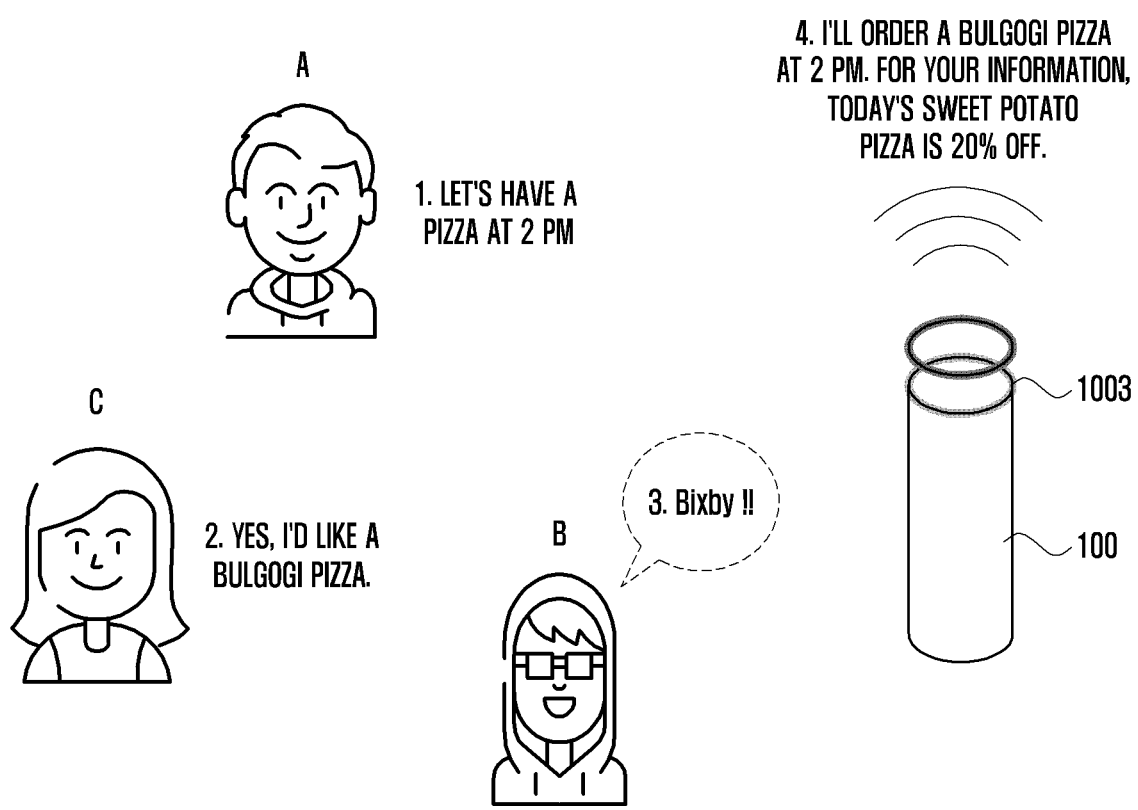
FIG. 11 is a diagram illustrating an example method of the electronic device providing an artificial intelligence service according to an embodiment of the disclosure.

FIG. 11 is a diagram illustrating an example method of the electronic device 100 providing an artificial intelligence service according to an embodiment of the disclosure.

With reference to FIG. 11, in an example embodiment, the electronic device (e.g., electronic device 100 in FIG. 2) may provide a user interface (UI) or a user experience (UX) in various ways in relation to the state of collecting user conversations prior to reception of a wake-up utterance, or the state of providing a recommendation service in response to the wake-up utterance.

In an example embodiment, the electronic device 100 including an artificial intelligence speaker having a speech recognition function can collect conversations of the user before receiving a wake-up utterance from the user. For example, the electronic device 100 may collect conversations between user A, user B and user B located near the electronic device 100 prior to receiving a wake-up utterance in the following way.

As indicated by indicia 1, user A can say, "Let's have a pizza at 2 μm." As indicated by indicia 2, user C can say, "Yes, I'd like a bulgogi pizza."

In an example embodiment, the electronic device 100 may be configured to predict the user's intention by collecting conversations and analyzing the collected conversations prior to receiving a wake-up utterance. For example, to identify the intention of the user, the electronic device 100 may extract parameters from the conversations and store the extracted parameters in the prediction database 270. In an example embodiment, the parameters may correspond to at least one of the agent of the action, the time of the action, the place of the action, the target of the action, a method of performing the action, or a reason of the action. For example, the electronic device 100 may analyze the above conversations and store the parameter information (the expected order time is "2 pm" and the food to be ordered is "bulgogi pizza") in the prediction database 270.

After the above conversations, user B may produce a wake-up utterance (e.g., "Bixby!!") for the electronic device 100. As indicated by indicia 3, user B can say "Bixby!!"

In an example embodiment, in response to receiving the wake-up utterance (e.g., Bixby!!) from user B, the electronic device 100 may search the prediction database 270 for a pizza order and output the search results. For example, the electronic device 100 may not only search for information directly related to the user intention (e.g., "order bulgogi pizza at 2 pm") but also search for information indirectly related to the user intention (e.g., discount information such as "today's sweet potato pizza is 20% off"). As indicated by indicia 4, the electronic device 100 may produce a voice output ("I will order a bulgogi pizza at 2 pm. For your information, today's sweet potato pizza is 20% off."), or provide the corresponding information through the display.

In an example embodiment, the electronic device 100 may control the LED illumination 1003 to display a specified color while providing the recommendation service.

FIG. 12 is a diagram illustrating another example method of the electronic device 100 providing an artificial intelligence service according to an embodiment of the disclosure.

With reference to FIG. 12, in another embodiment, the electronic device (e.g., electronic device 100 in FIG. 2) may provide a recommendation service based on the conversations of users collected prior to receiving the wake-up utterance. For example, the electronic device 100 may collect conversations between user A, user B and user B located near the electronic device 100 prior to receiving the wake-up utterance in the following way. As indicated by indicia 1, user A can say, "Let's have a pizza at 2:00 pm." As indicated by indicia 2, user C can say, "Yes, I'd like a bulgogi pizza."

In an example embodiment, the electronic device 100 may predict the user's intention by collecting conversations and analyzing the collected conversations prior to receiving the wake-up utterance. For example, to identify the intention of the user, the electronic device 100 may extract parameters from the conversations and store the extracted parameters in the prediction database 270. In an example embodiment, the parameters may correspond to at least one of the agent of the action, the time of the action, the place of the action, the target of the action, a method of performing the action, or a reason of the action. For example, the electronic device 100 may analyze the above conversations and store the parameter information (the expected order time is "2 pm" and the food to be ordered is "bulgogi pizza") in the prediction database 270.

In an example embodiment, the electronic device 100 may examine the completeness of the recommendation service and determine the recommendation service if the completeness exceeds a specified value. For example, the electronic device 100 may obtain parameter information from the collected conversations, determine the intention of the user based on the parameter information, and compose a recommendation service related to the user intention in real time. The electronic device 100 may determine the user intention based on the parameter information obtained until the amount of the obtained parameter information exceeds a specified value, and may determine the operation of the electronic device 100 related to the user intention as a recommendation service. For example, the electronic device 100 may store the parameter information (the expected order time is "2 pm" and the food to be ordered is "bulgogi pizza") in the prediction database 270, predict the user intention ("I will order a bulgogi pizza at 2 pm.") from the stored information, and determine the pizza ordering action as a recommendation service based on the prediction result.

In an example embodiment, when the recommendation service is determined, the electronic device 100 may provide a UI (user interface) or UX (user experience) indicating that a recommendation service is present. If the completeness of the recommendation service exceeds the specified value, the electronic device 100 may output a voice message indicating that there is a recommendation service, and the user can reply to the voice message of the electronic device 100. For example, as indicated by indicia 3, the electronic device 100 can output a voice message ("Can I suggest something?") based on the determined recommendation service. As indicated by indicia 4, user B can say "OK" as an affirmative answer. In another embodiment, the electronic device 100 can control the LED illumination 1003 or output a designated sound as a UI (user interface) or UX (user experience) to notify that there is a recommendation service.

In an example embodiment, in response to an affirmative answer such as "OK" from the user, the electronic device 100 may search the prediction database 270 for a pizza order and output the search result. For example, the electronic device 100 may not only search for information directly related to the user intention but also search for information indirectly related to the user intention (e.g., discount information). For example, as indicated by indicia 5, the electronic device 100 may provide information such as "I will order a bulgogi pizza at 2 pm. For your information, today's sweet potato pizza is 20% off."

According to various embodiments of the disclosure, method for operating an electronic device (e.g., electronic device 100 in FIG. 2) capable of providing a recommendation service related to a user's intention in response to a wake-up utterance invoking a voice-based intelligent assistant service may include: collecting voice data of the user based on a specified condition prior to reception of the wake-up utterance; transmitting the collected voice data to an external server (e.g., intelligent server 200 in FIG. 2) and requesting the external server 200 to generate a prediction database (e.g., prediction database 270 in FIG. 6) for predicting the intention of the user; determining, upon receiving the wake-up utterance, a weight based on at least one piece of information stored in the prediction database 270; and determining a recommendation service related to the user's intention based on the weight and outputting the determined recommendation service.

Determining a weight may include: calculating, upon reception of the wake-up utterance, the difference between a first time point at which collection of user's voice data is started and a second time point at which the wake-up utterance is received; assigning a higher weight to the information on the speaker of the wake-up utterance if the difference is greater than a specified value; and assigning a higher weight to the completeness of the command stored in the prediction database 270 if the difference is less than the specified value.

The method may further include: checking whether a keyword is included along with the wake-up utterance when the wake-up utterance is received; and determining, based on a keyword being included, the weight for selecting the recommendation service based on the keyword.

The electronic device 100 may further include an LED illumination 1003, and outputting the determined recommendation service may include varying at least one of the color, length, or thickness of the LED illumination 1003 based on an understanding of the context of the user's conversation. Outputting the determined recommendation service may include: determining, if the amount of parameter information obtained from conversations of the user exceeds a specified value, the recommendation service based on the obtained parameter information; and controlling the LED illumination 1003 to produce a color corresponding to the determined recommendation service.

Figure 13:
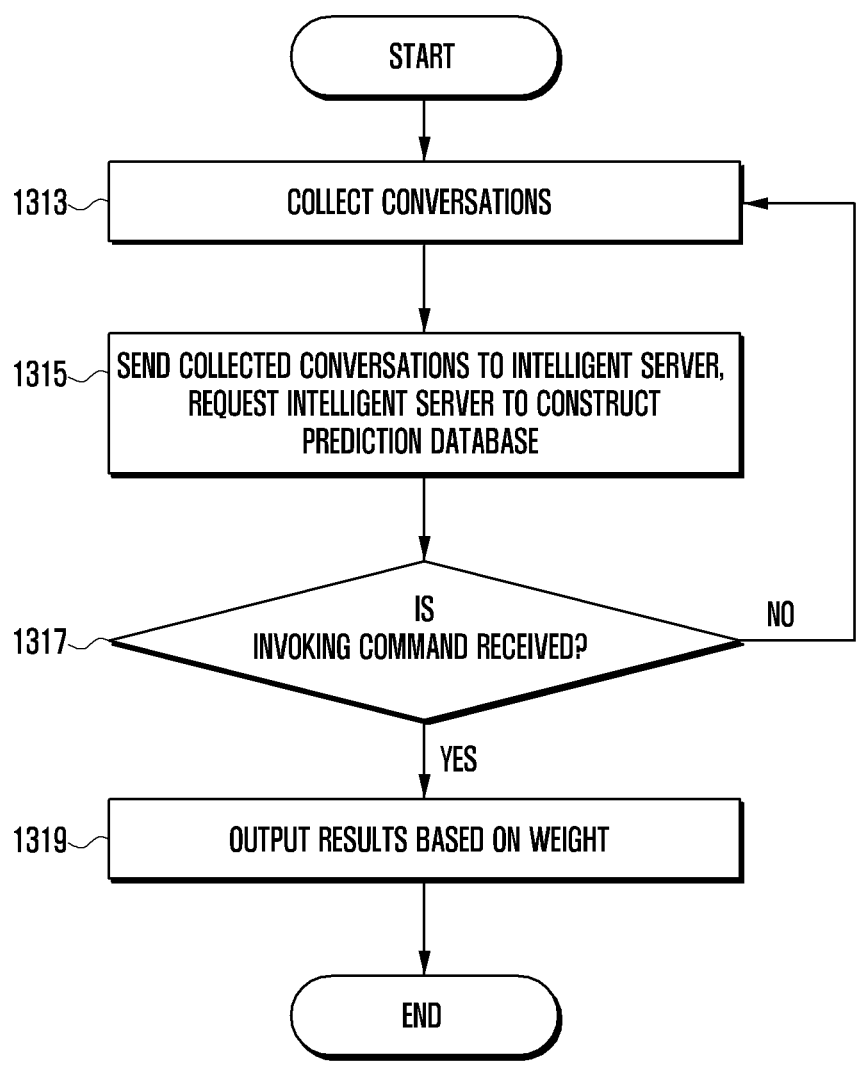
FIG. 13 is a flowchart illustrating example operation of the electronic device according to an embodiment of the disclosure.

FIG. 13 is a flowchart illustrating example overall operation of the electronic device 100 according to an embodiment of the disclosure.

In an example embodiment, at operation 1313, the electronic device (e.g., electronic device 100 in FIG. 2) may collect user's conversations when the user starts a conversation.

In an example embodiment, at operation 1315, the electronic device 100 may send the collected user conversations to the intelligent server (e.g., server 200 in FIG. 6) and request the intelligent server 200 to construct a prediction database 270. For example, the intelligent server 200 may receive user conversations from the electronic device 100, extract parameters from the received conversations, and generate the prediction database 270 based on the extracted parameters. In an example embodiment, the intelligent server 200 may construct the prediction database 270 in cooperation with the natural language understanding module 220 so that the electronic device 100 can identify the user's intention. The prediction database 270 may store information regarding sentence completeness, the speaker, or the conversation time.

In another embodiment, the prediction database 270 may further store preference information for a recommendation service and keyword information for identifying the additional context.

In an example embodiment, at operation 1317, the electronic device 100 may determine whether a wake-up utterance (e.g., an invoking command) is received. If a wake-up utterance is received, the procedure may proceed to operation 1319. If a wake-up utterance is not received, the procedure may return to operation 1313.

In an example embodiment, at operation 1319, in response to receiving the wake-up utterance, the electronic device 100 may provide a result as an artificial intelligence service based on the weight applied to sentence completeness, speaker information, or the time of conversation. For example, when the wake-up utterance is received, the electronic device 100 may refer to the prediction database 270 configured in the intelligent server 200 to determine the weight for the type of the wake-up utterance, the point in time at which the wake-up utterance is input, or the user having produced the wakeup utterance, determine a recommendation service based on the determined weight, and provide the determined recommendation service. For example, if the difference between the time when the wake-up utterance is received and the time when collection of the conversations is started is relatively small, the electronic device 100 may assign a high weight to the context and completeness of the conversation, and provide a recommendation service based on the context and completeness of the collected conversations. If the difference between the time when the wake-up utterance is received and the time when collection of the conversations is started is relatively large, the electronic device 100 may assign a high weight to the user having produced the wake-up utterance, and provide a recommendation service related to the user having produced the wake-up utterance. In another embodiment, if the difference between the time when the wake-up utterance is received and the time when collection of the conversations is started is relatively large, the electronic device 100 may output a UI (user interface) or a UX (user experience) requesting authentication for the user having produced the wake-up utterance, and may provide a recommendation service only when the user is successfully authenticated.

In an example embodiment, the electronic device 100 may download the information of the prediction database 270 generated by the intelligent server 200 prior to receiving the wakeup utterance and store the downloaded information in the memory 140. In this case, the electronic device 100 may refer to the information of the prediction database 270 stored in the memory 140 upon receiving the wake-up utterance.

Figure 14:
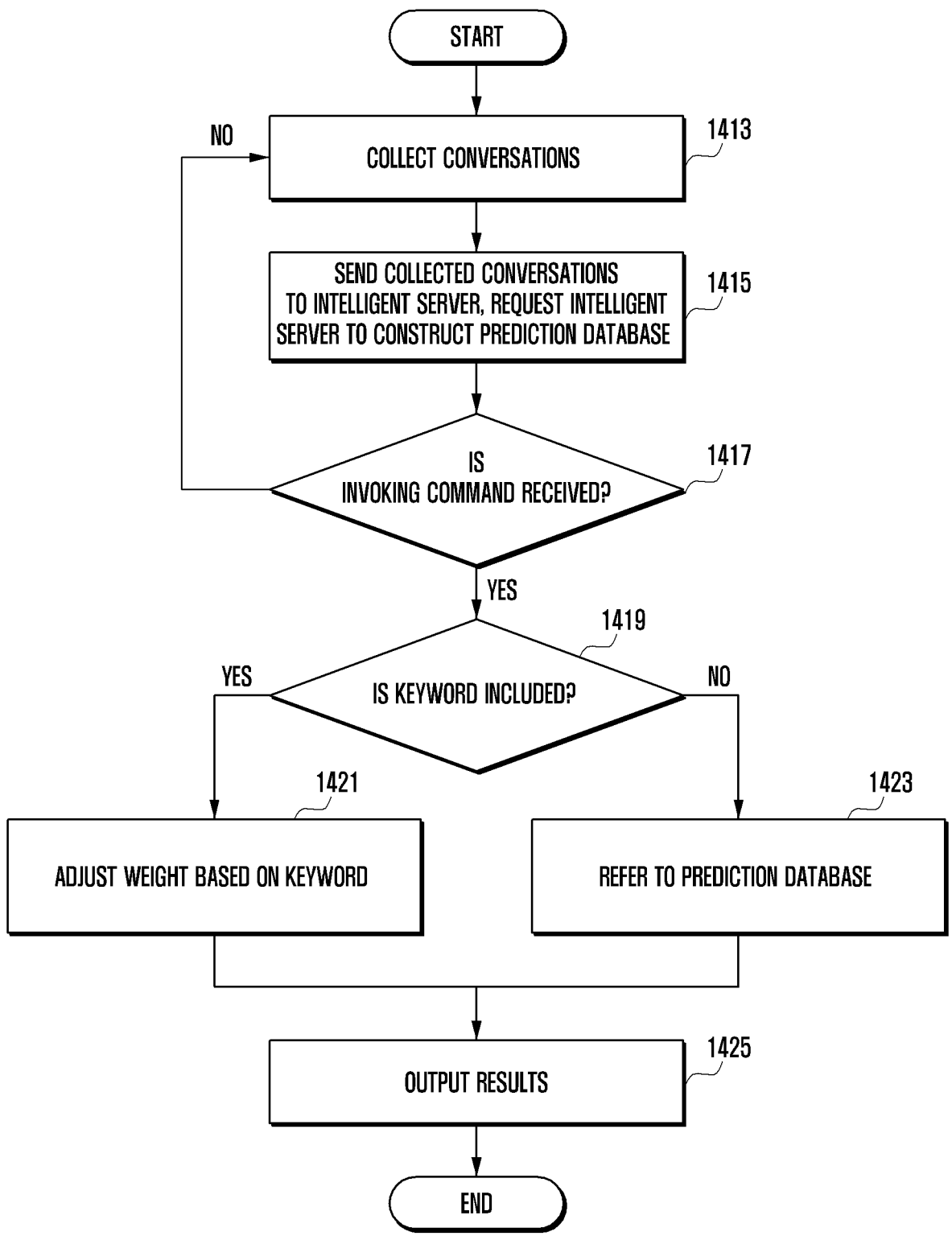
FIG. 14 is a flowchart illustrating example operations of the electronic device according to another embodiment of the disclosure.

FIG. 14 is a flowchart illustrating example operations of the electronic device 100 according to another embodiment of the disclosure.

In an example embodiment, at operation 1413, the electronic device (e.g., electronic device 100 in FIG. 2) may collect user's conversations when the user starts a conversation.

In an example embodiment, at operation 1415, the electronic device 100 may send the collected user conversations to the intelligent server (e.g., server 200 in FIG. 6) and request the intelligent server 200 to construct a prediction database 270. For example, the intelligent server 200 may receive user conversations from the electronic device 100, extract parameters from the received conversations, and generate the prediction database 270 based on the extracted parameters. In an example embodiment, the intelligent server 200 may construct the prediction database 270 in cooperation with the natural language understanding module 220 so that the electronic device 100 can identify the user's intention. The prediction database 270 may store information regarding sentence completeness, the speaker, or the conversation time. In another embodiment, the prediction database 270 may further store preference information for a recommendation service and keyword information for identifying the additional context.

In an example embodiment, at operation 1417, the electronic device 100 may determine whether a wake-up utterance (e.g., invoking command) is received. If a wake-up utterance is received, the procedure may proceed to operation 1419. If a wake-up utterance is not received, the procedure may return to operation 1413.

In an example embodiment, at operation 1419, the electronic device 100 may check whether a keyword is included along with the wake-up utterance. For example, the keyword is information related to the path rule and may be parameter information entered by the user together with the wake-up utterance. For example, the user can trigger the artificial intelligence service function of the electronic device 100 by use of a combination of the wake-up utterance and a keyword. If the wake-up utterance is "Bixby", when the user enters a voice input "Bixby music!!", "music" may be a keyword. If a keyword is included along with the wake-up utterance, the procedure may proceed to operation 1421. If a keyword is not included along with the wake-up utterance, the procedure may proceed to operation 1423.

In an example embodiment, at operation 1421, the electronic device 100 may adjust the weight of the parameters stored in the prediction database 270 based on the keyword. At operation 1425, the electronic device 100 may output a recommendation service based on the adjusted weight as a result. For example, in the above description of FIG. 11 or 12, the conversations collected in advance by the electronic device 100 are related to a pizza order, and thus the parameters configured in the prediction database 270 may be related to the pizza order. If the user produces "Bixby music" as a wake-up utterance, the electronic device 100 may recommend a function (service) related to music playback first instead of a service related to the pizza order.

In an example embodiment, at operation 1423, the electronic device 100 may refer to the prediction database 270 to determine an action, a command, or a service associated with the conversations prior to reception of the wake-up utterance. For example, the electronic device 100 may determine the weight for selecting the recommendation service based on the type of the wake-up utterance, the point in time at which the wake-up utterance is input, or the user having produced the wakeup utterance. At operation 1425, the electronic device may output the recommendation service as a result based on the weight determined with reference to the prediction database 270.

In an example embodiment, the electronic device 100 may download the information of the prediction database 270 generated by the intelligent server 200 prior to receiving the wakeup utterance and store the downloaded information in the memory 140. In this case, the electronic device 100 may refer to the information of the prediction database 270 stored in the memory 140 upon receiving the wake-up utterance.

Figure 15:
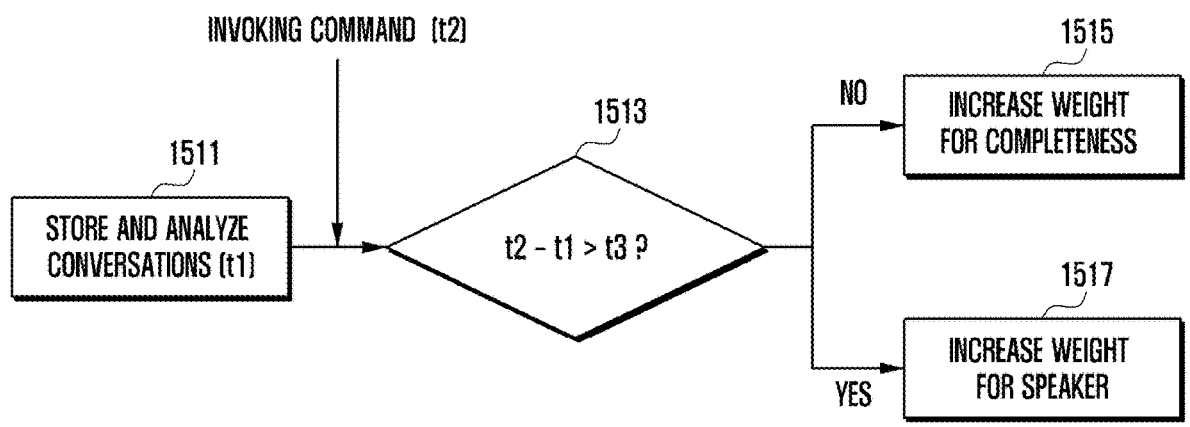
FIG. 15 is a flowchart illustrating an example scheme by which the electronic device sets weights according to an embodiment of the disclosure.

FIG. 15 is a flowchart illustrating an example scheme by which the electronic device 100 sets weights according to an embodiment of the disclosure.

In an example embodiment, with reference to FIG. 15, the electronic device (e.g., electronic device 100 in FIG. 2) may be configured to determine the weight in consideration of the time difference between the time when collection of the conversations is started and the time when the wake-up utterance is received.

In an example embodiment, at operation 1511, the electronic device 100 may start to collect user's conversations according to a specified condition. For example, the electronic device 100 may collect user's conversations from a first time point (t1), send the collected user conversations to the intelligent server (e.g., server 200 in FIG. 6), and request the intelligent server 200 to construct a prediction database 270. The intelligent server 200 may receive user conversations from the electronic device 100, analyze the received conversations, and generate the prediction database 270 based on the analysis result.

In an example embodiment, the specified condition for the electronic device 100 to start collecting user's voice data may correspond, for example, and without limitation, to at least one of conditions 1 to 11 below.

Condition 1: voice input is greater than or equal to a specified value

Condition 2: voice input is present after a given duration without voice input (e.g., the user is considered to be out and back)

Condition 3: voice input becomes less than the specified value and then becomes greater than or equal to the specified value Condition 4: physical button input is received from the user Condition 5: a specified character is input from the user Condition 6: voice input is received from multiple users Condition 7: voice input is received from a given number or more users (e.g., two or more users)

Condition 8: there are multiple electronic devices in a designated space

Condition 9: there are multiple user accounts registered in the electronic device Condition 10: the time corresponds to a schedule registered in the electronic device Condition 11: the electronic device is located in a designated space (e.g., meeting room) and the time corresponds to a pre-registered schedule.

In an example embodiment, at operation 1513, when the wake-up utterance is received, the electronic device 100 can determine whether the difference between the point in time at which the wakeup utterance is received and the point in time at which collection of the conversations is started is relatively small. For example, the electronic device 100 may calculate the difference (t2–t1) between a second time point (t2) at which the wake-up utterance (e.g., invoking command) is received and a first time point (t1) at which collection of the conversation is started, and compare the time difference (t2–t1) with the specified value (t3).

In an example embodiment, if the difference between the point in time at which the wakeup utterance is received and the point in time at which collection of the conversations is started is relatively small, at operation 1515, the electronic device 100 may assign a higher weight to the context and completeness of the collected conversations, and provide a recommendation service based on the context and completeness of the collected conversations. For example, if the difference (t2–t1) between a second time point (t2) at which the wake-up utterance is received and a first time point (t1) at which collection of the conversation is started is less than the specified value (t3), the electronic device 100 may assign a higher weight to the context and completeness of the collected conversations.

In an example embodiment, if the difference between the point in time at which the wakeup utterance is received and the point in time at which collection of the conversations is started is relatively large, at operation 1517, the electronic device 100 may assign a higher weight to the user having produced the wake-up utterance, and provide a recommendation service related to the user having produced the wake-up utterance. For example, if the difference (t2–t1) between a second time point (t2) at which the wake-up utterance is received and a first time point (t1) at which collection of the conversation is started is greater than the specified value (t3), the electronic device 100 may assign a higher weight to the user having produced the wake-up utterance. In another embodiment, if the difference between the time when the wake-up utterance is received and the time when collection of the conversations is started is relatively large, the electronic device 100 may output a UI (user interface) or a UX (user experience) requesting authentication for the user having produced the wake-up utterance, and may provide a recommendation service only when the user is successfully authenticated.

Figure 16:
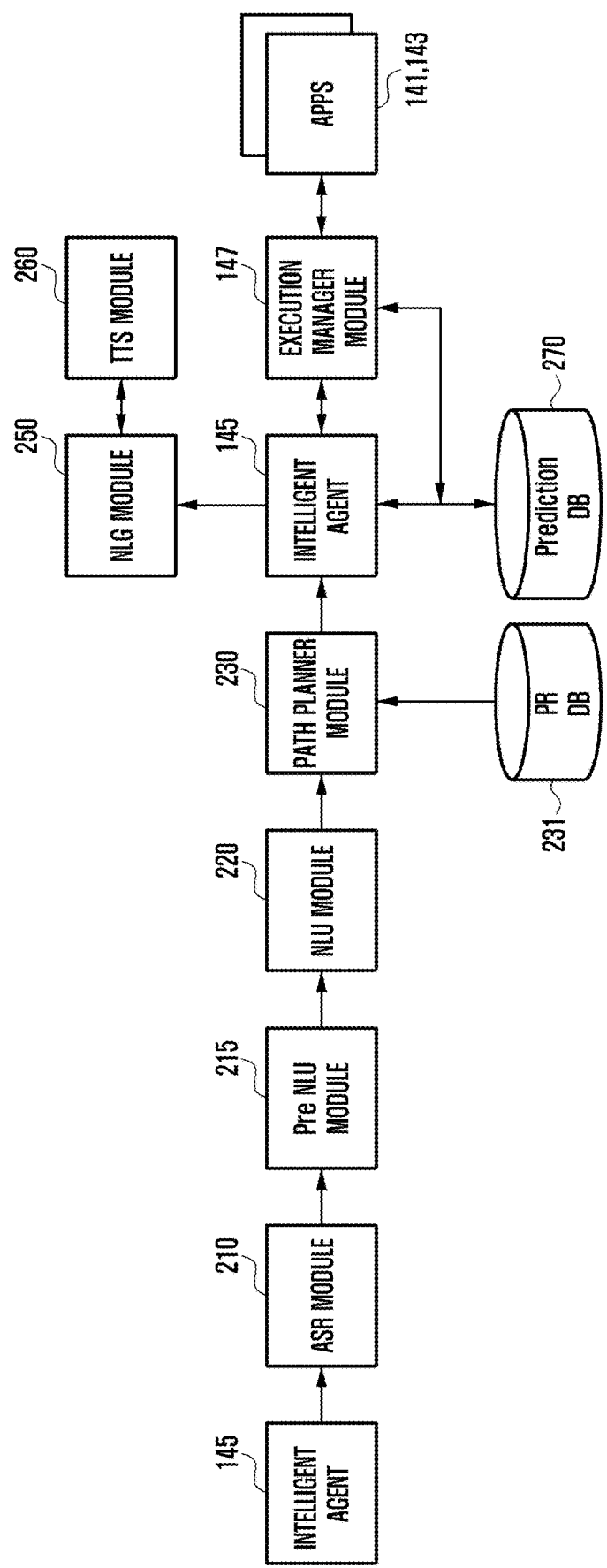
FIG. 16 is a block diagram illustrating an example configuration and operation of the integrated intelligent system according to an embodiment of the disclosure.

FIG. 16 is a block diagram illustrating an example configuration and operation of the integrated intelligent system according to an embodiment of the disclosure.

With reference to FIG. 16, in an example embodiment, the integrated intelligent system may include an intelligent agent (e.g., including processing circuitry and/or executable program elements) (e.g., agent 145 in FIG. 2), an automatic speech recognition (ASR) module (e.g., including processing circuitry and/or executable program elements) (e.g., module 210 in FIG. 6), a pre-natural language understanding (pre-NLU) module (e.g., including processing circuitry and/or executable program elements) 215, a natural language understanding module (e.g., including processing circuitry and/or executable program elements) (e.g., module 220 in FIG. 6), a path planner module (e.g., including processing circuitry and/or executable program elements) (e.g., module 230 in FIG. 6), a path rule database (e.g., database 231 in FIG. 6), the prediction database (e.g., database 270 in FIG. 6), a natural language generator (NLG) module (e.g., including processing circuitry and/or executable program elements) (e.g., module 250 in FIG. 6), an execution manager module (e.g., including processing circuitry and/or executable program elements) (e.g., module 147 in FIG. 6), a text-to-speech module (e.g., module 260 in FIG. 6), and an application (e.g., application 141 or 143 in FIG. 2). In an example embodiment, the intelligent agent 145, the execution manager module 147 and the applications 141 and 143 shown in FIG. 16 may be configured in the electronic device 100 and the remaining components may be configured in the intelligent server (e.g., server 200 in FIG. 6), but the disclosure is not limited thereto.

In various embodiments, the integrated intelligent system can be configured to provide rapid feedback to the user based on the contents of the previous conversations upon reception of a wake-up utterance. For example, the integrated intelligent system may store in advance a context-based command set in the prediction database 270 based on the previous conversations, and compose a command based on the prediction database 270 to provide a recommendation service when the wake-up utterance is received from the user.

In various embodiments, the electronic device (e.g., electronic device 100 in FIG. 2) may provide a personalized result (recommendation service) according to the speaker producing the wake-up utterance. For example, the electronic device 100 can store multiple command sets classified by the context and the speaker in the prediction database 270, and provide a recommendation service based on the speaker having produced the wake-up utterance.

In various embodiments, the electronic device 100 may provide feedback information based on the time and completeness of a command. For example, the electronic device 100 may configure the prediction database 270 for each time slot and completeness of a command based on conversation contents, and provide various feedback information (recommendation service) according to the time the wake-up utterance is received or a keyword entered along with the wake-up utterance.

Next, a description is given of the main operations of the integrated intelligent system capable of providing the above functions.

In an example embodiment, the intelligent agent 145 may collect user's conversations before receiving a wake-up utterance according to a specified condition, such as the initiation of a user's utterance, a change in the surrounding environment (e.g., proximity of the electronic device 100), or occurrence of an event (e.g., scheduling of a meeting). To identify the intention of the user, the intelligent agent 145 may transmit the collected conversations to the automatic speech recognition module 210. The intelligent agent 145 may transfer the received voice input to the automatic speech recognition module 210 at regular intervals (e.g., 5 seconds). If voice input is not present for a specified time, the intelligent agent 145 may transmit the voice input collected in response to the wake up utterance to the automatic voice recognition module 210.

In an example embodiment, the automatic speech recognition module 210 may recognize a voice input and convert the recognized voice input into text. The automatic speech recognition module 210 may deliver the converted text to the electronic device 100 or the natural language understanding module 220. The automatic speech recognition module 210 may be configured to identify the speaker by analyzing the voice data. For example, the speaker information analyzed by the automatic speech recognition module 210 can be used by the natural language understanding module 220 to identify the speaker's intention. The automatic speech recognition module 210 may transmit the electronic device 100 the speaker information as well as the text data converted from the voice input. The automatic speech recognition module 210 may determine the speaker (e.g., Jones) based on the data previously stored in the database, and may update the database using a generic name (e.g., user 1) representing a particular speaker if speaker information is not in the database.

In an example embodiment, the pre-natural language understanding module 215 may include various processing circuitry and/or executable program elements and can be configured to operate when the text converted from the voice input is long. For example, if the text converted from the voice input is long, the pre-natural language understanding module 215 may generate a representative sentence from the long text and transmit the generated representative sentence to the natural language understanding module 220. For example, each path rule can have a representative sentence that reflects the corresponding intention most. The pre-natural language understanding module 215 may generate a representative sentence using a sentence modified for user's understanding (representative friendly utterance, RFU). The pre-natural language understanding module 215 may focus on key nouns or keywords contained in the text received from the automatic speech recognition module 210, or may compose a representative sentence based on a verb to predict the user's intention. For example, if the collected conversation is "Will you send your mom the photo taken in Hawaii and things like that by a message?", the pre-natural language understanding module 215 may generate a clear and concise representative sentence such as "photos taken in Hawaii, send a message to Mom". The pre-natural language understanding module 215 may be included in the natural language understanding module 220, or may be configured separately from the natural language understanding module 220.

In an example embodiment, the natural language understanding module 220 may receive text data and speaker information from the automatic speech recognition module 210 or the pre-natural language understanding module 215, determine a parameter (or slot) and context based on the text data and speaker information using a specified rule, and identify the user's intention based on the determined parameter and context. The natural language understanding module 220 may send the determined parameters, context, and user intention to the path planner module 230.

In an example embodiment, the natural language understanding module 220 may analyze the text data and speaker information received from the automatic speech recognition module 210 in a designated unit, determine the association between the text data and speaker information analyzed in the previous step and the text data and speaker information analyzed in the next step, identify the user's intention based on the determination result, and send the determined user intention to the path planner module 230. For example, the natural language understanding module 220 may be configured to determine the association between the text data and speaker information received as the next unit and the text data and speaker information received as the previous unit, and send the determination result to the path planner module 230.

In an example embodiment, the path planner module 230 may generate one or more path rules using the user intent and parameters. For example, the path planner module 230 may determine the application 141 or 143 to be executed and the action to be performed in the application 141 or 143 based on the user's intention and parameters to generate one or more path rules. The path planner module 230 may store the generated path rule in the path rule database 231. The path planner module 230 can organize and manage the generated path rules for each speaker by referring to the speaker information.

In an example embodiment, the prediction database 270 may store at least a portion of the text data converted by the automatic speech recognition module 210, the parameters, and information on the completeness, speaker, or time. The intelligent agent 145 may assign a priority to the information items stored in the prediction database 270 based on the user's intention or parameters, and transmit the stored information items to the execution manager module 147 based on the priority. In an example embodiment, the prediction database 270 may be configured as shown in Table 2 below.

TABLE 2

| Number | Rule ID | Representative utterance | Answer | Speaker | Priority | Keyword | Note (time) |
|---|---|---|---|---|---|---|---|
| 1 | weather_100 | How is the weather in Suwon today? | Today's weather in Suwon is clear. | A | A trigger: 1 | weather, Suwon | 2017 Jul. 07 12:50 |
| 2 | music_200 | Can you play IU's song? | I'll play IU's song. | A, B | A trigger: 2 B trigger: 1 | IU, song | 2017 Jun. 07 12:55 |
| 3 | TV_10 | TV channel 15 please. | Switched to TV channel 15. | B | B trigger: 2 | JTBC, 15, TV | 2017 Jun. 07 09:07 |
| 4 | finance_30 | Would you like to transfer money community bank? | Your account from transfer is ready. | B | B trigger: 3 | remittance, transfer | 2017 Jun. 07 06:15 |

In an example embodiment, the "number" field in Table 2 may be used by the execution manager module 147 to manage the path rules received from the path planner module 230. The "number" field values are organized in the order of storage in the prediction database 270, and each "number" field value may represent one path rule. If a specified condition (e.g., expiration of a given time, or execution of an action) is met, the intelligent agent 145 may delete the path rule indicated by the corresponding "number" field value.

In an example embodiment, the "rule ID" field in Table 2 may be used to manage the applications 141 and 143 for providing feedback information related to the intention of the user. For example, each application 141 or 143 may be assigned a unique rule ID, and the rule ID may include an argument indicating the execution state of the corresponding application 141 or 143. The path planner module 230 may determine the application 141 or 143 and the state information thereof related to the feedback information (recommendation service) to be provided by the electronic device 100 based on the user's intention and parameter information, store the information on the application and its state in the prediction database 270, and provide the rule ID associated with the determined application and its state to the execution manager module 147. For example, the rule ID "weather_100" may indicate a state of displaying local weather information produced by a weather application 141 or 143.

In an example embodiment, the "representative utterance" field in Table 2 may be used to store a representative sentence related to the user's intention and an application 141 or 143 matching the intention of the user. For example, if the "rule ID" is related to a weather application 141 or 143, the representative utterance such as "How is the weather in Suwon today?" or "How is the weather?" may be related to the intention of the user wishing to know the weather information.

In an example embodiment, the "speaker" field in Table 2 may be used to manage the information on the speaker associated with the path rule. For example, each path rule may be mapped with speaker information in the prediction database 270. In Table 2, user A is assumed to have conversations about the weather and music (song), and the path rules related to the weather application 141 or 143 and the music application 141 or 143 are mapped with user A. User B is assumed to have conversations about music, TV, and finance, and the path rules related to the music application 141 or 143, the TV application 141 or 143, and the financial application 141 or 143 are mapped with user B.

In an example embodiment, the "priority" field in Table 2 may be used to indicate the priority of the path rule related to the speaker having produced the wakeup utterance. For example, the priority can be assigned based on the degree to which each user participates in the conversation (e.g., the amount of talk (time or number of input characters)) with respect to the corresponding path rule. For example, if user A frequently has weather-related conversations, the priority of the path rule associated with the weather can be set so that the path rule associated with the weather is to be provided first when user A produces the wake-up utterance. The priority can be assigned based on the usage history of the user having used the speech recognition artificial intelligence service with respect to the corresponding path rule. The path planner module 230 may determine the preference of the user for each path rule based on the usage history of the user having used the speech recognition artificial intelligence service previously, and set the priority of the corresponding path rule based on the determined preference. For example, if user A has repeatedly used the speech recognition artificial intelligence service to obtain weather information for a specific time and/or a specific location in the past, the priority of the path rule associated with the weather can be set so that the path rule associated with the weather is to be provided first when user A produces the wake-up utterance. In an example embodiment, the priority may be set to a high value as the current time approaches a specified time related to the analyzed intention of the user. If the intention of the user is analyzed as using a specific service at a given time, the path planner module 230 can assign a higher priority to the path rule related to the service as the time approaches the given time. For example, when the user says "I will eat pizza at 4 pm", the path planner module 230 may assign a high priority to the path rule related to pizza ordering as the time approaches 4 pm.

In an example embodiment, the "keyword" field in Table 2 may be used to manage at least one representative word associated with the path rule. For example, if a keyword is included along with the wakeup utterance, the electronic device 100 can assign a high weight to the information including the keyword and provide the path rule related to the keyword as a recommendation service.

In an example embodiment, the "note (time)" field in Table 2 may be used to manage information about the time at which the path rule is generated or the time at which invocation of the path rule is expected (e.g., reservation time, or specified schedule). For example, the path planner module 230 may record the time at which the path rule is generated based on the time information provided by the user. The path planner module 230 may set the time at which invocation of the path rule is expected based on the history in which each user previously used the speech recognition artificial intelligence service.

In various embodiments, the prediction database 270 may include various fields in addition to the above-described fields, or may include only some of the above-described fields.

In an example embodiment, the natural language generator module 250 may convert designated information into text data. A natural language utterance may be converted into text data. Here, the designated information may be, for example, information about additional input, information indicating completion of an action corresponding to the user input, or information requesting additional input from the user (e.g., feedback information on a user input). The converted text data may be transmitted to the electronic device 100 and displayed on the display 120, or may be transmitted to the text-to-speech module 260 and converted into sound data.

In an example embodiment, the execution manager module 147 may receive a path rule from the path planner module and execute the application 141 or 143 according to the received path rule. The execution manager module 147 does not execute the application 141 or 143 before receiving the wake-up utterance and may execute the application 141 or 143 in response to receiving the wake-up utterance. The intelligent agent 145 may not invoke the execution manager module 147 before the wake-up utterance is received. For example, the intelligent agent 145 may continuously update the prediction database 270 and not invoke the execution manager module 147 until the wake-up utterance is input. The intelligent agent 145 may invoke the execution manager module 147 in response to reception of the wake-up utterance, transmit the path rule stored in the prediction database 270 to the execution manager module 147, and execute the applications 141 and 143 through the execution manager module 147.

In an example embodiment, the text-to-speech module 260 may convert text information into sound information. The text-to-speech module 260 may receive text data from the natural language generator module 250, convert the text data into sound data, and transmit the sound data to the electronic device 100. The electronic device 100 may output the sound data via the speaker 130.

Figure 17:
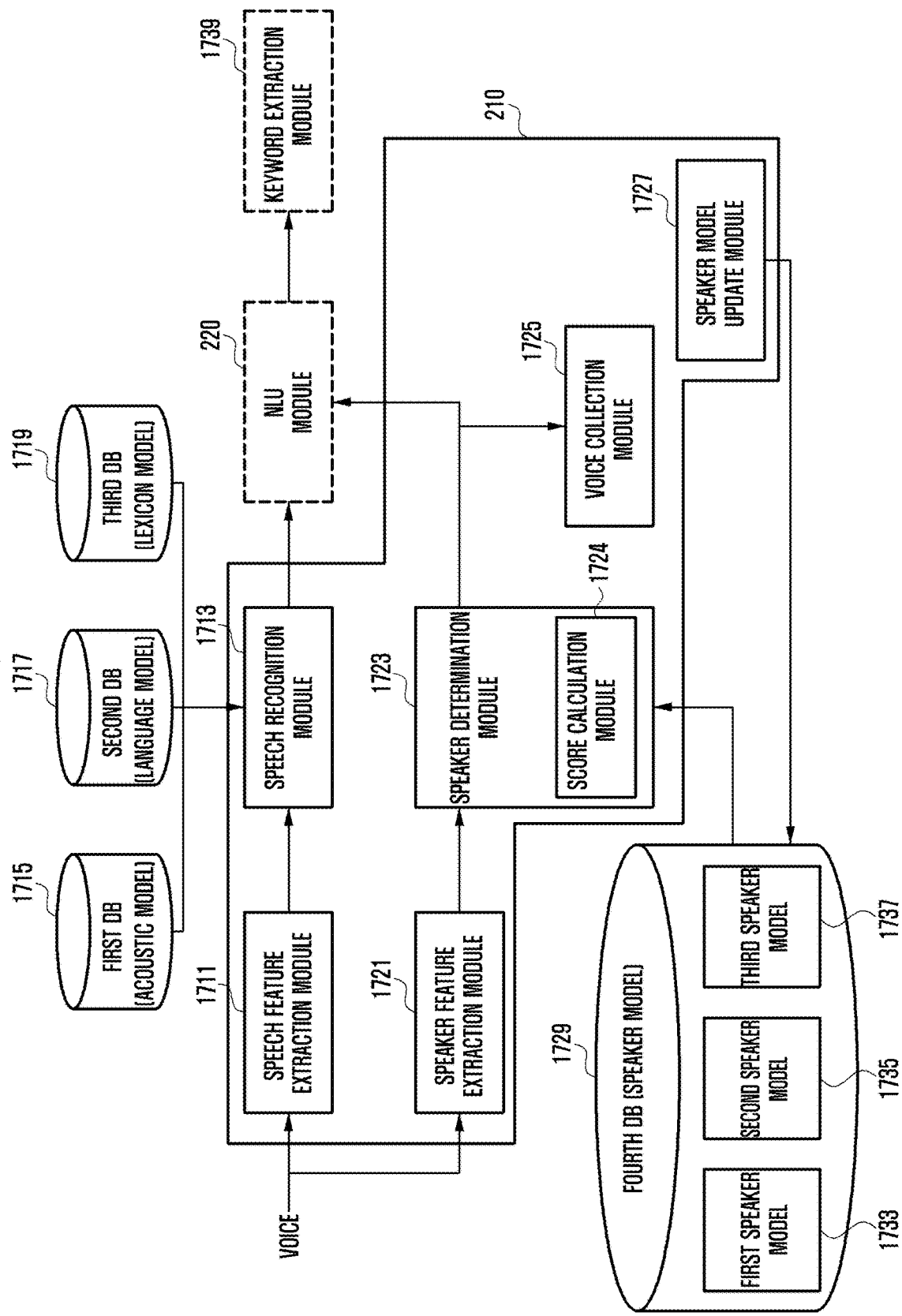
FIG. 17 is a block diagram illustrating an example automatic speech recognition module according to an embodiment of the disclosure.

FIG. 17 is a block diagram illustrating an example automatic speech recognition module 210 according to an embodiment of the disclosure.

With reference to FIG. 17, the automatic speech recognition module 210 may include a speech feature extraction module (e.g., including processing circuitry and/or executable program elements) 1711, a speech recognition module (e.g., including processing circuitry and/or executable program elements) 1713, a speaker feature extraction module (e.g., including processing circuitry and/or executable program elements) 1721, a speaker determination module (e.g., including processing circuitry and/or executable program elements) 1723, a voice collection module (e.g., including processing circuitry and/or executable program elements) 1725, and a speaker model update module (e.g., including processing circuitry and/or executable program elements) 1727. Some components of the automatic speech recognition module 210 may be configured in the memory (e.g., memory 140 in FIG. 2) of the electronic device 100.

In an example embodiment, the speech feature extraction module 1711 can extract a speech feature (e.g., feature vector) of a received voice input. For example, the speech feature extraction module 1711 can extract a speech feature of a voice input by removing a noise signal or a signal not belonging to the frequency range of the human voice from the voice input.

In an example embodiment, the speech recognition module 1713 can perform speech recognition based on the speech feature extracted by the speech feature extraction module 1711. For example, the speech recognition module 1713 may perform speech recognition on the received voice input based on the extracted speech feature with reference to at least one of the acoustic model stored in a first database 1715, a language model stored in a second database 1717, or the vocabulary stored in a third database 1719. The first database 1715 may store one or more acoustic models, the second database 1717 may store one or more language models, and the third database 1719 may store one or more lexicon models. The speech recognition module 1713 can convert the speech recognition result into text data and transmit the text data to the natural language understanding module 220. The first to third databases 1715, 1717 and 1719 may be included in the external server (e.g., intelligent server 200 in FIG. 6) connected to the electronic device 100. The first to third databases 1715, 1717 and 1719 may be included in the memory (e.g., memory 140 in FIG. 2) of the electronic device 100.

In an example embodiment, the natural language understanding module 220 can perform a syntactic analysis or a semantic analysis on the recognized speech to identify the intention of the user. For example, the natural language understanding module 220 may determine the parameter (or slot) and context for the text data received from the speech recognition module 1713 based on a specified rule, and identify the user's intention based on the determined parameter and context. The natural language understanding module 220 may transfer the determined parameter, context, and user intention to the keyword extraction module 1739.

In an example embodiment, the keyword extraction module 1739 may include various processing circuitry and/or executable program elements and extract context-related keywords from the recognized voice input, classify the extracted context-related keywords by user, and store the classified keywords in the prediction database 270. The keyword extraction module 1739 may be included in the natural language understanding module 220 or may be configured separately from the natural language understanding module 220.

In an example embodiment, the speaker feature extraction module 1721 can extract a speaker feature from the received voice input. For example, the speaker feature extraction module 1721 can extract a speech feature (e.g., feature vector) from the received voice data to obtain a speaker feature.

In an example embodiment, the speaker determination module 1723 can determine whether the speaker of the received voice input is the speaker of a stored speaker model based on the speaker feature extracted by the speaker feature extraction module 1721. For example, the speaker determination module 1723 may check whether the speaker of the received voice input corresponds to one of the speaker models (e.g., first speaker model 1733, second speaker model 1735, and third speaker model 1737) stored in the fourth database 1729, and determine the speaker model corresponding to the speaker of the received voice input. The fourth database 1729 may be included in an external server (e.g., intelligent server 200 in FIG. 6) connected to the electronic device 100. The fourth database 1729 may be included in the memory (e.g., memory 140 in FIG. 2) of the electronic device 100.

In an example embodiment, the speaker determination module 1723 may include a score calculation module 1724. The score calculation module 1724 can measure the similarity between the speaker of the received voice input and the speaker of one of the stored speaker models in the form of a score. The speaker determination module 1723 can determine whether the speaker of the received voice input is the speaker of a stored speaker model according to the similarity score calculated by the score calculation module 1724.

In an example embodiment, the speaker determination module 1723 can obtain the similarity score of the speaker by measuring the similarity between the vector corresponding to the speaker model stored in advance and the vector extracted from the received voice input. When the vector corresponding to the stored speaker model and the vector extracted from the received voice input are A and B, respectively, the speaker determination module 1723 can calculate (determine) the similarity score according to Equation 1 below.

$$\text{THE SIMILARITY SCORE}(A, B) = \frac{A \cdot B}{|A||B|} \quad \text{[Equation 1]}$$

(here, A·B indicates the inner product of A and B, |A| indicates the magnitude of A, and |B| indicates the magnitude of B.)

In various embodiments, various similarity calculation techniques other than Equation 1 may be applied depending on the types of speaker models.

In an example embodiment, the voice collection module 1725 may receive speaker information from the speaker determination module 1723, collect the speaker-specific voice data based on the received speaker information, and store the collected voice data in the fourth database 1729. If collected voice data corresponds to a new speaker, the voice collection module 1725 may invoke the speaker model update module 1727 to update the speaker model information stored in the fourth database 1729. For example, the speaker model update module 1727 may extract a representative speech model from the voice data corresponding to a new speaker with reference to the fourth database 1729, and newly store the extracted representative speech model in the fourth database 1729.

Figure 18:
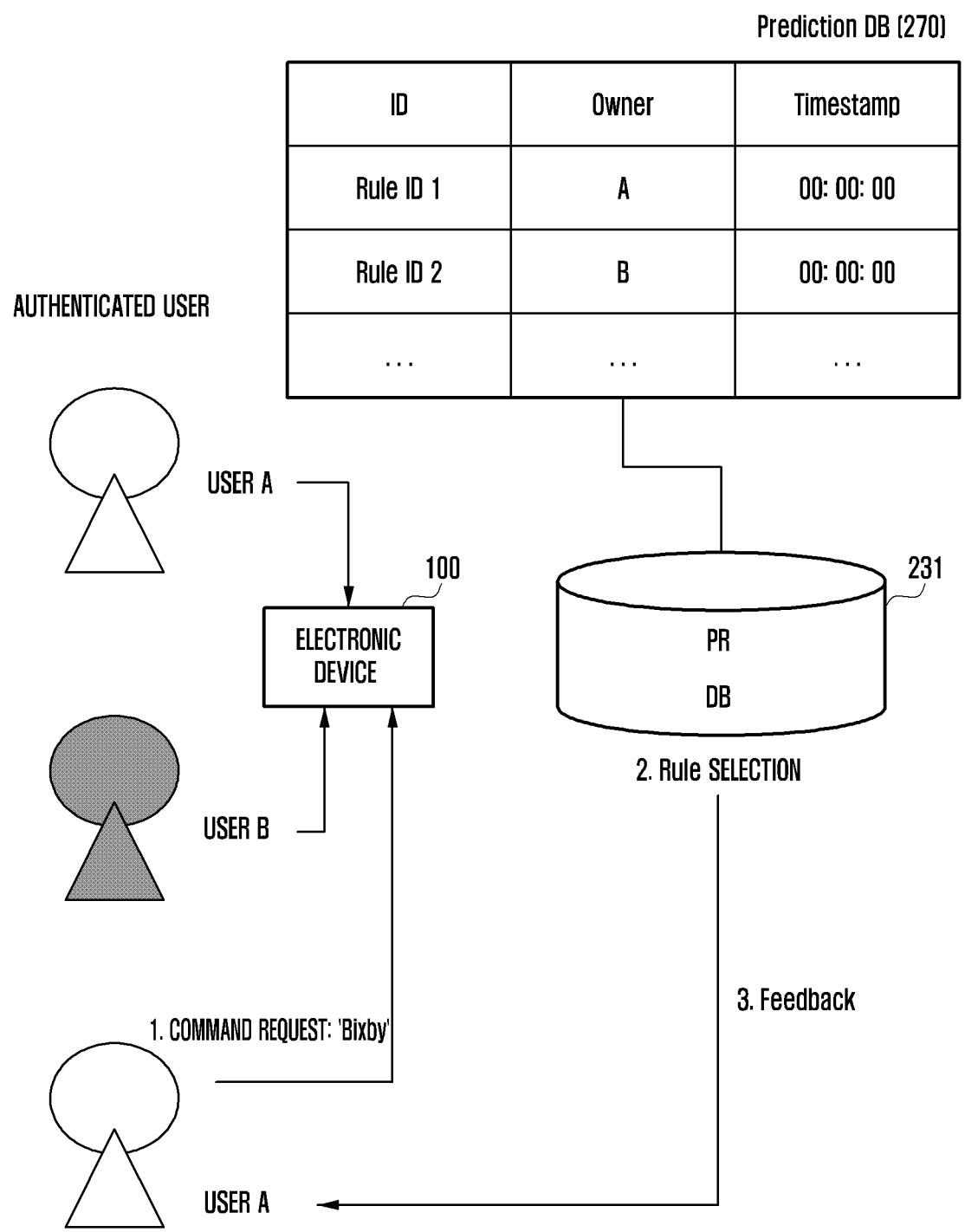
FIG. 18 is a diagram illustrating an example scheme by which the electronic device obtains a path rule according to an embodiment of the disclosure.

FIG. 18 is a diagram illustrating an example scheme by which the electronic device 100 obtains a path rule according to an embodiment of the disclosure.

In various embodiments, with reference to FIG. 18, the electronic device (e.g., electronic device 100 in FIG. 2) may obtain a path rule from the intelligent server (e.g., server 200 in FIG. 6) in response to the wake-up utterance according to the following procedure.

In an example embodiment, when authenticated user A and user B start a conversation, the electronic device 100 may collect conversations between user A and user B, send the collected conversations to the intelligent server 200, and request the intelligent server 200 to construct the prediction database 270. The intelligent server 200 may extract parameters from the conversations of user A and user B received from the electronic device 100 and construct the prediction database 270 based on the extracted parameters.

In an example embodiment, as indicated by indicia 1, the electronic device 100 may receive a wake-up utterance from user A and perform speaker recognition for user A who has produced the wake-up utterance in response to receiving the wake-up utterance. The electronic device 100 can perform speaker recognition for user A who has produced the wake-up utterance in conjunction with the intelligent server 200.

In an example embodiment, as indicated by indicia 2, after speaker recognition, the electronic device 100 may search the prediction database 270 stored in the intelligent server 200 for a path rule related to the recognized speaker, and select at least one of the retrieved path rules based on the priority.

In an example embodiment, as indicated by indicia 3, the electronic device 100 may determine a path rule with the highest priority in the prediction database 270 stored in the intelligent server 200, and obtain the determined path rule from the path rule database 231 stored in the intelligent server 200. The electronic device 100 can provide a recommendation service to the user by executing the application 141 or 143 according to the path rule obtained from the path rule database 231. The prediction database 270 and the path rule database 231 may be included in the intelligent server 200. At least one of the prediction database 270 or the path rule database 231 may be included in the electronic device 100.

According to various embodiments of the disclosure, a method of operating a server (e.g., intelligent server 200 in FIG. 2) capable of providing a recommendation service related to a user's intention in response to a wake-up utterance invoking a voice-based intelligent assistant service may include: receiving voice data from an electronic device (e.g., electronic device 100 in FIG. 2); analyzing the context of a user's conversation included in the voice data; determining whether the voice data is sufficient to identify the user's intention based on the analyzed context; generating a path rule based the voice data being sufficient to identify the user's intention, and cumulatively storing the voice data based on the voice data not being sufficient to identify the user's intention; generating, based on the path rule being generated, a prediction database (e.g., prediction database 270 in FIG. 6) using the generated path rule to predict the user's intention; and transmitting, based on the electronic device 100 receiving the wake-up utterance, at least one path rule included in the prediction database 270 to the electronic device 100.

Determining whether the voice data is sufficient to identify the user's intention may include: obtaining information about plural specified parameters from the voice data; and determining that the voice data is sufficient to identify the user's intention based on the number of parameters whose information is obtained exceeding a specified value.

The operation method may further include: obtaining speaker information of the voice data from the electronic device 100; and managing the prediction database 270 so that the path rule matches the speaker information. The parameters may include information about fields corresponding respectively to the agent of the action, the time of the action, the place of the action, the target of the action, a method of performing the action, and a reason of the action. The prediction database 270 may store information about at least one of text data obtained from the voice data, the speaker, the weight related to the speaker information, applications executable in the electronic device 100, states of the applications, and/or keywords.

Figure 19:
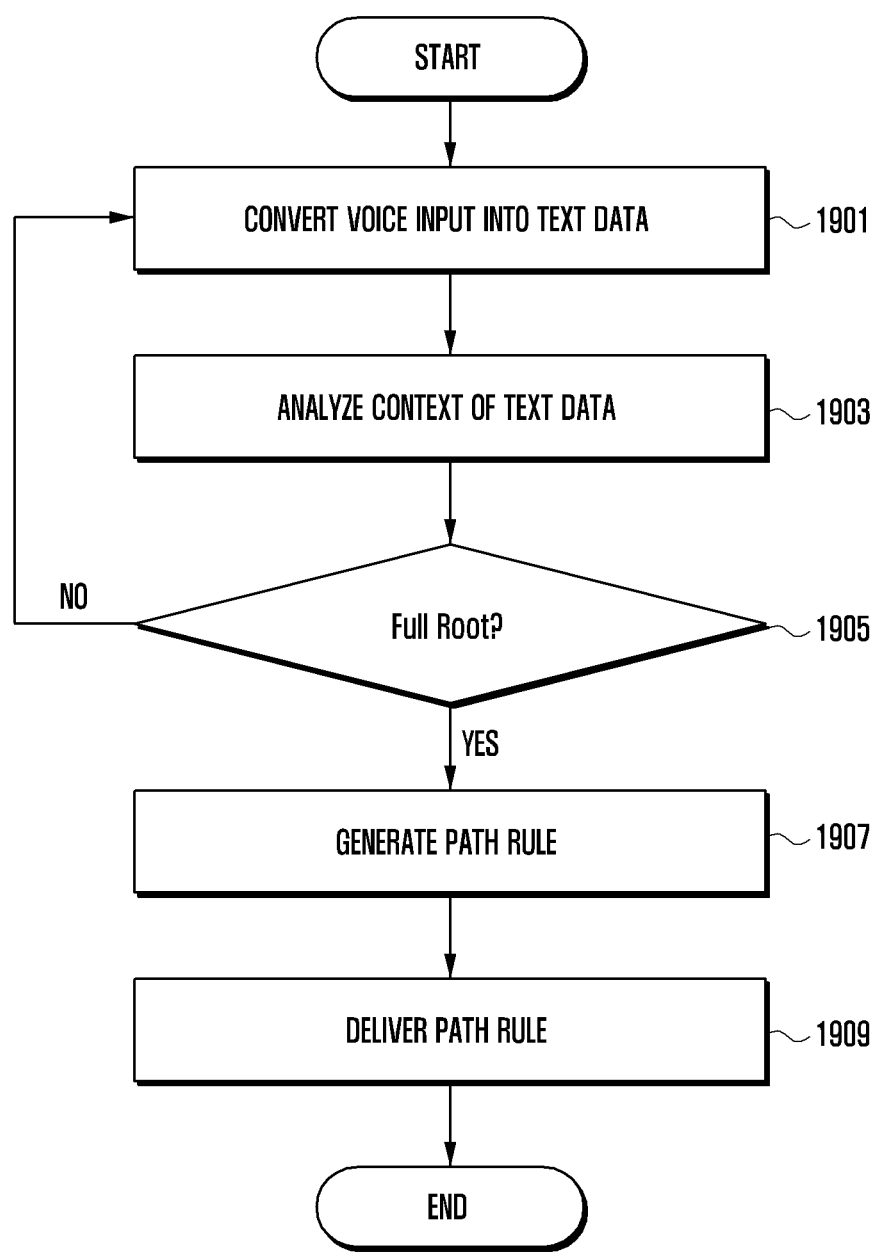
FIG. 19 is a flowchart illustrating example operations of the intelligent server according to an embodiment of the disclosure.

FIG. 19 is a flowchart illustrating example operations of the intelligent server 200 according to an embodiment of the disclosure.

In an example embodiment, with reference to FIG. 19, at operation 1901, the intelligent server (e.g., server 200 in FIG. 6) may invoke the automatic speech recognition module 210 to recognize voice input from the electronic device (e.g., electronic device 100 in FIG. 2), and convert the recognized voice input into text data. The automatic speech recognition module 210 may forward the text data to the electronic device 100 or to the natural language understanding module 220. The automatic speech recognition module 210 may identify the speaker by analyzing voice data. For example, the speaker information analyzed by the automatic speech recognition module 210 can be used by the natural language understanding module 220 to identify the speaker's intention. The automatic speech recognition module 210 may transmit the electronic device 100 the speaker information as well as the text data converted from the voice input. The automatic speech recognition module 210 may determine the speaker (e.g., Jones) based on the data previously stored in the database (e.g., fourth database 1729), and may update the database using a generic name (e.g., user 1) representing a particular speaker if speaker information is not in the database.

In an example embodiment, at operation 1903, the intelligent server 200 may invoke the natural language understanding module 220 to receive text data and speaker information from the automatic speech recognition module 210, determine a parameter (or slot) and context based on the text data and speaker information using a specified rule, and identify the user's intention based on the determined parameter and context. The natural language understanding module 220 may send the determined parameters, context, and user intention to the path planner module 230.

In an example embodiment, at operation 1905, the intelligent server 200 may invoke the path planner module 230 to determine whether the voice input received from the electronic device 100 corresponds to a full-root utterance based on the user intention and parameters analyzed by the natural language understanding module 220. For example, the full-root utterance may refer, for example, to a situation in which the user's intention can be derived from the voice input. The path planner module 230 may determine a full-root utterance based on the amount of parameter information obtained from the voice input. For example, if more than a specified amount of parameter information is obtained from the voice input for the fields such as the agent of the action, the time of the action, the place of the action, the target of the action, a method of performing the action, and a reason of the action, the path planner module 230 may determine that the voice input corresponds to a full-root utterance. If the voice input received from the electronic device 100 corresponds to a full-root utterance, the procedure may proceed to operation 1907. If the voice input received from the electronic device 100 does not correspond to a full-root utterance, the voice input may be cumulatively stored and the procedure may return to operation 1901 for new voice input.

In an example embodiment, if the voice input corresponds to a full-root utterance, at operation 1907, the intelligent server 200 may generate a path rule through the path planner module 230. The path planner module 230 may generate one or more path rules according to the user intention and parameters. For example, the path planner module 230 may generate one or more path rules by determining the application to be executed (e.g., application 141 or 143) and the action to be performed in the application based on the user's intention and parameters. The path planner module 230 may store the generated path rule in the path rule database 231. The path planner module 230 may manage the prediction database 270 with reference to the speaker information so that one path rule is matched to one speaker. In an example embodiment, after performing operation 1907, the intelligent server 200 may perform operation 1901 again to recognize the voice input from the electronic device 100 and convert the recognized voice input into text data. In response to additional voice input, the intelligent server 200 may update the path rules stored in the prediction database 270.

In an example embodiment, at operation 1909, the intelligent server 200 may send (e.g., deliver) a path rule to the electronic device 100 in response to the wake-up utterance received by the electronic device 100. The intelligent server 200 may determine the weight for selecting the path rule based on the type of the wake-up utterance, the point in time at which the wake-up utterance is input, or the user having produced the wakeup utterance, and transmit the electronic device 100 the path rule selected based on the determined weight.

Figure 20:
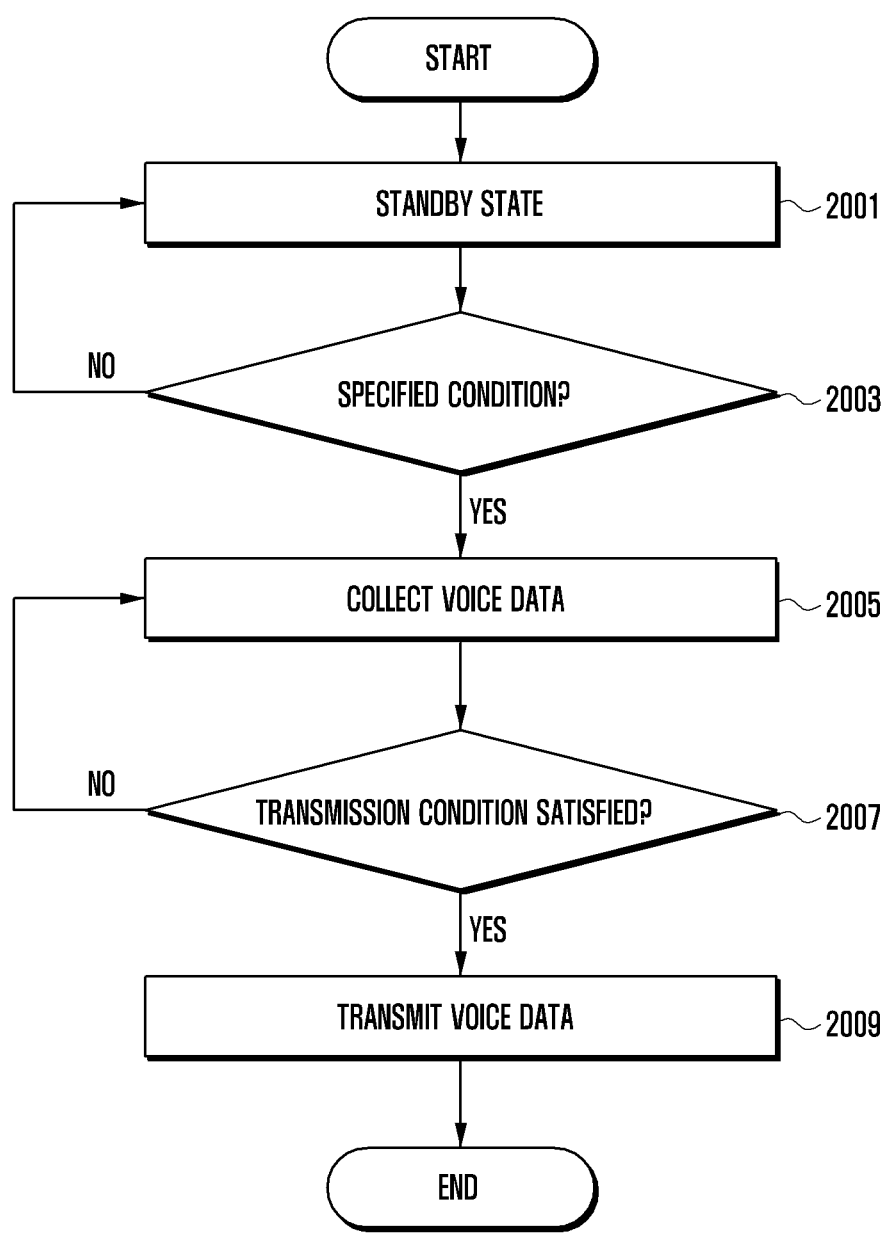
FIG. 20 is a flowchart illustrating example operations of the electronic device for collecting voice data according to an embodiment of the disclosure.

FIG. 20 is a flowchart illustrating example operations of the electronic device 100 for collecting voice data according to an embodiment of the disclosure.

In an example embodiment, with reference to FIG. 20, at operation 2001, the electronic device (e.g., electronic device 100 in FIG. 2) may remain in the standby state. In the standby state, a sensor or a short range communication module disposed on a portion of the electronic device 100 may be activated. For example, in the standby state, the electronic device 100 may detect information (e.g., conversation) received by the sensor (e.g., microphone), proximity of a device through the short range communication module, or occurrence of a schedule event (e.g., meeting).

In an example embodiment, at operation 2003, the electronic device 100 may determine whether a specified condition is met for starting to collect voice input from the user. For example, the electronic device 100 can determine that the specified condition is satisfied upon detecting conversations between two or more users at a specified level or higher (e.g., for a given duration or longer, or by a given amount or more). The electronic device 100 can remain in the standby state if the specified condition is not satisfied. Reference may be made to operation 1511 in FIG. 15 for determining if a specified condition is met.

In an example embodiment, if the specified condition is satisfied, at operation 2005, the electronic device 100 can collect voice data. The electronic device 100 may cumulatively store the received voice data from the point in time when the specified condition is satisfied.

In an example embodiment, at operation 2007, the electronic device 100 may determine whether the condition for transmitting voice data to the intelligent server 200 is satisfied. For example, the electronic device 100 may collect voice data on the basis of a specified unit (e.g., time duration, or data amount), and may determine that the condition for transmitting the collected voice data to the intelligent server 200 is satisfied whenever the specified unit is exceeded.

The procedure may proceed to operation 2009 if the transmission condition is satisfied, or may return to operation 2005 for collecting voice data if the transmission condition is not satisfied.

In an example embodiment, at operation 2009, the electronic device 100 may send (e.g., transmit) the collected voice data to an intelligent server (e.g., server 200 in FIG. 6). The intelligent server 200 may analyze the voice data received from the electronic device 100 and construct the prediction database 270 based on the analysis results.

Figure 21:
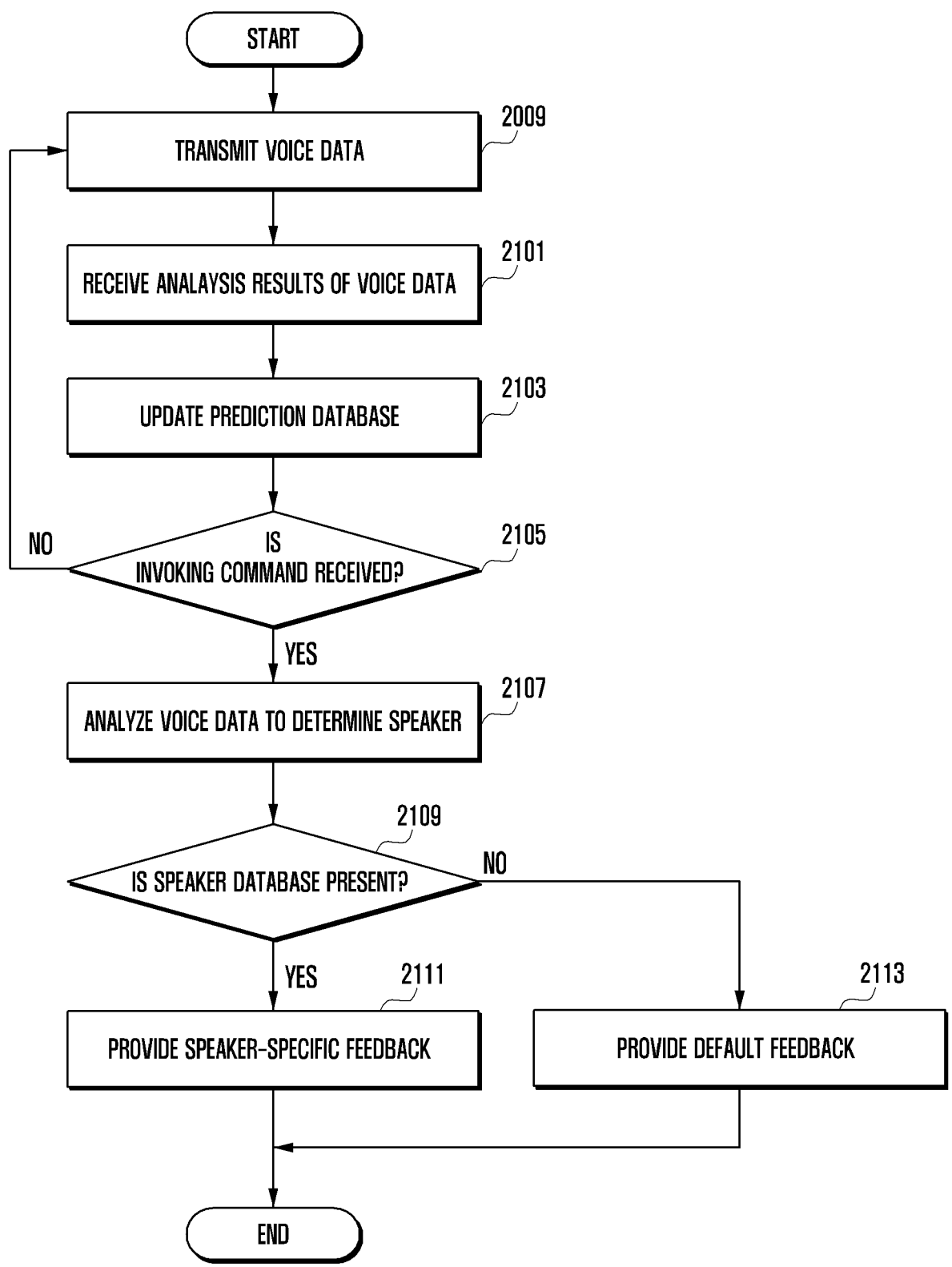
FIG. 21 is a flowchart illustrating example operations of the electronic device for providing a recommendation service in response to a wake-up utterance according to an embodiment of the disclosure.

FIG. 21 is a flowchart illustrating example operations of the electronic device 100 for providing a recommendation service in response to a wake-up utterance according to an embodiment of the disclosure.

In an example embodiment, with reference to FIG. 21, the electronic device (e.g., electronic device 100 in FIG. 2) may send (transmit) the collected voice data to the intelligent server (e.g., server 200 in FIG. 6) as described at operation 2009 in FIG. 20.

In an example embodiment, at operation 2101, the electronic device 100 may receive the voice data analysis result from the intelligent server 200 as a response to the voice data having transmitted to the intelligent server 200. The analysis result may include information regarding at least one of the time, the speaker, completeness, or a path rule in relation to the transmitted voice data. Alternatively, voice data analysis may be performed in the electronic device 100. The path rule may be based on the result produced by the intelligent server 200 analyzing voice data received from the electronic device 100 in a specified unit.

In an example embodiment, at operation 2103, the electronic device 100 can update the prediction database 270 in accordance with the voice data analysis result received from the intelligent server 200. The result of the voice data analysis may be a path rule. The electronic device may store the received path rule in the prediction database 270. The path rule may also be stored in a separate database to which the prediction database 270 can refer.

In an example embodiment, at operation 2105, the electronic device 100 may determine whether a wake-up utterance (e.g., an invoking command) is received. For example, the wake-up utterance such as "Bixby!!" may be a command specified for triggering the speech recognition artificial intelligence service. If a wake-up utterance is not received, the procedure may return to operation 2009 at which the electronic device 100 may collect voice data and transmit the collected voice data to the intelligent server 200.

In an example embodiment, at operation 2107, the electronic device 100 may analyze the voice data received as the wake-up utterance to determine the speaker having produced the wake-up utterance. For example, the electronic device 100 may analyze the voice data received as the wake-up utterance to obtain the speaker information. As another example, the electronic device 100 can transmit the voice data input as the wake-up utterance to the intelligent server 200, and may obtain the speaker information from the intelligent server 200.

In an example embodiment, at operation 2109, the electronic device 100 may determine whether the obtained speaker information is present in the speaker database. For example, the electronic device 100 may extract the speaker feature in cooperation with the speaker determination module 1723 configured in the automatic speech recognition module 210, and determine whether the speaker of the received voice data is identical to the speaker of a stored speaker model based on the extracted speaker feature. For example, the speaker determination module 1723 may check whether the speaker of the received voice data corresponds to one of the speaker models stored in the fourth database 1729 (e.g., first speaker model 1733, second speaker model 1735, and third speaker model 1737), and determine the speaker model corresponding to the speaker of the received voice data.

In an example embodiment, if information related to the extracted speaker information is present in the prediction database 270, at operation 2111, the electronic device 100 may select a path rule related to the speaker and provide a recommendation service as feedback based on the selected path rule. For example, if path rules are assigned for plural speakers in the prediction database 270, the electronic device 100 can select a path rule by assigning a high weight to the speaker having produced the wake-up utterance. As another example, if there is a keyword entered along with the wake-up utterance, the electronic device 100 may adjust the weight of the parameters stored in the prediction database 270 based on the keyword and provide a recommendation service according to the adjusted weight.

In an example embodiment, if information related to the extracted speaker information is not present in the prediction database 270, at operation 2113, the electronic device 100 may provide the default feedback. For example, the electronic device 100 may wait for additional voice input from the user, or may output a UI (user interface) or UX (user experience) requesting the user to enter additional information for determining the intention.

In an example embodiment, at operation 2205, the electronic device 100 may receive from the user a wake-up utterance (e.g., invoking command) designated to wake up the speech recognition artificial intelligence service.

In an example embodiment, at operation 2207, the electronic device 100 may output a UI (user interface) or a UX (user experience) requesting additional information if the intention of the user is not clear at the time of receiving the wake-up utterance. For example, if the electronic device 100 understands only the context "the user is attempting to order delivery food" based on the conversations collected prior to receiving the wake-up utterance, it may produce a response to the wake-up utterance such as "What kind of food do you want to order?" as a request for additional information. For example, if the intention of the user or the context of the previous conversations is not clearly understood at the time of receiving the wake-up utterance, the electronic device 100 may request additional input for some parameters that have not been identified among the parameters such as the agent of the action, the time of the action, the place of the action, the target of the action, a method of performing the action, and a reason of the action. The electronic device 100 may skip operation 2207 when it determines that the intention of the user is clear at the time of receiving the wake-up utterance.

In an example embodiment, at operation 2209, the electronic device 100 may select the path rule for the user having produced the wake-up utterance and provide the corresponding recommendation service as feedback. For example, the electronic device 100 may determine the user's speaker information and provide result feedback based on the determined speaker information.

TABLE 3

| Num | Rule_ID | Representative utterance | Speaker | Weight | Keyword | Note (time) |
|---|---|---|---|---|---|---|
| 1 | weather_100 | Today's weather in Suwon is clear. | A | 90% | weather, Suwon | 2017 Jun. 07 12:50 |
| 2 | music_200 | Do you want to play IU's song? | A, B | 80% | IU, song | 2017 Jun. 07 12:55 |
| 3 | Phone_100 Yogiyo_50 | Would you like to order pizza? | C | 90% | pizza, order | 2017 Jun. 07 13:00 |
| 4 | SC-10 | Would you like to watch TV on channel 15? | B | 83% | JTBC, 15, TV | 2017 Jun. 07 13:07 |
| 5 | finance_30 | Would you like to transfer money from community bank? | B | 70% | remittance, transfer | 2017 Jun. 07 13:15 |

Figure 22:
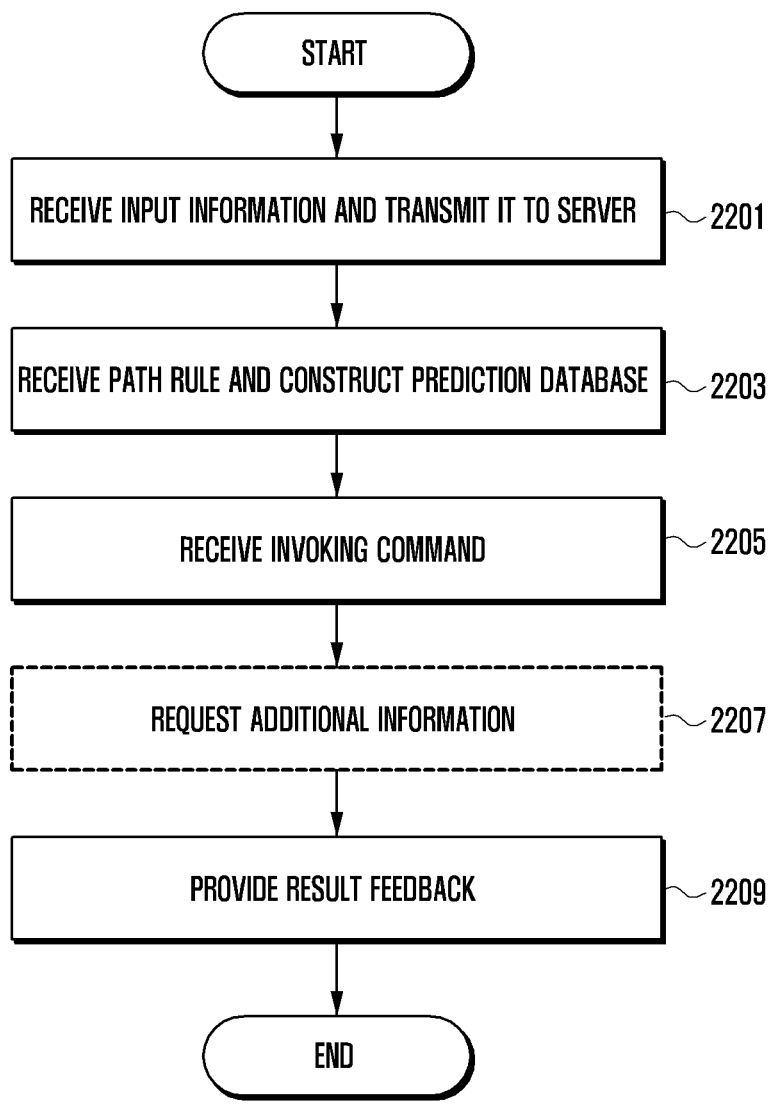
FIG. 22 is a flowchart illustrating example operations of the electronic device for making a request for additional information according to an embodiment of the disclosure.

FIG. 22 is a flowchart illustrating example operations of the electronic device 100 for making a request for additional information according to an embodiment of the disclosure.

In an example embodiment, with reference to FIG. 22, at operation 2201, the electronic device (e.g., electronic device 100 in FIG. 2) may receive input information according to a specified condition and transmit the received information to the intelligent server (e.g., server 200 in FIG. 6). For example, upon detecting conversations between two or more users at a specified level or higher (e.g., for a given duration or longer, or by a given amount or more), the electronic device 100 may collect voice data and send the collected voice data to the intelligent server 200.

In an example embodiment, at operation 2203, the electronic device 100 may receive a path rule from the intelligent server 200 in response to the voice data sent to the intelligent server 200, and may analyze the received path rule to construct the prediction database 270.

Figure 23:
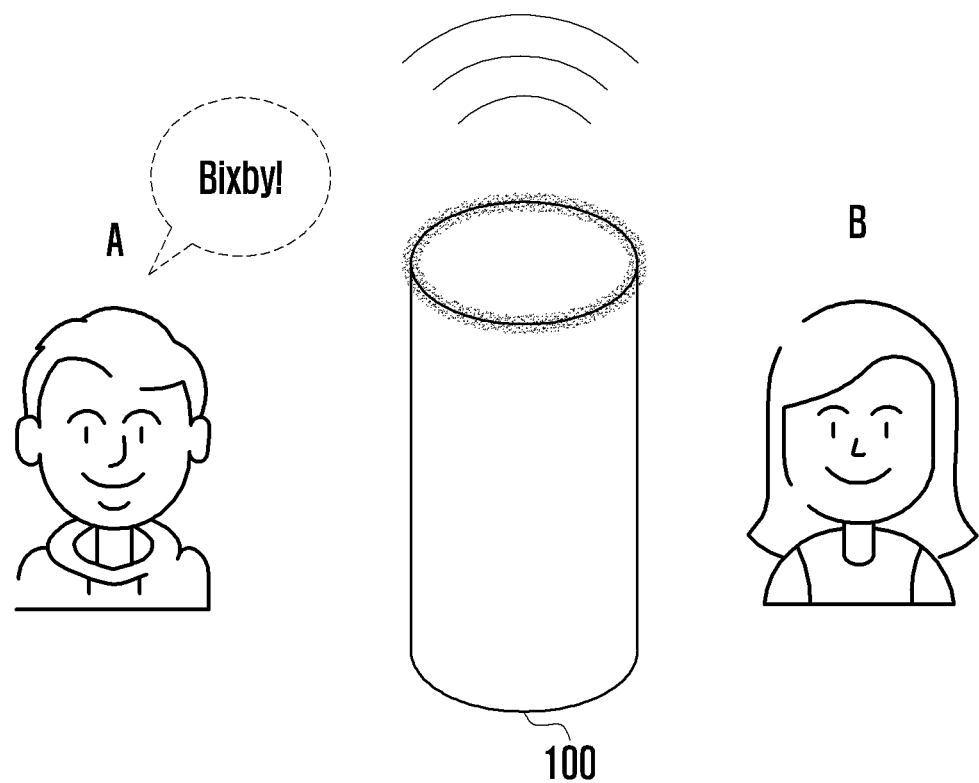
FIG. 23 is a diagram illustrating an example in which the electronic device provides a recommendation service based on the speaker according to an embodiment of the disclosure.
Figure 24:
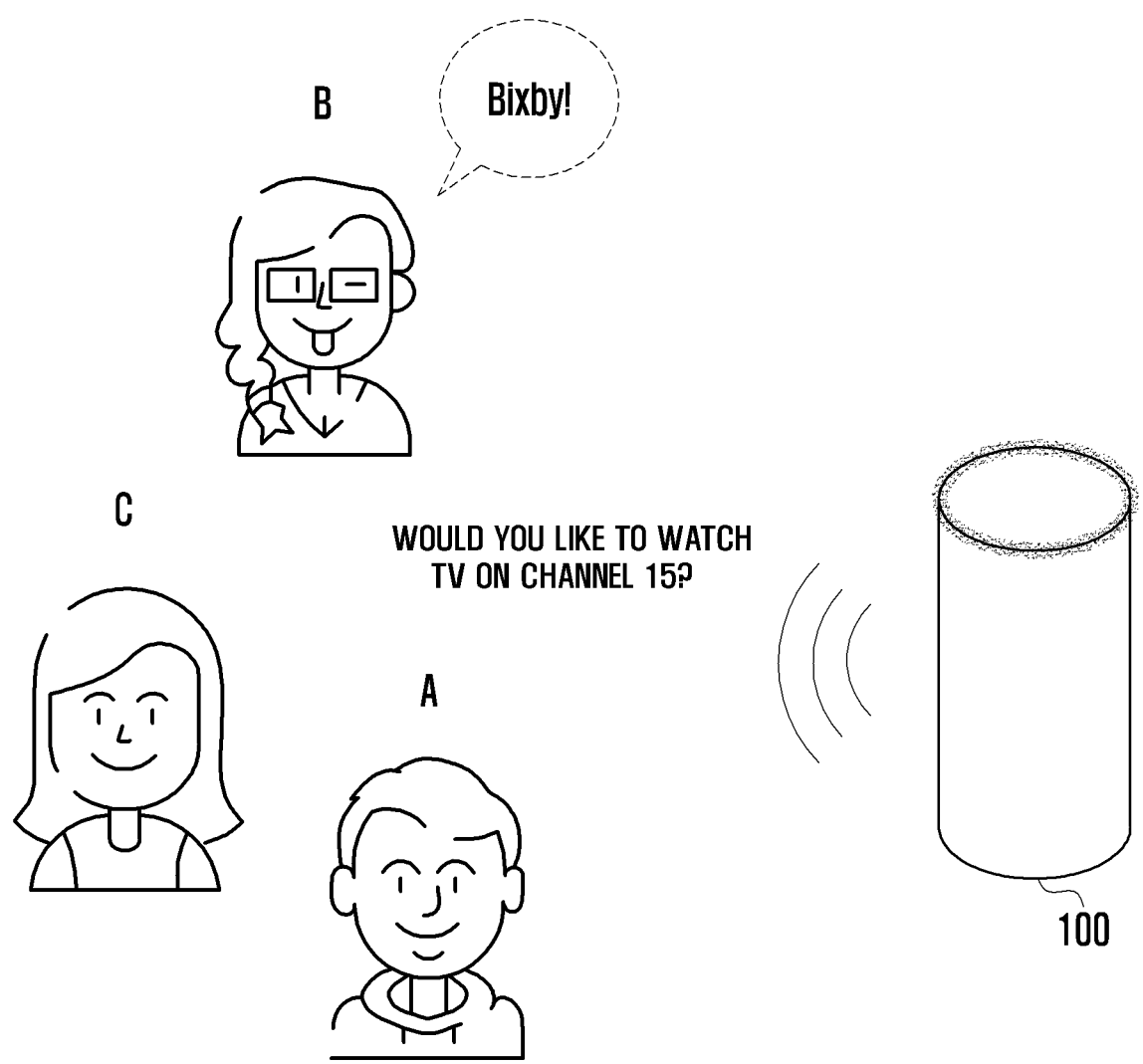
FIG. 24 is a diagram illustrating an example in which the electronic device provides a recommendation service based on time information according to an embodiment of the disclosure.
Figure 25:
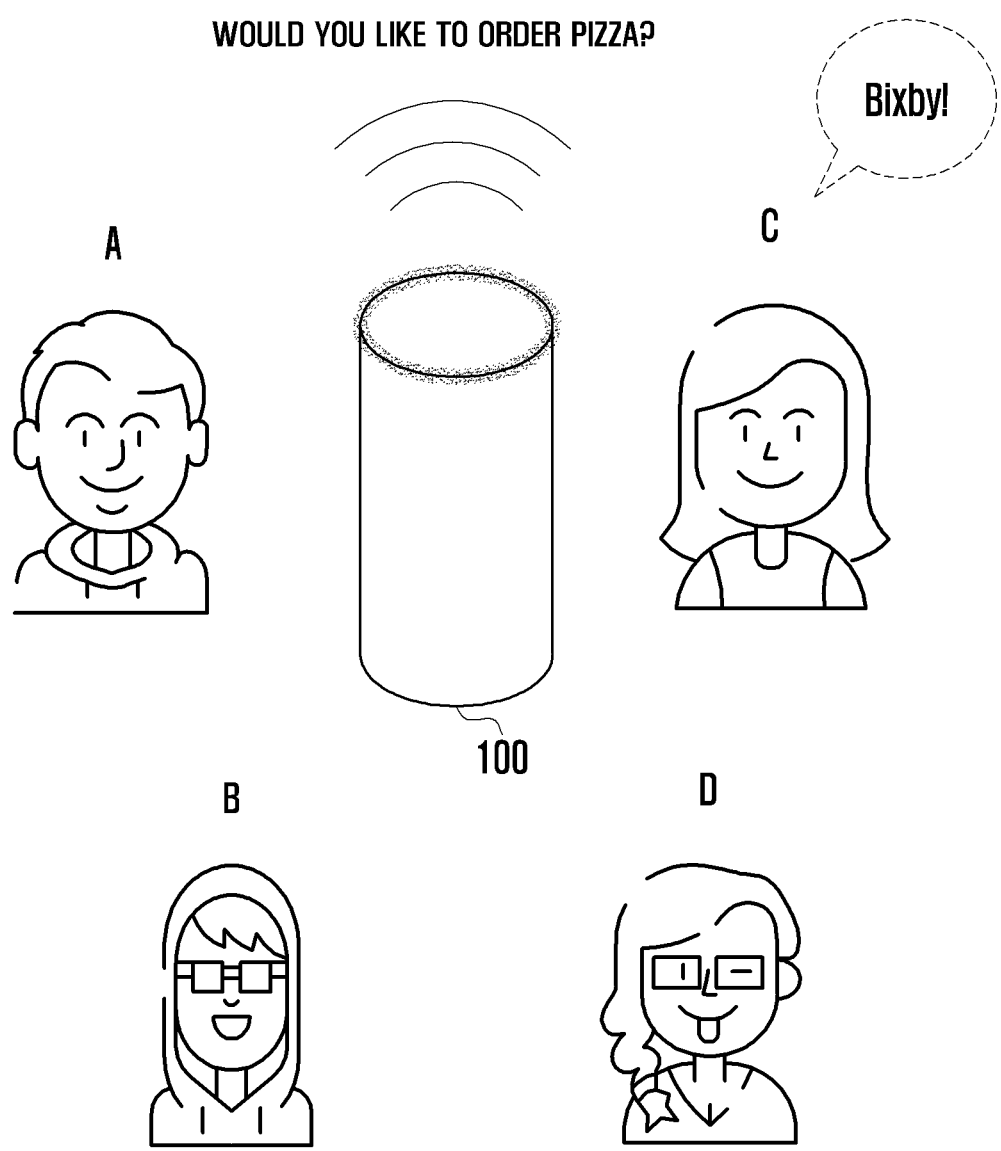
FIG. 25 is a diagram illustrating an example in which the electronic device provides a recommendation service based on the completeness of the context according to an embodiment of the disclosure.

FIG. 23 is a diagram illustrating an example in which the electronic device 100 provides a recommendation service based on the speaker according to an embodiment of the disclosure. FIG. 24 is a diagram illustrating an example in which the electronic device 100 provides a recommendation service based on time information according to an embodiment of the disclosure. FIG. 25 is a diagram illustrating an example in which the electronic device 100 provides a recommendation service based on the completeness of the context according to an embodiment of the disclosure.

In the following description on FIGS. 23 and 24, it is assumed that the prediction database 270 is configured as shown in Table 3 above at the time when the electronic device (e.g., electronic device 100 in FIG. 2) receives the wake-up utterance.

With reference to FIG. 23, if the speaker having produced the wakeup utterance is user A, the electronic device 100 can select first a path rule associated with user A through the execution manager module 147. For example, in Table 3, as the first and second path rules are related to user A, the execution manager module 147 can select the first and second path rules first. The execution manager module 147 of the electronic device 100 may select one of the initially selected path rules based on the weight. For example, the execution manager module 147 may select the first path rule because the first path rule has the highest weight among the first and second path rules, and the electronic device 100 may output a sound signal such as "Today's weather in Suwon is clear." according to the selection result. In an example embodiment, the electronic device 100 may have assigned a relatively high weight to the first path rule in the prediction database 270 based on the fact that user A most frequently said about the weather in the conversations collected prior to reception of the wake-up utterance. In another embodiment, the electronic device 100 may have assigned a relatively high weight to the first path rule in the prediction database 270 based on the preference information that user A frequently used weather-related artificial intelligence services prior to reception of the wake-up utterance.

In an example embodiment, if the speaker having produced the wakeup utterance is user A, the electronic device 100 can select first the first and second path rules associated with user A through the execution manager module 147. If a keyword is not included along with the wake-up utterance, the electronic device 100 may select the first path rule because the first path rule has the highest weight among the first and second path rules. However, if a keyword is included along with the wake-up utterance, the electronic device 100 may select the second path rule among the first and second path rules. For example, if a keyword "music or song" is included along with the wake-up utterance having been produced by user A, the electronic device 100 may select the second path rule.

With reference to FIG. 24, if the speaker having produced the wake-up utterance is user B, the electronic device 100 can select a path rule associated with user B first through the execution manager module 147. For example, in Table 3, as the second, fourth and fifth path rules are related to user B, the execution manager module 147 can select the second, fourth and fifth path rules first. The execution manager module 147 of the electronic device 100 may select one of the initially selected path rules based on the weight. For example, the execution manager module 147 may select the fourth path rule because the fourth path rule has the highest weight among the second, fourth and fifth path rules, and the electronic device 100 may output a sound signal such as "Would you like to watch TV on channel 15?" according to the selection result. In an example embodiment, the electronic device 100 may have assigned a relatively high weight to the fourth path rule in the prediction database 270 based on the fact that user B most frequently said about the TV program in the conversations collected prior to reception of the wake-up utterance. In another embodiment, if the difference in weight between path rules in the prediction database 270 is less than or equal to a specified value, the electronic device 100 may select the most recently generated path rule. For example, assuming that the weight of the second path rule is 80 percent and the weight of the fourth path rule is 83 percent, as the difference between the two weights is smaller than a specified value (e.g., 8 percent), the electronic device 100 can select the fourth path rule whose generation time is later.

With reference to FIG. 25, in an example embodiment, if there is a recommendation service whose context is clearly understood from the previous conversations at the time of receiving the wake-up utterance, the electronic device 100 may select a path rule associated with the recommendation service. For example, upon receiving the wake-up utterance from user C, the electronic device 100 may recommend a pizza order service corresponding to the third path rule based on a clear understanding that users are about to order pizza soon (user intention).

TABLE 4

| Classification | Representative word |
| --- | --- |
| Weather | temperature, atmosphere, humidity, information providing |
| Commerce | clothing, electronics, information providing, purchase, refund |
| Device control | light bulb, appliances, turn on, turn off |

In various embodiments, the intelligent server 200 can manage information according to preset contexts. For example, the intelligent server 200 may classify the speech contents into a group of contexts such as "weather", "commerce", and "device control", and store the recent contextual state in the prediction database 270. Table 4 above shows examples of contexts managed by the electronic device 100 or the intelligent server (e.g., server 200 in FIG. 6).

In an example embodiment, the intelligent server 200 may assign a default priority to a path rule associated with the collected conversations and recently stored contexts when the electronic device 100 starts to collect user conversations. If there is an additional hint in the collected conversations, the intelligent server 200 may assign a higher priority to another path rule associated with the hint. Here, the additional hint may refer to a representative word in Table 4 as a criterion for identifying the context. For example, before the electronic device 100 collects user's conversations, the intelligent server 200 may store the "device control" context as the most recent context. If a hint for identifying the context (e.g., representative word in Table 4) is not included in the conversations collected by the electronic device 100, the intelligent server 200 may transmit first the path rule associated with the latest context "device control" to the electronic device 100. On the other hand, if a hint for identifying the context (e.g., representative word related to the context "weather", such as "temperature", "atmosphere", or "humidity") is included in the conversations collected by the electronic device 100, the intelligent server 200 may send the path rule associated with the context "weather" to the electronic device 100 while ignoring the priority of the path rule associated with the most recent context "device control".

TABLE 5

| Num | APP_ID | Representative utterance | Speaker | Weight | Keyword | Note (time) |
| --- | --- | --- | --- | --- | --- | --- |
| 1 | Phone_100 Yogiyo_50 | Would you like to place an order in a Chinese restaurant? | A | 90% | chanpon, order | 2017 Jun. 07 09:51 |

TABLE 5-continued

| Num | APP_ID | Representative utterance | Speaker | Weight | Keyword | Note (time) |
|---|---|---|---|---|---|---|
| 2 | Phone_100 Yogiyo_50 | Would you like to place an order in a Chinese restaurant? | B | 90% | ganjajangmyeon, order | 2017 Jun. 07 09:52 |
| 3 | Phone_100 Yogiyo_50 | Would you like to place an order in a Chinese restaurant? | C | 90% | fried rice, order | 2017 Jun. 07 09:53 |

Figure 26:
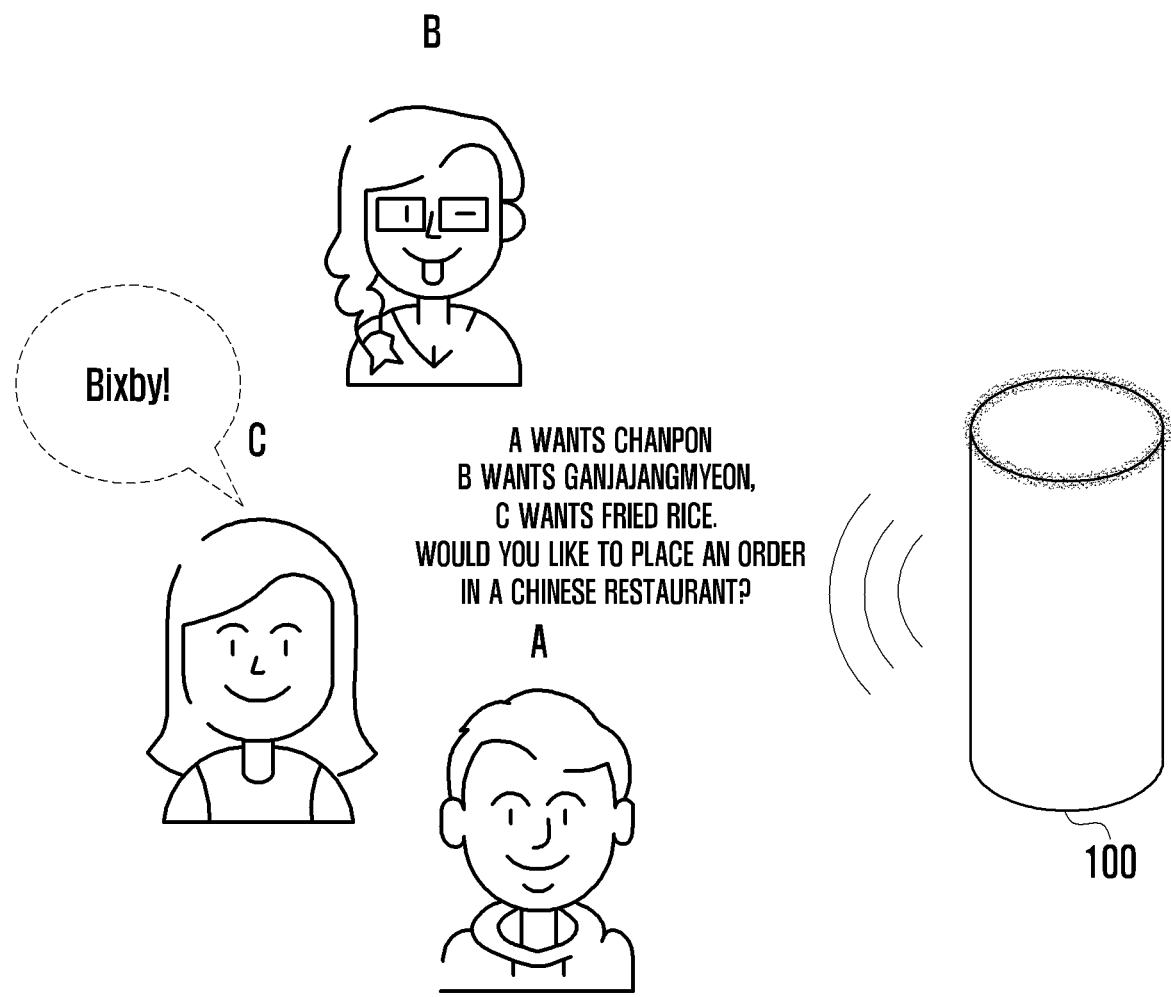
FIG. 26 is a diagram illustrating another example in which the electronic device provides a recommendation service according to an embodiment of the disclosure.

FIG. 26 is a diagram illustrating another example in which the electronic device 100 provides a recommendation service according to an embodiment of the disclosure.

In the following description on FIG. 26, it is assumed that the prediction database 270 is configured as shown in Table 5 at the time when the electronic device (e.g., electronic device 100 in FIG. 2) receives the wake-up utterance.

With reference to FIG. 26, if the speaker having produced the wake-up utterance is user C, the electronic device 100 can select a path rule associated with user C first through the execution manager module 147. For example, in Table 5, as the third path rule is related to user C, the execution manager module 147 can select the third path rule first. Thereafter, the execution manager module 147 may select not only the third path rule but also the first and second path rules based on the fact that the conversation between users is only for Chinese food orders before reception of the wake-up utterance, the electronic device 100 can output a sound signal such as "A wants chanpon, B wants ganjajangmyeon, and C wants fried rice. Would you like to place an order in a Chinese restaurant?" in accordance with the selection result. Alternatively, the electronic device 100 can output, through the display, information corresponding to the sound signal such as "A wants chanpon, B wants ganjajangmyeon, and C wants fried rice. Would you like to place an order in a Chinese restaurant?".

In an example embodiment, if a user enters different information in response to the recommendation service, the electronic device 100 may change the path rule. For example, after the electronic device 100 outputs a sound signal such as "A wants chanpon, B wants ganjajangmyeon, and C wants fried rice. Would you like to place an order in a Chinese restaurant?", if user A enters a voice input such as "Change it to ganjajangmyeon", the electronic device 100 may place an order for food with a changed menu item for user A. In this case, the electronic device 100 may output a UI (user interface) or a UX (user experience) requesting user A to reconfirm the change request.

Figure 27:
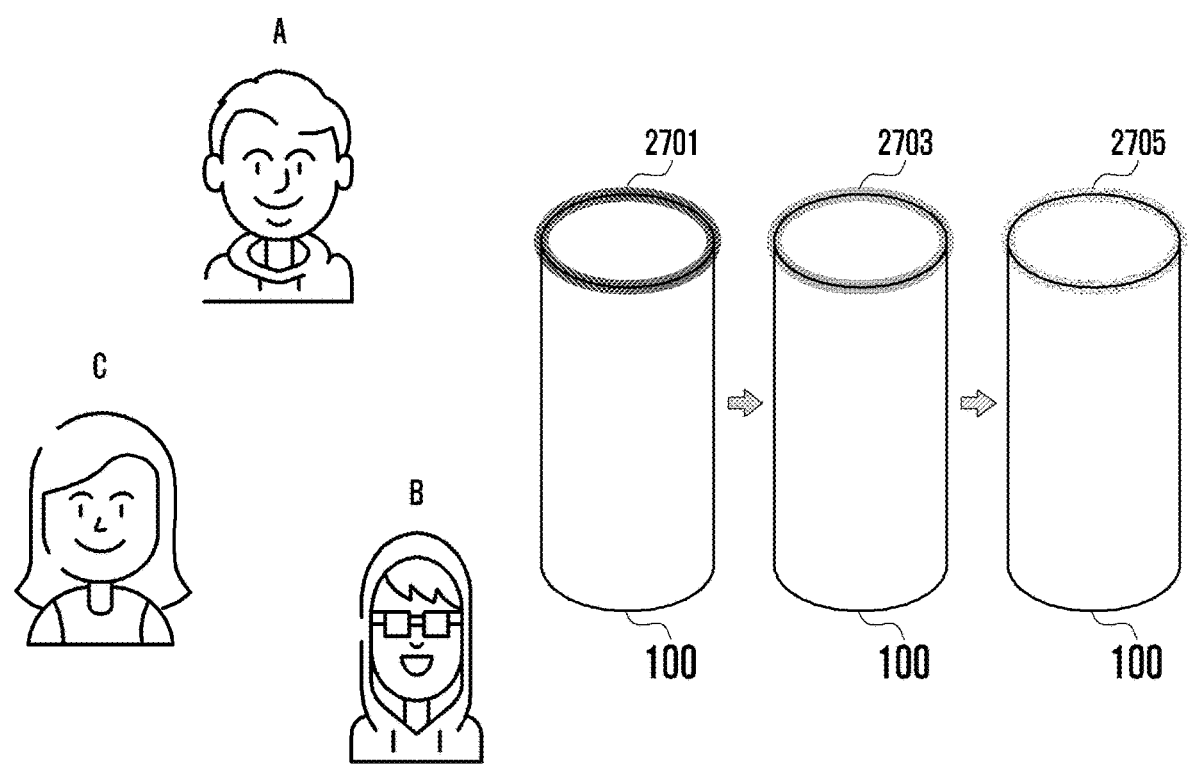
FIG. 27 is a diagram illustrating an example in which the electronic device provides supplementary information according to an embodiment of the disclosure.

FIG. 27 is a diagram illustrating an example in which the electronic device 100 provides supplementary information according to an embodiment of the disclosure.

In an example embodiment, with reference to FIG. 27, the electronic device (e.g., electronic device 100 in FIG. 2) may display current status information by outputting a user interface (UI) or user experience (UX) while collecting users' conversations. For example, the electronic device 100 may control the LED illumination to vary the color, length, or thickness thereof based on an understanding of the context of the users' conversations. For example, the electronic device 100 may control the LED illumination to output a first color (e.g., yellow) 2701 when it begins collecting user conversations, and may vary the color of the LED illumination from the first color to a second color (e.g., green) 2703 as the conversation collection progresses. When the context of the users' conversations is fully understood, the electronic device 100 may determine the recommendation service and control the LED illumination to output a third color (e.g., blue) 2705 so that the user may be aware that there is a recommendation service.

As described above, the electronic device according to various embodiments of the disclosure may collect user's conversations in advance before the user enters the wake-up utterance and may provide an artificial intelligence service based on the collected result. Hence, the electronic device can provide rapid and accurate responses and produce a response based on additional information. In addition, when the user of the electronic device utilizes a speech recognition artificial intelligence service, the convenience of the user can be improved by reducing the number or amount of voice input.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" may be a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the example embodiments are intended to be illustrative, not limiting, and those skilled in the art will understand and appreciate that various changes in form and details may be made without departing from the true spirit and full scope of the disclosure as defined, for example, in the appended claims, and their equivalents.

What is claimed is:

1. An electronic device comprising:
    a housing;
    a microphone;
    at least one speaker;
    a communication circuit disposed inside the housing;
    a processor disposed inside the housing and operatively connected with the microphone, the at least one speaker, and the communication circuit; and
    a memory disposed inside the housing, operatively connected to the processor, and configured to store a plurality of application programs,
    wherein the memory stores instructions that, when executed, cause the processor to control the electronic device to:
    collect voice data of a user based on a specified condition prior to receiving a wake-up utterance invoking a voice-based intelligent assistant service;
    transmit the voice data collected prior to receiving the wake-up utterance to an external server and request the external server to construct a prediction database configured to predict an intention of the user based at least on the voice data collected prior to receiving the wake-up utterance;
    output, after receiving the wake-up utterance, a recommendation service related to the intention of the user based on at least one piece of information included in the prediction database;
    calculate, based on receiving the wake-up utterance, a difference between a first time point at which collection of voice data is started and a second time point at which the wake-up utterance is received; and
    determine a weight for selecting the recommendation service based on a magnitude of the difference.

2. The electronic device of claim 1, wherein the instructions, when executed, cause the processor to:
    assign a higher weight to information on a speaker of the wake-up utterance based on the difference being greater than a specified value; and
    assign a higher weight to completeness of a command stored in the prediction database based on the difference being less than the specified value.

3. The electronic device of claim 1, wherein the instructions, when executed, cause the processor to:
    check whether a keyword is included with the wake-up utterance based on the wake-up utterance being received; and
    determine, if a keyword is included, a weight for selecting the recommendation service based on the keyword.

4. The electronic device of claim 1, further comprising an LED configured to provide LED illumination, wherein the instructions, when executed by the processor, cause the processor to control the LED illumination to vary at least one of a color, length, or thickness of LED illumination based on a context of a conversation of the user.

5. The electronic device of claim 4, wherein the instructions, when executed, cause the processor to:
    determine, based on an amount of parameter information obtained from conversations of the user exceeding a specified value, a recommendation service based on the obtained parameter information; and
    control the LED illumination to produce a color corresponding to the determined recommendation service.

6. The electronic device of claim 1, wherein the specified condition corresponds to at least one of:
voice input being greater than or equal to a specified value;
voice input being present after a given duration without voice input;
voice input becoming less than the specified value and then becoming greater than or equal to the specified value;
physical button input is received;
a specified character is input;
voice input is received from multiple users;
voice input is received from a given number or more users;
there are multiple electronic devices in a designated space;
there are multiple user accounts registered in the electronic device;
a time corresponding to a schedule registered in the electronic device; or
the electronic device being located in a designated space and a time corresponding to a pre-registered schedule.

7. The electronic device of claim 1, wherein the instructions, when executed, cause the processor to:
analyze the collected voice data to recognize a speaker; and
organize the prediction database for each recognized speaker.

8. The electronic device of claim 1, wherein the instructions, when executed, cause the processor to control the electronic device to output, based on the intention of the user not being clear based on at least one piece of information included in the prediction database after receiving the wake-up utterance, a user interface (UI) or user experience (UX) configured to request additional information.

9. The electronic device of claim 1, wherein the instructions, when executed, cause the processor to control the electronic device to:
transmit the collected voice data to the external server on a designated unit basis; and
receive a path rule from the external server in response to the transmitted collected voice data,
wherein the path rule includes information about a sequence of states of the electronic device for performing a task related to the intention of the user.

10. A method of operation for an electronic device capable of providing a recommendation service related to an intention of a user in response to a wake-up utterance invoking a voice-based intelligent assistant service, the method comprising:
collecting voice data of a user based on a specified condition prior to receiving the wake-up utterance;
transmitting the voice data collected prior to receiving the wake-up utterance to an external server and requesting the external server to construct a prediction database configured to predict the intention of the user based at least on the voice data collected prior to receiving the wake-up utterance;
determining, upon receiving the wake-up utterance, a weight based on at least one piece of information stored in the prediction database;
determining a recommendation service related to the intention of the user based on a weight and outputting the determined recommendation service,
wherein determining the weight includes: calculating, based on receiving the wake-up utterance, a difference between a first time point at which collection of voice data is started and a second time point at which the wake-up utterance is received; and
determining the weight for selecting the recommendation service based on a magnitude of the difference.

11. The method of claim 10, wherein determining the weight includes:
assigning a higher weight to information on a speaker of the wake-up utterance based on the difference being greater than a specified value; and
assigning a higher weight to completeness of a command stored in the prediction database based on the difference being less than the specified value.

12. The method of claim 10, further comprising:
checking whether a keyword is included with the wake-up utterance based on the wake-up utterance being received; and
determining, based on a keyword being included, the weight for selecting the recommendation service based on the keyword.

13. The method of claim 10, wherein the electronic device includes an LED configured to provide LED illumination, and wherein outputting the determined recommendation service comprises varying at least one of the color, length, or thickness of the LED illumination based on a context of a conversation of the user.

14. The method of claim 13, wherein outputting the determined recommendation service includes:
determining, based on an amount of parameter information obtained from conversations of a user exceeding a specified value, the recommendation service based on the obtained parameter information; and
controlling the LED illumination to produce a color corresponding to the determined recommendation service.

15. A method of operation for a server to provide a recommendation service related to an intention of a user in response to a wake-up utterance invoking a voice-based intelligent assistant service, the method comprising:
receiving voice data from an electronic device;
analyzing a context of a user's conversation included in the voice data;
determining whether the voice data is sufficient to identify the user's intention based on the analyzed context;
generating a path rule based on the voice data being sufficient to identify the user's intention, and cumulatively storing the voice data based on the voice data not being sufficient to identify the user's intention;
constructing, based on the path rule being generated, a prediction database using the generated path rule to predict the user's intention; and
transmitting, based on the electronic device receiving the wake-up utterance, at least one path rule included in the prediction database to the electronic device,
wherein determining whether the voice data is sufficient to identify the user's intention comprises:
obtaining information about plural specified parameters from the voice data; and
determining that the voice data is sufficient to identify the user's intention based on a number of parameters whose information is obtained exceeding a specified value.

16. The method of claim 15, further comprising:
obtaining speaker information of the voice data from the electronic device; and
managing the prediction database to match the path rules to the speaker information.

17. The method of claim 15, wherein the parameters include information about fields corresponding respectively to an agent of an action, a time of the action, a place of the action, a target of the action, a method of performing the action, and a reason of the action.

18. The method of claim 15, wherein the prediction database stores information about at least one of text data obtained from the voice data, a speaker, a weight related to a speaker information, applications executable in the electronic device, states of the applications, or keywords.

\* \* \* \* \*